(12) United States Patent
Kim et al.

(10) Patent No.: US 8,478,347 B2
(45) Date of Patent: Jul. 2, 2013

(54) MOBILE TERMINAL AND CAMERA IMAGE CONTROL METHOD THEREOF

(75) Inventors: Jong-Hwan Kim, Gyeonggi-Do (KR);
Young-Jung Yoon, Seoul (KR);
Hyun-Dong Yang, Seoul (KR);
Sang-Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 731 days.

(21) Appl. No.: 12/652,030

(22) Filed: Jan. 4, 2010

(65) Prior Publication Data

US 2010/0173678 A1 Jul. 8, 2010

(30) Foreign Application Priority Data

Jan. 7, 2009 (KR) .................... 10-2009-0001230
Mar. 24, 2009 (KR) .................... 10-2009-0024750

(51) Int. Cl.
*H04B 1/38* (2006.01)
*H04B 1/00* (2006.01)
*H04M 1/00* (2006.01)

(52) U.S. Cl.
USPC ........ 455/566; 455/567; 455/575.1; 455/90.3

(58) Field of Classification Search
USPC .............................. 455/566, 567, 575.1, 90.3
See application file for complete search history.

(56) References Cited

U.S. PATENT DOCUMENTS

| | | | |
|---|---|---|---|
| 6,943,841 B2 * | 9/2005 | Miyake et al. ........... 348/333.05 |
| 7,149,549 B1 * | 12/2006 | Ortiz et al. ................... 455/566 |
| 7,471,890 B2 * | 12/2008 | Lee et al. ...................... 396/287 |
| 7,620,426 B2 * | 11/2009 | Ortiz et al. ................... 455/566 |
| 7,660,574 B2 * | 2/2010 | Niimi ............................ 455/407 |
| 7,714,925 B2 * | 5/2010 | Kim ........................ 348/333.05 |
| 7,783,321 B2 * | 8/2010 | Hanif et al. ................ 455/550.1 |
| 7,826,877 B2 * | 11/2010 | Ortiz et al. ................... 455/899 |
| 7,844,301 B2 * | 11/2010 | Lee et al. ...................... 455/566 |
| 7,856,251 B2 * | 12/2010 | Park et al. .................... 455/566 |
| 8,049,678 B2 * | 11/2011 | Lee et al. ...................... 345/1.1 |
| 8,233,863 B2 * | 7/2012 | Kim ............................ 455/158.4 |
| 8,301,202 B2 * | 10/2012 | Lee .............................. 455/566 |
| 2004/0106438 A1 * | 6/2004 | Chen ............................ 455/566 |
| 2007/0035616 A1 * | 2/2007 | Lee et al. ................... 348/14.16 |
| 2008/0024643 A1 | 1/2008 | Kato |
| 2008/0034302 A1 | 2/2008 | Ryu et al. |
| 2009/0022428 A1 * | 1/2009 | Lee et al. ...................... 382/309 |
| 2009/0098912 A1 * | 4/2009 | Kim et al. .................... 455/566 |
| 2010/0069035 A1 * | 3/2010 | Johnson ..................... 455/404.1 |
| 2010/0173678 A1 * | 7/2010 | Kim et al. .................... 455/566 |
| 2011/0003616 A1 * | 1/2011 | Gorsica et al. ............. 455/556.2 |

(Continued)

FOREIGN PATENT DOCUMENTS

| | | |
|---|---|---|
| CN | 101115148 A | 1/2008 |
| CN | 101123445 A | 2/2008 |

*Primary Examiner* — Tilahun B Gesesse
(74) *Attorney, Agent, or Firm* — Birch, Stewart, Kolasch & Birch, LLP

(57) ABSTRACT

A method of controlling a mobile terminal, and which includes displaying, via a display on the mobile terminal, a captured or a preview image in a first display portion, displaying, via the display, the same captured or a preview image in a second display portion, zooming, via a controller on the mobile terminal, the captured or preview image displayed in the first display portion, and displaying, via the display, a zoom guide on the image displayed in the second display portion that identifies a zoomed portion of the image displayed in the first display portion.

34 Claims, 51 Drawing Sheets

U.S. PATENT DOCUMENTS

2011/0053642 A1* 3/2011 Lee .......................... 455/556.1
2011/0053654 A1* 3/2011 Petrescu et al. ............... 455/566
2011/0275415 A1* 11/2011 Lee et al. ...................... 455/566
2012/0157044 A1* 6/2012 Kim et al. ..................... 455/410

* cited by examiner

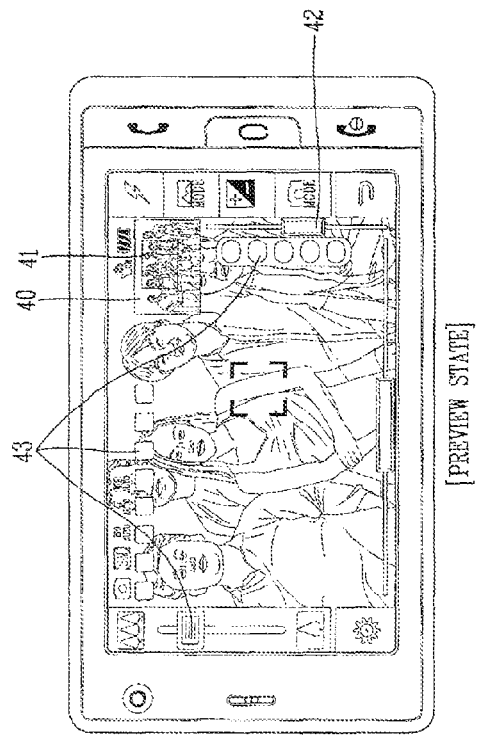
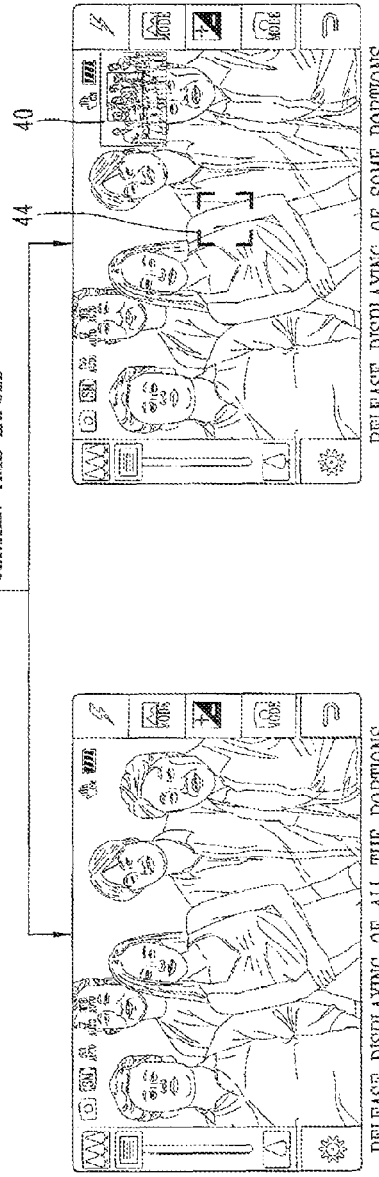
FIG. 9

FIG. 12A
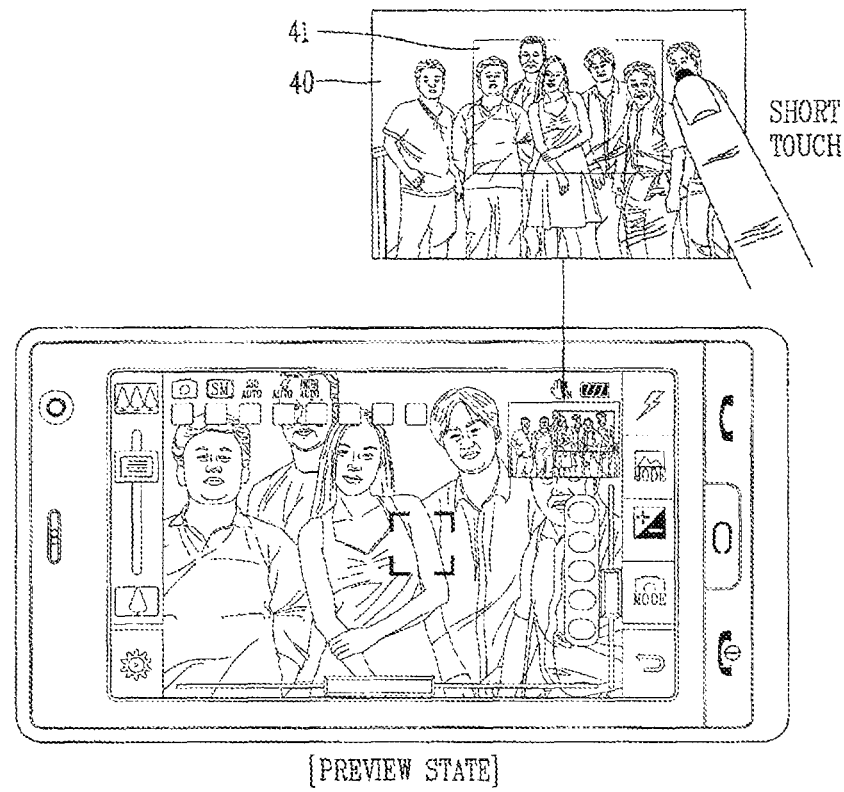
[PREVIEW STATE]
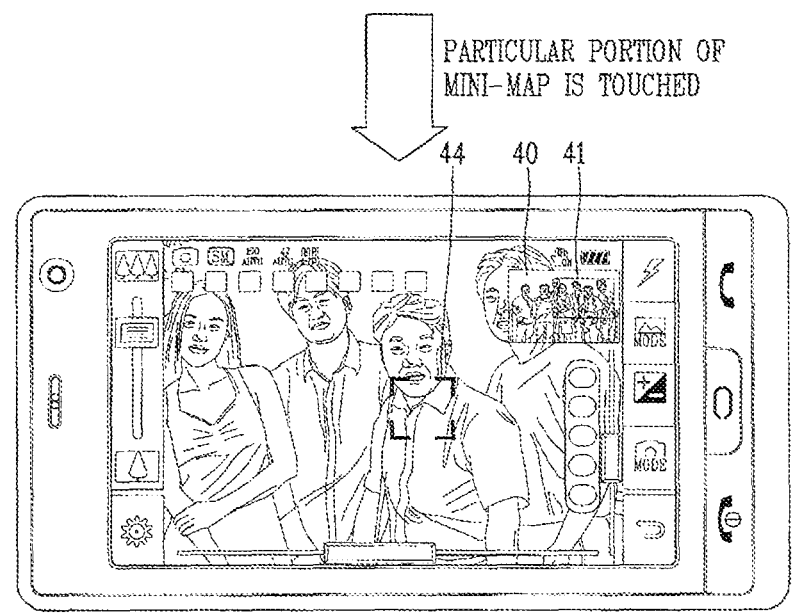

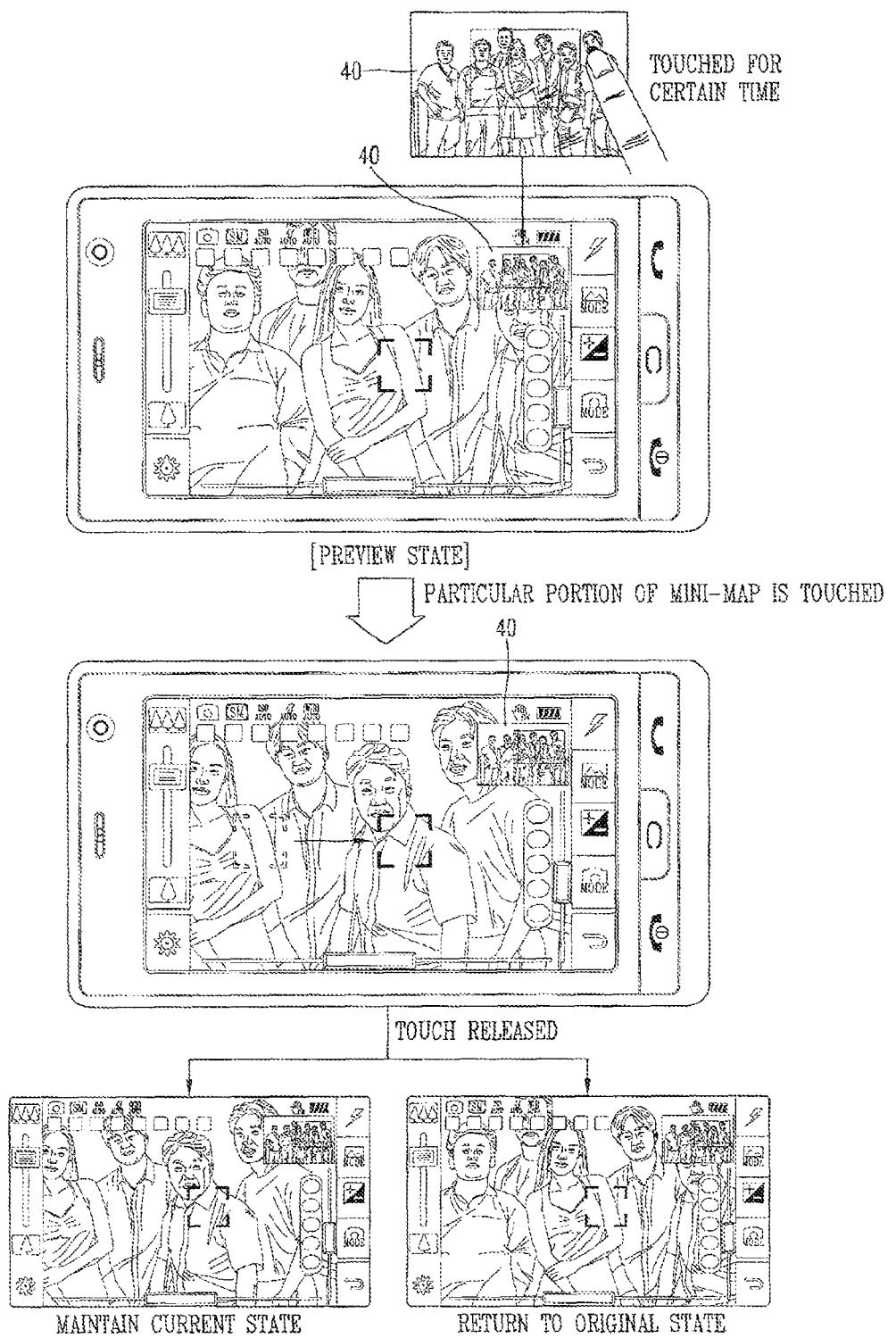

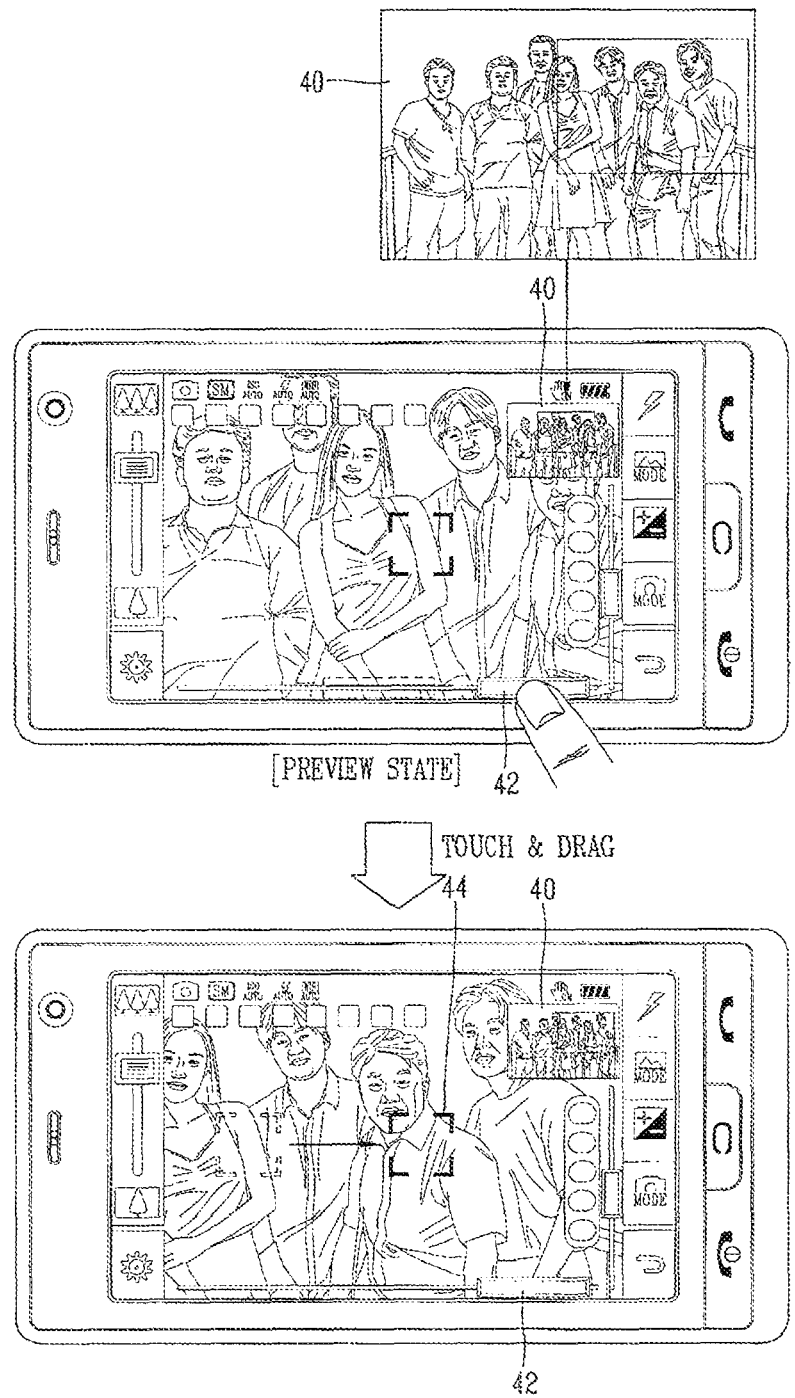

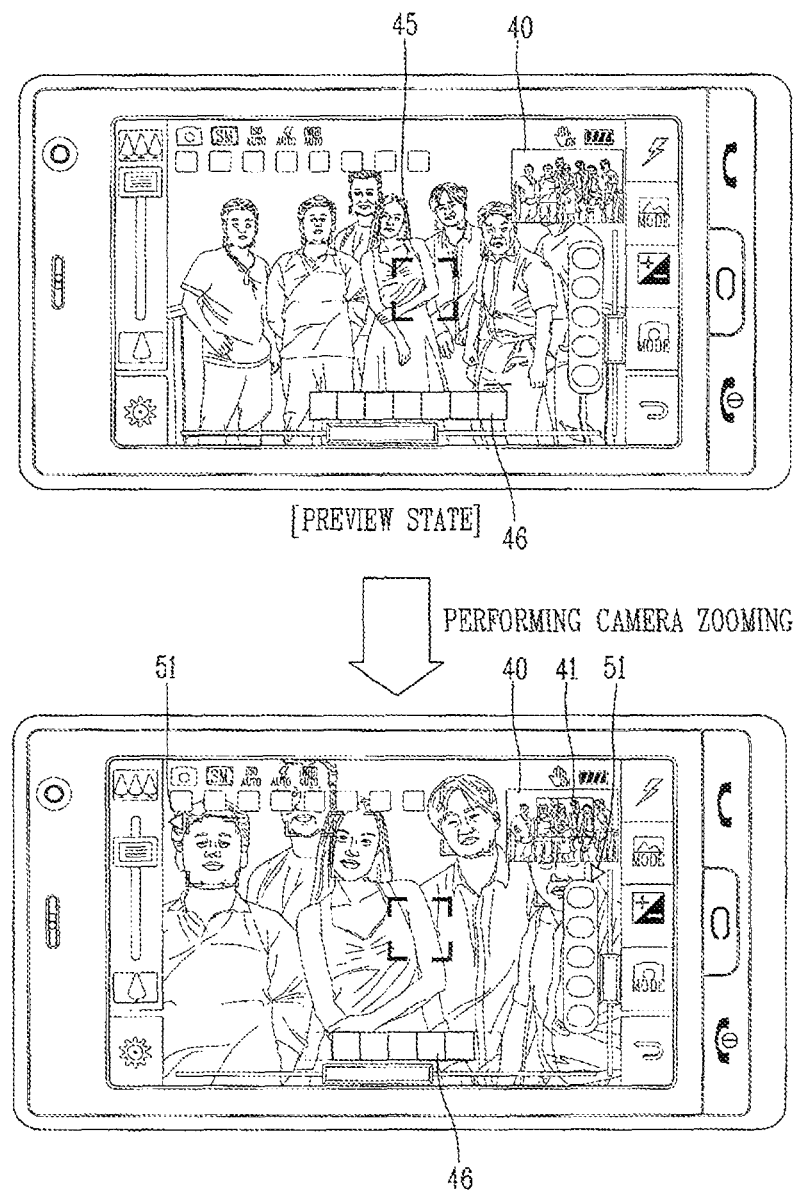

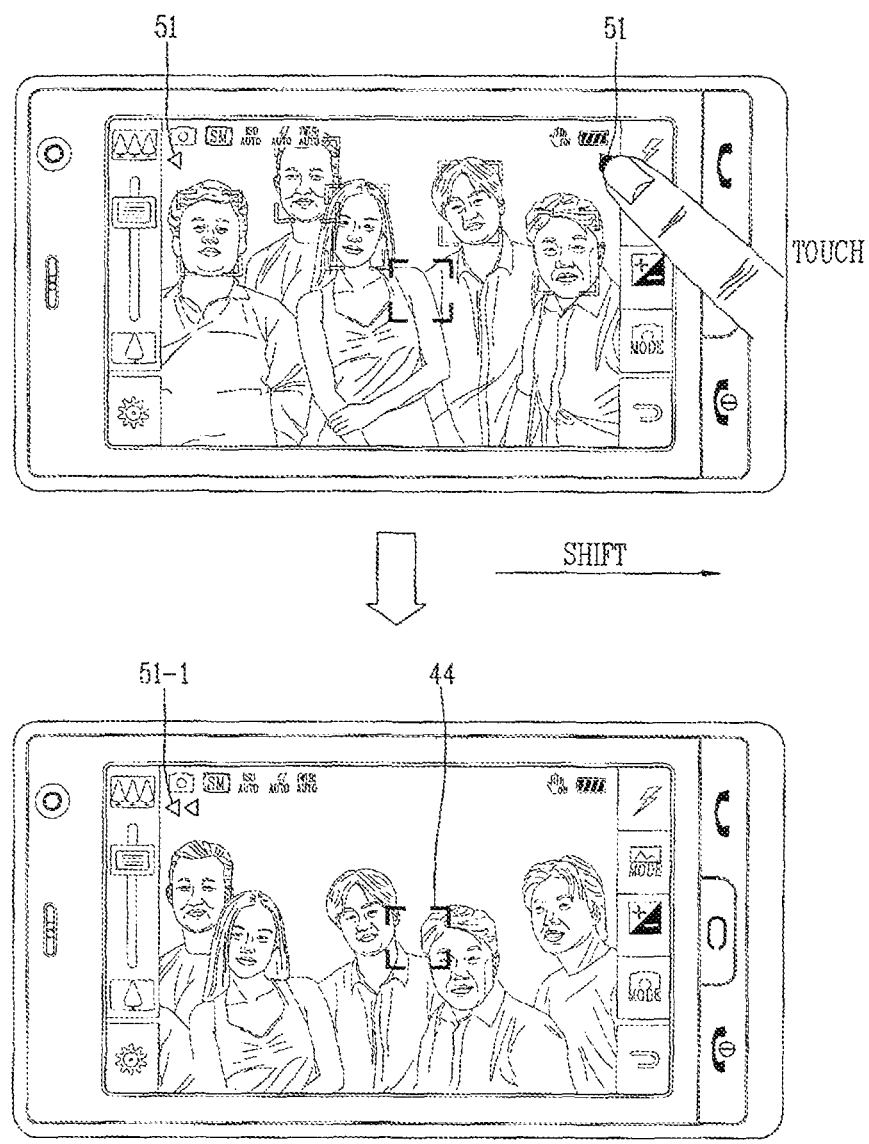

FIG. 21
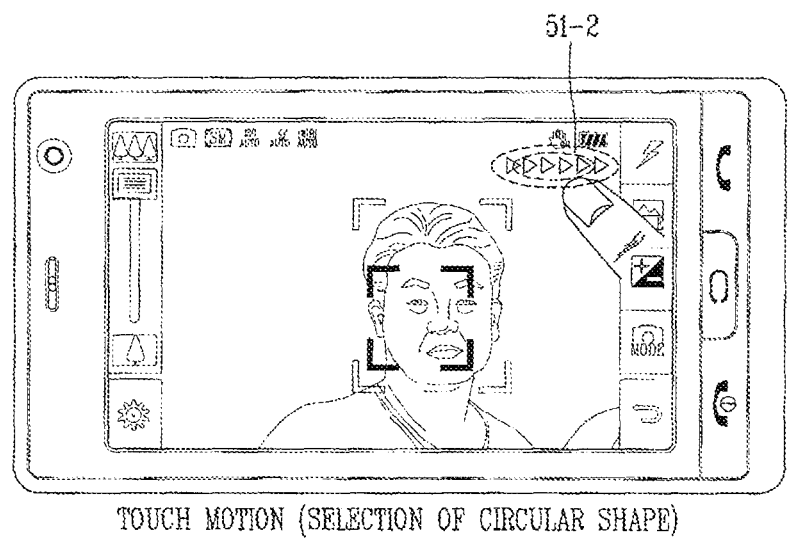
TOUCH MOTION (SELECTION OF CIRCULAR SHAPE)
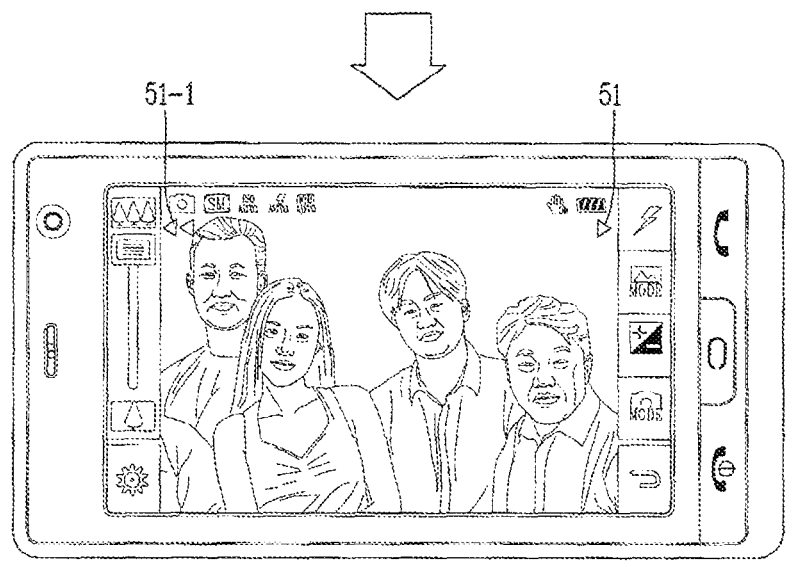

MOBILE TERMINAL AND CAMERA IMAGE CONTROL METHOD THEREOF

CROSS REFERENCE TO RELATED APPLICATIONS

The present application claims priority to Korean Application Nos. 10-2009-0001230 filed in Korea on Jan. 7, 2009, and 10-2009-0024750 filed on Mar. 24, 2009, the entire contents of which are hereby incorporated by reference in their entirety.

BACKGROUND OF THE INVENTION

1. Field of the Invention

The present invention relates to mobile terminal and corresponding method for capturing images.

2. Description of the Related Art

A mobile terminal may be configured to perform diverse functions such as data and voice communication functions, capturing photo or video images through a camera on the terminal, playing video or music files, playing games, recording voice messages, etc. Thus, mobile terminals have become multimedia players. However, because the mobile terminal is generally small in size, the user interface is also displayed with small size font, etc. This makes it difficult for the user to operate the mobile terminal. A user also now takes many photographs, but the user interface for operating the camera functions is limited in nature.

SUMMARY OF THE INVENTION

Accordingly, one object of the present invention is to address the above-noted and other problems.

Another object of the present invention is to provide various user interfaces that can be conveniently used by a user on a pre-view screen image.

Yet another object of the present invention is to effectively display and control an image according to camera zooming operation on a preview screen image.

To achieve these and other advantages and in accordance with the purpose of the present invention, as embodied and broadly described herein, the present invention provides in one aspect a method of controlling a mobile terminal. The method includes displaying, via a display on the mobile terminal, a captured or a preview image in a first display portion, displaying, via the display, the same captured or a preview image in a second display portion, zooming, via a controller on the mobile terminal, the captured or preview image displayed in the first display portion, and displaying, via the display, a zoom guide on the image displayed in the second display portion that identifies a zoomed portion of the image displayed in the first display portion.

In another aspect, the present invention includes a method of controlling a mobile terminal, and which includes displaying, via a display on the mobile terminal, a captured or a preview image in a first display portion, recognizing, via a controller on the mobile terminal, at least first and second faces included in the captured or preview image, displaying, via the display, a first face included in said at least first and second faces, in a second display portion, receiving a shifting signal indicating a shifting of the first face in the second display portion, and displaying, via the display, the second face of said at least first and second faces in the second display portion based on the received shifting signal.

In another aspect, the present invention provides a mobile terminal including a first display portion configured to display a captured or a preview image, a second display portion configured to display the same captured or a preview image, and a controller configured to zoom the captured or preview image displayed in the first display portion, and control the second display portion to display a zoom guide on the image displayed in the second display portion that identifies a zoomed portion of the image displayed in the first display portion.

In still another aspect, the present invention provides a mobile terminal including a first display portion configured to display a captured or a preview image in a first display portion, a controller configured to recognize at least first and second faces included in the captured or preview image, and a second display portion configured to display a first face included in said at least first and second faces. Further, the controller is further configured to receive a shifting signal indicating a shifting of the first face in the second display portion, and to display the second face of said at least first and second faces in the second display portion based on the received shifting signal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 9 is an overview of display screens illustrating controlling a camera image of a mobile terminal with a certain lapse of time according to an embodiment of the present invention;

FIGS. 12A to 12E are overviews of display screens illustrating shifting a zoomed image of a mobile terminal using a mini-map according to an embodiment of the present invention;

FIG. 15 is an overview of display screens illustrating controlling a zoomed image of a mobile terminal using a face recognition process according to an embodiment of the present invention;

FIG. 17 is an overview of display screens illustrating shifting a central position of a zoomed image such that a corresponding face recognition region appears when notification information is touched according to an embodiment of the present invention;

FIG. 21 is an overview of display screens illustrating shifting a zoomed image using a certain touch motion according to an embodiment of the present invention;

DETAILED DESCRIPTION OF THE INVENTION

Reference will now be made in detail to the preferred embodiments of the present invention, examples of which are illustrated in the accompanying drawings.

Figure 1:
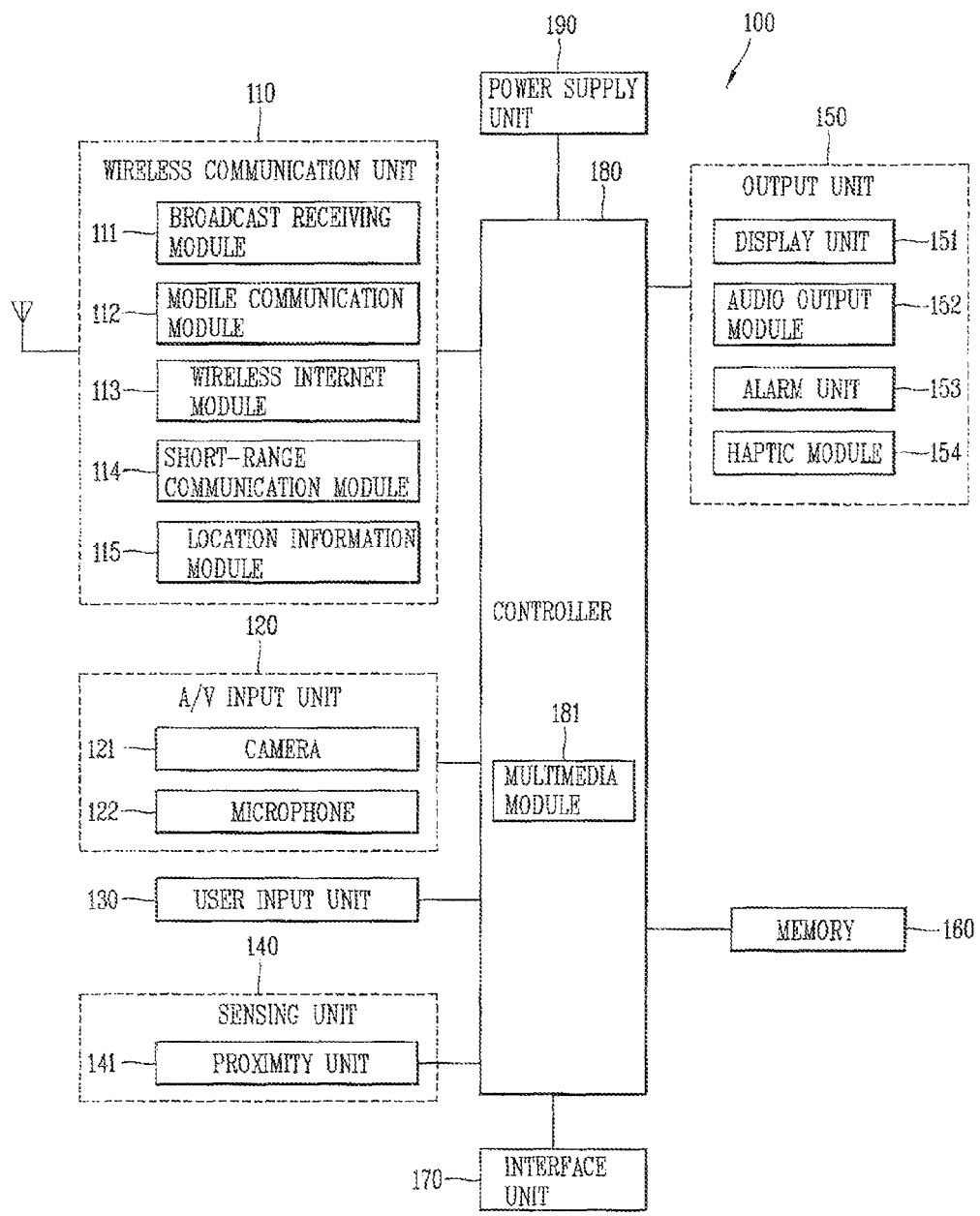
FIG. 1 is a schematic block diagram of a mobile terminal implementing an embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190.

In addition, the radio communication unit 110 includes at least one module that enables radio communication between the mobile terminal 100 and a radio communication system or between the mobile terminal 100 and a network in which the mobile terminal 100 is located. For example, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Also, the broadcasting channel can include a satellite channel and a terrestrial channel, and the broadcasting management server can be a server that generates and transmits broadcasting signals and/or broadcasting related information or a server that receives previously created broadcasting signals and/or broadcasting related information and transmits the broadcasting signals and/or broadcasting related information to a terminal.

Further, the broadcasting signals can include not only TV broadcasting signals, radio broadcasting signals and data broadcasting signals, but also signals in the form of a combination of a TV broadcasting signal and a radio broadcasting signal. In addition, the broadcasting related information can be information on a broadcasting channel, a broadcasting program or a broadcasting service provider, and can be provided even through a mobile communication network. In the latter case, the broadcasting related information can be received by the mobile communication module 112.

Also, the broadcasting related information can exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system. In addition, the broadcasting receiving module 111 receives broadcasting signals using various broadcasting systems. Particularly, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (Media-FLO) system, the DVB-H and integrated services digital broadcast-terrestrial (ISDB-T) systems, etc. The broadcasting receiving module 111 can also be constructed to be suited to broadcasting systems providing broadcasting signals other than the above-described digital broadcasting systems.

Further, the broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and reception of text/multimedia messages.

In addition, the wireless Internet module 113 corresponds to a module for wireless Internet access and can be included in the mobile terminal 100 or externally attached to the mobile terminal 100. A wireless LAN (WLAN) (Wi-Fi), wireless broadband (Wibro), world interoperability for microwave access (Wimax), high speed downlink packet access (HSDPA) and so on can be used as a wireless Internet technique. Also, the local area communication module 114 corresponds to a module for local area communication. Further, bluetooth, radio frequency identification (RFID), infrared data association (IrDA), ultra wideband (UWB) and Zig-Bee can be used as a local area communication technique.

The position information module 115 confirms or obtains the position of the mobile terminal. In more detail, a global positioning system (GPS) module is a representative example of the position information module 115. In addition, the GPS module 115 can calculate information on distances between one point or object and at least three satellites and information on the time when the distance information is measured and apply trigonometry to the obtained distance information to obtain three-dimensional position information on the point or object according to the latitude, longitude and altitude at a predetermined time. Furthermore, a method of calculating position and time information using three satellites and correcting the calculated position and time information using another satellite can also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. Further, the processed image frames can be displayed on a display unit 151. Also, the image frames processed by the camera 121 can be stored in the memory 160 or transmitted to an external device through the radio communication unit 110. The mobile terminal 100 can also include at least two cameras. The microphone 122 receives an external audio signal in a call mode, a recording mode or a speed recognition mode and processes the received audio signal into electric audio data.

The audio data can then be converted into a form that can be transmitted to a mobile communication base station through the mobile communication module 112 and output in the call mode. Further, the microphone 122 can employ various noise removal algorithms for removing noise generated when the external audio signal is received. In addition, the user input unit 130 receives input data for controlling the operation of the terminal from a user. The user input unit 130 can include a keypad, a dome switch, a touch pad (constant voltage/capacitance), jog wheel, jog switch and so on.

Also, the sensing unit 140 senses the current state of the mobile terminal 100, such as an open/close state of the mobile terminal 100, the position of the mobile terminal 100, whether a user touches the mobile terminal 100, the direction of the mobile terminal 100 and the acceleration/deceleration of the mobile terminal 100, and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 also include a proximity sensor 141.

In more detail, the proximity sensor 141 can be located in an internal region of the mobile terminal 100, surrounded by the touch screen, or near the touch screen. The proximity sensor 141 senses an object approaching a predetermined sensing face or an object located near the proximity sensor 141 using an electromagnetic force or infrared rays without having mechanical contact. Further, the proximity sensor 141 has a lifetime longer than that of a contact sensor and thus has a wide application in the mobile terminal 100.

In addition, the proximity sensor 141 includes a transmission type photo-electric sensor, a direct reflection type photo-electric sensor, a mirror reflection type sensor, a high-frequency oscillating proximity sensor, a capacitive proximity sensor, a magnetic proximity sensor, an infrared proximity sensor, etc. Further, a capacitive touch screen is constructed such that proximity of a pointer is detected through a variation in an electric field according to the proximity of the pointer. In this instance, the touch screen (touch sensor) can be classified as a proximity sensor.

For convenience of explanation, the action of the pointer approaching the touch screen without actually touching the touch screen is referred to as a "proximity touch" and an action of bringing the pointer into contact with the touch screen is referred to as a "contact touch" in the following description. In addition, the proximity touch point of the pointer on the touch screen corresponds to a point of the touch screen to which the pointer touches the touch screen.

Further, the proximity sensor 141 senses the proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can then be displayed on the touch screen.

In addition, the output unit 150 generates visual, auditory or tactile output and includes the display unit 151, an audio output module 152, an alarm 153 and a haptic module 154. Further, the display unit 151 displays information processed by the mobile terminal 100. For example, the display unit 151 displays a user interface (UI) or graphic user interface (GUI) related to a telephone call when the mobile terminal is in the call mode. The display unit 151 also displays a captured or/and received image, UI or GUI when the mobile terminal 100 is in the video telephony mode or the photographing mode.

In addition, the display unit 151 can include at least one of a liquid crystal display, a thin film transistor liquid crystal display, an organic light-emitting diode display, a flexible display and a three-dimensional display. Further, some of these displays can be of a transparent type or a light transmission type. That is, the display unit 151 can include a transparent display.

In more detail, the transparent display includes a transparent liquid crystal display. Further, the rear structure of the display unit 151 can also be of the light transmission type. Accordingly, a user can see an object located behind the body of the mobile terminal 100 through the transparent area of the body of the mobile terminal 100, which is occupied by the display unit 151.

The mobile terminal 100 can also include at least two display units 151. For example, the mobile terminal 100 can include a plurality of displays that are arranged on a single face at a predetermined distance or integrated displays. The plurality of displays can also be arranged on different sides.

In addition, when the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

Further, the touch sensor can be constructed to convert a variation in pressure applied to a specific portion of the display unit 151 or a variation in capacitance generated at a specific portion of the display unit 151 into an electric input signal. The touch sensor can also be constructed to sense pressure of touch as well as the position and area of the touch.

Also, when the user applies touch input to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Also, the audio output module 152 can output audio data received from the radio communication unit 110 or stored in the memory 160 in a call signal receiving mode, a telephone call mode or a recording mode, a speech recognition mode and a broadcasting receiving mode. Further, the audio output module 152 outputs audio signals related to functions (for example, a call signal incoming tone, a message incoming tone, etc.) performed in the mobile terminal 100. The audio output module 152 can include a receiver, a speaker, a buzzer, etc.

In addition, the alarm 153 outputs a signal for indicating the generation of an event of the mobile terminal 100. For example, alarms can be generated when receiving a call signal, receiving a message, inputting a key signal, inputting touch, etc. The alarm 153 can also output signals in forms different from video signals or audio signals, for example, a signal for indicating generation of an event through vibration. The video signals or the audio signals can be also output through the display unit 151 or the audio output module 152.

Also, the haptic module 154 generates various haptic effects that the user can feel. One representative example of the haptic effects is vibration. The intensity and pattern of vibration generated by the haptic module 154 can also be controlled. For example, different vibrations can be combined and output or can be sequentially output. Further, the haptic module 154 can generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations. The haptic module 154 can also not only transmit haptic effects through direct contact but also allow the user to feel haptic effects through a kinesthetic sense of the user's fingers or arms. The mobile terminal 100 can also include multiple haptic modules 154.

In addition, the memory 160 can store a program for the operation of the controller 180 and temporarily store input/output data (for example, phone book, messages, still images, moving images, etc.). The memory 160 can also store data about vibrations and sounds in various patterns, which are output from when a touch input is applied to the touch screen. Further, the memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

The interface 170 serves as a path to external devices connected to the mobile terminal 100. Further, the interface 170 receives data from the external devices or power and transmits the data or power to the internal components of the mobile terminal 100 or transmits data of the mobile terminal 100 to the external devices. Also, the interface 170 can include a wired/wireless headset port, an external charger port, a wired/wireless data port, a memory card port, a port for connecting a device having a user identification module, an audio I/O port, a video I/O port, an earphone port, etc., for example.

In addition, the interface 170 can also interface with a user identification module that is a chip that stores information for authenticating the authority to use the mobile terminal 100. For example, the user identification module can be a user identify module (UIM), a subscriber identify module (SIM) and a universal subscriber identify module (USIM). An identification device including the user identification module can also be manufactured in the form of a smart card. Accordingly, the identification device can be connected to the mobile terminal 100 through a port of the interface 170.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal is correctly set in the cradle.

In addition, the controller 180 controls the overall operations of the mobile terminal. For example, the controller 180 performs control and processing for voice communication, data communication and video telephony. As shown in FIG. 1, the controller 180 also includes a multimedia module 181 for playing multimedia. Also, the multimedia module 181 can be included in the controller 180 as shown in FIG. 1 or can be separated from the controller 180. Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Figure 2A:
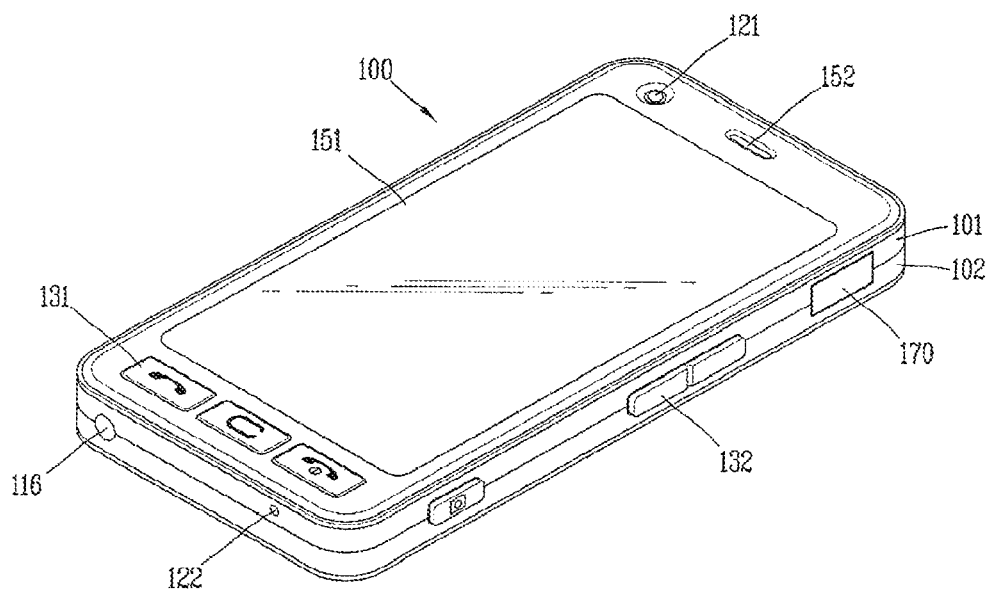
FIG. 2A is a front perspective view of a mobile terminal implementing an embodiment of the present invention.

Next, FIG. 2A is a front perspective view of the mobile terminal 100 according to an embodiment of the present invention. In this example, the mobile terminal 100 is a bar type terminal body. However, the present invention is not limited to a bar type terminal and can be applied to terminals of various types including slide type, folder type, swing type and swivel type terminals.

In addition, the terminal body includes a case (a casing, a housing, a cover, etc.) forming the exterior of the terminal 100. In the present embodiment, the case is divided into a front case 101 and a rear case 102. Further, various electronic components are arranged in the space formed between the front case 101 and the rear case 102. At least one middle case can also be additionally arranged between the front case 101 and the rear case 102. Also, the cases can be formed of plastics through injection molding or made of a metal material such as stainless steel (STS) or titanium (Ti).

As shown in FIG. 2A, the display unit 151, the audio output unit 152, the camera 121, user input units 131 and 132, the microphone 122 and the interface 170 are arranged in the terminal body, specifically, in the front case 101. In addition, the display unit 151 occupies most of the main face of the front case 101. Further, the audio output unit 152 and the camera 121 are arranged in a region in proximity to one of both ends of the display unit 151. Also, the user input unit 131 and the microphone 122 are located in a region in proximity to the other end of the display unit 151. The user input unit 132 is arranged with the interface 170 on the sides of the front case 101 and the rear case 102.

Thus, in this embodiment, the user input unit 130 includes multiple operating units 131 and 132 that are operated to receive commands for controlling the operation of the handheld terminal 100. Further, the operating units 131 and 132 can be referred to as manipulating portions and employ any tactile manner in which a user operates the operating units 131 and 132 while producing a tactile feeling. Also, the operating units 131 and 132 can receive various inputs. For example, the operating unit 131 receives commands such as start and end call commands, and the operating unit 132 receives commands such as to control the volume of the sound output from the audio output unit 152 or to convert the display unit 151 into a touch recognition mode.

Figure 2B:
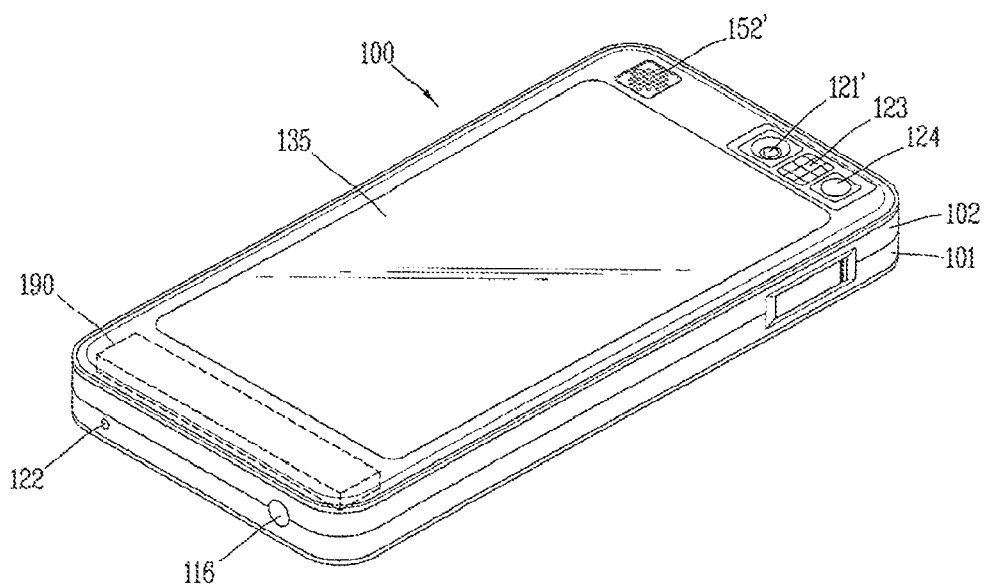
FIG. 2B is a rear perspective view of a mobile terminal implementing an embodiment of the present invention.

Next, FIG. 2B is a rear perspective view of the mobile terminal 100 shown in FIG. 2A according to an embodiment of the present invention. As shown in FIG. 2B, a camera 121' is additionally attached to the rear side of the terminal body, that is, the rear case 102. In this configuration, the camera 121' has a photographing direction that is opposite to that of the camera 121 shown in FIG. 2A and can have pixels different from those of the camera 121 shown in FIG. 2A. Further, the camera 121 preferable produces a lower pixel image such that it can capture an image of the face of a user and transmit the image to a receiving part during video telephony, while the camera 121' produces a higher pixel image such that it can capture an image of a general object and does not immediately transmit the image in many situations. The cameras 121 and 121' can also be attached to the terminal body such that they can be rotated or popped-up.

As shown in FIG. 2B, a flash bulb 123 and a mirror 124 are additionally arranged in proximity to the camera 121'. The flash bulb 123 lights an object when the camera 121' takes a picture of the object, and the mirror 124 is used for the user to look at his or her face when the user wants to take a picture of themselves using the camera 121'. An audio output unit 152' is also additionally provided on the rear side of the terminal body. In this embodiment, the audio output unit 152' can achieve a stereo function with the audio output unit 152 shown in FIG. 2A and be used in a speaker phone mode when the terminal is used for a telephone call.

A broadcasting signal receiving antenna can also be additionally attached to a side of the terminal body in addition to an antenna for telephone calls. The antenna forming a part of the broadcasting receiving module 111 shown in FIG. 1 can be set in the terminal body such that the antenna can be pulled out of the terminal body. In addition, the power supply 190 for providing power to the handheld terminal 100 is set in the terminal body, and can be included in the terminal body or detachably attached to the terminal body. FIG. 2B also illustrates a touch pad 135 for sensing touch additionally attached to the rear case 102 of the terminal 100. Further, the touch pad 135 can be a light transmission type as the display unit 151. In this instance, when the display unit 151 outputs visual information through both sides, the visual information can be recognized through the touch pad 135.

Also, the information output through both sides of the display unit 151 can be controlled by the touch pad 135. In addition, a display can be additionally attached to the touch pad 135 such that a touch screen can be arranged even in the rear case 102. Further, the touch pad 135 operates in connection with the display unit 151 of the front case 101, and can be located in parallel with the display unit 151 behind the display unit 151. The touch panel 135 can also be identical to or smaller than the display unit 151 in size.

Figure 3A:
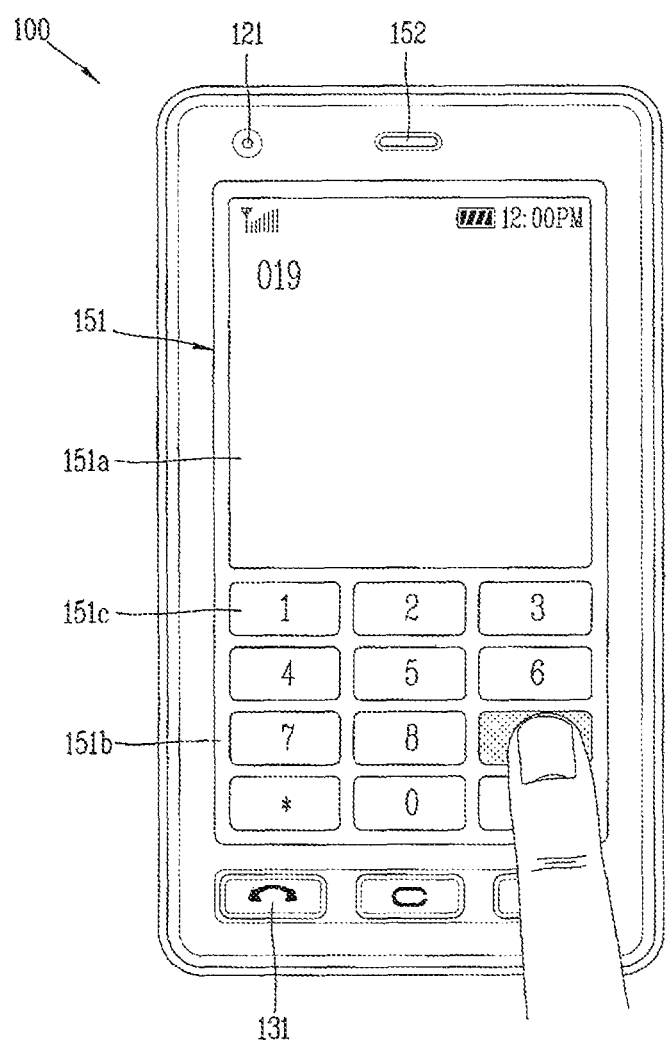
FIGS. 3A and 3B are front views of the mobile terminal for explaining operational states of the mobile terminal according to an embodiment of the present invention.
Figure 3B:
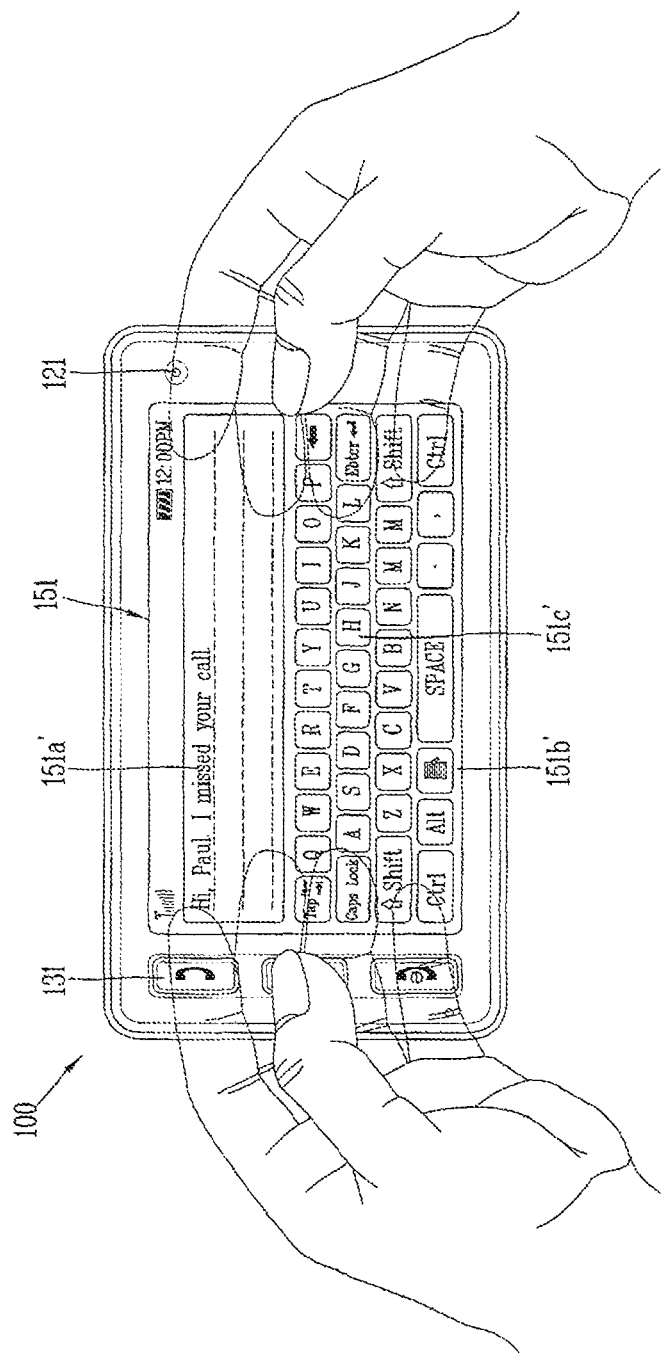

The interoperations of the display unit 151 and the touch pad 135 will now be described with reference to FIGS. 3A and 3B. In more detail, FIGS. 3A and 3B are front views of the handheld terminal 100 and are used for explaining an operating state of the mobile terminal 100 according to an embodiment of the present invention. The display unit 151 can display various types of visual information in the form of characters, numerals, symbols, graphic or icons. To input the information, at least one of the characters, numerals, symbols, graphic and icons are displayed in predetermined arrangement in the form of a keypad. Also, the keypad can be referred to as a 'soft key' keypad.

Further, FIG. 3A shows that touch applied to a soft key is input through the front side of the terminal body. The display unit 151 can be a single area or can be divided into a plurality of regions. In the latter instance, the display unit 151 is constructed such that the plurality of regions interoperate with each other. For example, and as shown in FIG. 3A, an output region 151a and an input region 151b are respectively displayed in upper and lower parts of the display unit 151. The input region 151b displays soft keys 151c that represent numerals used to input numbers such as telephone numbers. Thus, when a soft key 151c is touched, a numeral corresponding to the touched soft key is displayed on the output region 151a. Further, when the user operates the first operating unit 131, a connection of a call corresponding to a telephone number displayed on the output region 151a is attempted.

Next, FIG. 3B is an overview of the mobile terminal 100 showing that touch applied to soft keys is input through the rear side of the terminal body. FIG. 3B also shows the landscape of the terminal body while FIG. 3A shows the portrait of the terminal body. In addition, the display unit 151 is constructed such that an output image is converted according to the direction in which the terminal body is located. Further, FIG. 3B shows the operation of the handheld terminal in a text input mode. As shown, the display unit 151 includes the touch pad display 135 having an output region 135a and an input region 135b. A plurality of soft keys 135c indicating at least one of characters, symbols and numerals are also arranged in the input region 135b. Further, in this embodiment, the soft keys 135c are arranged in the form of qwerty keys.

Thus, when the soft keys 135c are touched through the touch pad 135, the characters, numerals and symbols corresponding to the touched soft keys 135c are displayed on the output region 135a. Touch input through the touch pad 135 can prevent the soft keys 135c from being covered with the user's fingers when the soft keys 135c are touched as compared to touch input through the display unit 151. Further, when the display unit 151 and the touch pad 135 are transparent, the user can see his or her fingers located behind the terminal body, and thus can select items by touching the backside or surface of the displayed keys 135c.

In addition, the user can scroll information on the display unit 151 or the touch pad 135 so as to move an object displayed on the display unit 151, for example, by using a cursor or a pointer located on an icon. Also, when the user moves his or her finger on the display unit 151 or the touch pad 135, the controller 180 can visually display the user's finger moving path on the display unit 151. This is useful to edit an image displayed on the display unit 151. Also, when the display unit 151 (touch screen) and the touch pad 135 are simultaneously touched within a predetermined period of time, a specific function of the terminal can be executed. For example, the user can clamp the terminal body using their thumb and index finger. This specific function can include activating or deactivating the display unit 151 or the touch pad 135, for example.

Figure 4:
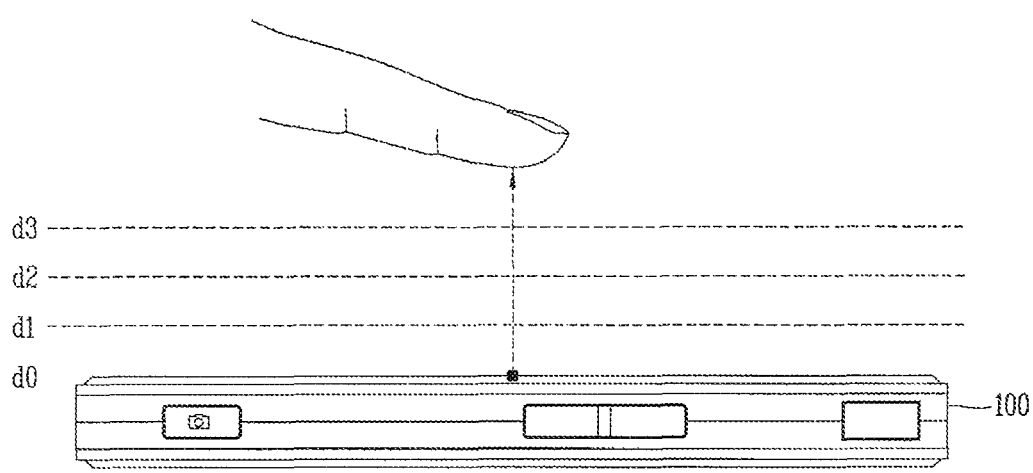
FIG. 4 is a conceptual view for explaining a proximity depth of a proximity sensor according to an embodiment of the present invention.

The proximity sensor 141 described with reference to FIG. 1 will now be explained in more detail with reference to FIG. 4. That is, FIG. 4 is a conceptual diagram used for explaining a proximity depth of the proximity sensor 141. As shown in FIG. 4, when a pointer such as a user's finger approaches the touch screen, the proximity sensor 141 located inside or near the touch screen senses the approach and outputs a proximity signal. Further, the proximity sensor 141 can be constructed such that it outputs a proximity signal according to the distance between the pointer approaching the touch screen and the touch screen (referred to as "proximity depth").

Also, the distance in which the proximity signal is output when the pointer approaches the touch screen is referred to as a detection distance. The proximity depth can be determined using a plurality of proximity sensors having different detection distances and comparing proximity signals respectively output from the proximity sensors. FIG. 4 shows the section of the touch screen in which proximity sensors capable of sensing three proximity depths are arranged. Of course, proximity sensors capable of sensing less than three or more than three proximity depths can be arranged in the touch screen.

Thus, as shown in FIG. 4, when the pointer (user's finger in this example) completely comes into contact with the touch screen (D0), the controller 180 recognizes this action as the contact touch. When the pointer is located within a distance D1 from the touch screen, the controller 180 recognizes this action as a proximity touch of a first proximity depth. Similarly, when the pointer is located in a range between the distance D1 and a distance D2 from the touch screen, the controller 180 recognizes this action as a proximity touch of a second proximity depth. When the pointer is located in a range between the distance D2 and a distance D3 from the touch screen, the controller 180 recognizes this action a proximity touch of a third proximity depth. Also, when the pointer is located at longer than the distance D3 from the touch screen, the controller 180 recognizes this action as a cancellation of proximity touch.

Accordingly, the controller 180 can recognize the proximity touch as various input signals according to the proximity distance and proximity position of the pointer with respect to the touch screen and perform various operations according to the input signals.

Figure 5A:
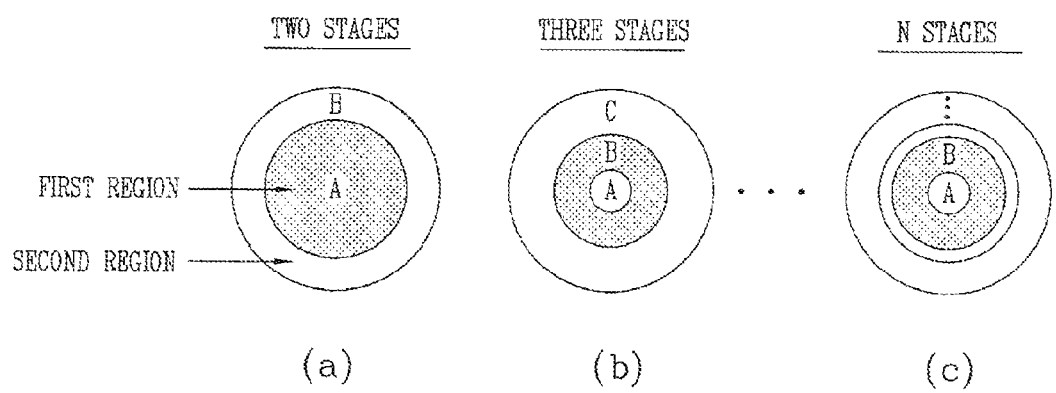
FIG. 5A and FIG. 5B are diagrams for explaining a proximity touch recognizing area for detecting a proximity signal and a haptic area for generating a tactile effect, respectively.
Figure 5B:
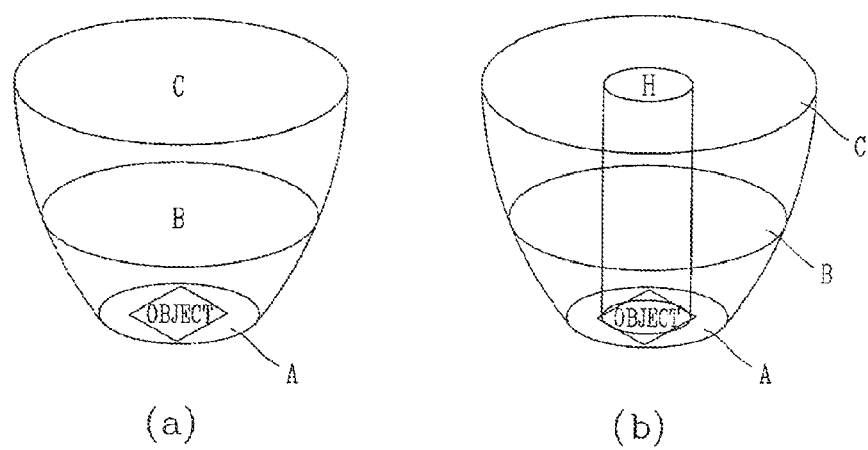

Next, FIGS. 5A and 5B, which are diagrams for describing a proximity touch recognition area and a tactile effect generation region according to an embodiment of the present invention. In particular, FIG. 5A represents an object such as an icon, a menu item and the like in a circle type for clarity and convenience of explanation.

As shown in FIG. 5A(a), the region for displaying an object on the display unit 151 can be divided into a first region A at a central part and a second region B enclosing the first region A. Further, the first and second regions A and B can be configured to generate tactile effects differing from each other in strength or pattern. For instance, the first and second regions can be configured to generate 2-step vibrations by outputting a first vibration if the second region B is touched and by outputting a second vibration greater than the first vibration if the first region A is touched. Also, the haptic region can be different from the proximity touch recognition region. In particular, the haptic region can be set to be narrower or wider than the proximity touch recognition region. For instance, in FIG. 5A (a), the proximity touch recognition region can be set to include both of the first and second regions A and B, and the haptic region can be set to include only the first region A.

Further, as shown in FIG. 5A(b), the region having the object displayed therein can be discriminated into three regions A, B and C. Alternatively, as shown in FIG. 5A(c), the region having the object displayed therein can be discriminated into N regions (N>3). Each of the divided regions can also be set to generate a tactile effect having a different strength or pattern. Further, as discussed above, a region having a single object can be divided into at least three regions, and in which the haptic region and the proximity touch recognition region are set to differ from each other.

Next, FIG. 5B illustrates configuring a size of the proximity touch recognition region of the display 151 to vary according to a proximity depth. In particular, referring to FIG. 5B(a), the proximity touch recognition region is configured to decrease by C→B→A according to the proximity depth for the display 151, and configured to increase by C→B→A according to the proximity depth for the display 151. Further, the haptic region can be set to have a predetermined size, as the region 'H' shown in FIG. 4B(b), regardless of the proximity depth for the display 151. Also, when dividing the object-displayed region for the setting of the haptic region or the proximity touch recognition region, various schemes of horizontal/vertical division, radial division and combinations thereof can be used as well as the concentric circle type division shown in FIG. 5A.

Figure 6:
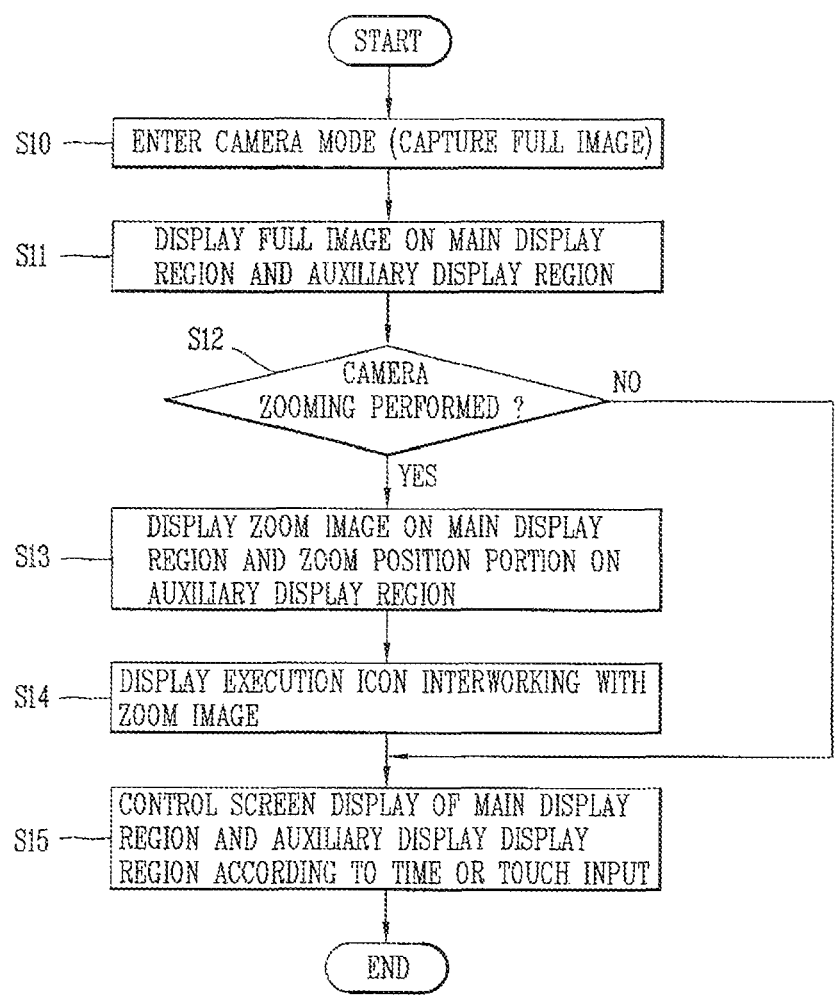
FIG. 6 is a flow chart illustrating a method of controlling a preview image of a mobile terminal using a miniaturized map (mini-map) according to an embodiment of the present invention.

Next, FIG. 6 is a flow chart illustrating a method of controlling a preview image of a mobile terminal using a miniaturized version of the preview image according to an embodiment of the present invention. As shown in FIG. 6, when the user enters a camera mode through key manipulation or a touch input (S10), the controller 180 displays a camera image (e.g., a full image) the camera is detecting via an image sensor as a preview image on a main display region and also displays a miniaturized version of the full image in an auxiliary display region (S11). The displayed full image can be a preview image showing the user a preview of the image he or she is about to capture or an image the user has previously captured. The image can also be a picture downloaded from the Internet, stored in the memory of the terminal, etc. The image can be at least part of video. For example, the image is a still image copied or temporally stopped from video. The image can be replace by a video.

In this state, when the user performs a camera zooming operation on the terminal (Yes in S12), the controller 180 zooms in or out the preview image and displays the zoomed image on the main display region and also displays a current zoom position portion or zoom guide on the auxiliary display region (S13). Also, the controller 180 displays various setting/execution icons interworking with the zoomed image (e.g., scroll bars (horizontal/vertical), etc.) in the form of an on-screen display (OSD) (S14).

Thereafter, in the preview state, the controller 180 controls the display of the zoomed image displayed at the main display region, the miniaturized image at the auxiliary display region and the execution icons according to a touch operation including a proximity touch or a contact touch operation and with a lapse of time (S15). In more detail, the controller 180 displays the preview image, the miniaturized version of the image (hereinafter referred to as the miniaturized image), scroll bars, various setting/execution icons, etc. Thus, in one embodiment, the controller 180 removes particular items after a certain amount of time passes. These features will be discussed in more detail later.

Figure 7:
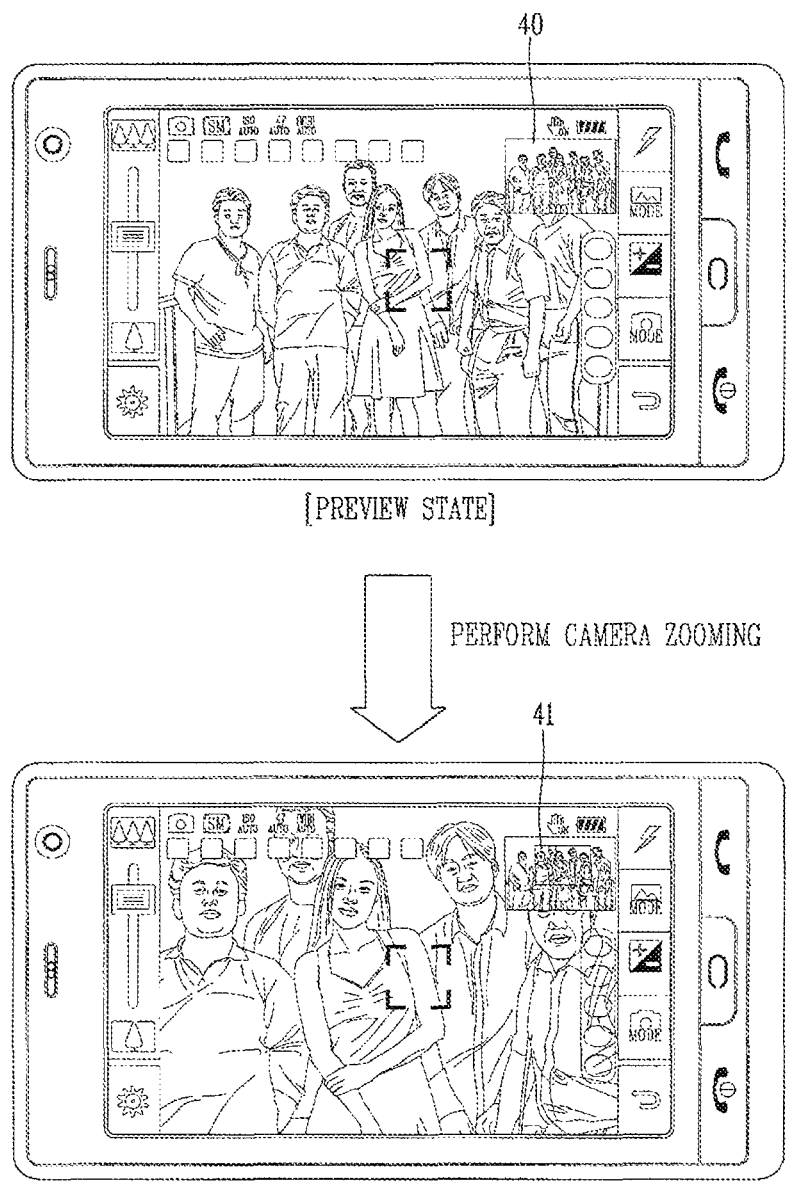
FIG. 7 is an overview of display screens illustrating displaying a mini-map in a zooming operation according to an embodiment of the present invention.

Next, FIG. 7 includes overviews of display screens illustrating controlling a camera image of a mobile terminal when the user performs a zooming operation on a displayed full image according to an embodiment of the present invention. As shown in the top display screen of FIG. 7, when the user enters a camera mode on the terminal, the controller 180 displays a preview full image captured by the image sensor of the camera 121 on the entire display region and also displays a miniaturized image 40 in an overlapping manner on a particular region (i.e., in this example, the right upper portion of the full image). As shown, the miniaturized image 40 is a miniaturized version of the full image. Also, rather than displaying the miniaturized image 40 in an overlapping manner, the controller 180 can display the miniaturized image 40 in a display region that is separated from the full image.

Then, as shown in the lower portion of FIG. 7, the user is performing a zooming operation (in this example, the user is zooming in on the full image). As shown, the controller 180 displays a zoom guide 41 on the miniaturized image 40 corresponding to the currently zoomed portion of the full image. Thus, the user can use the zoom guide 41 on the miniaturized image 40 to maintain a reference with regard to the full image. In more detail, when the user performs a zooming operation without the miniaturized image 40 being displayed, the user quickly looses a sense of the full image because he or she can only view the zoomed portion. To view the full possible image, the user has to zoom back out, which is cumbersome, or look over the mobile terminal at the intended target to get a reference of the entire image.

However, according to an embodiment of the present invention, the user can advantageously view the miniaturized image 40 and the zoom guide 41 to maintain a reference to the full image. The user can then capture the zoomed image once the user feels comfortable by viewing the miniaturized image 40 and the zoom guide 41. For example, in the embodiment shown in FIG. 7, the user has zoomed in on five particular people out of seven total people that the user would like to capture in an image. Thus, once the user has performed the zooming operation, the user can capture the intended target.

Figure 8:
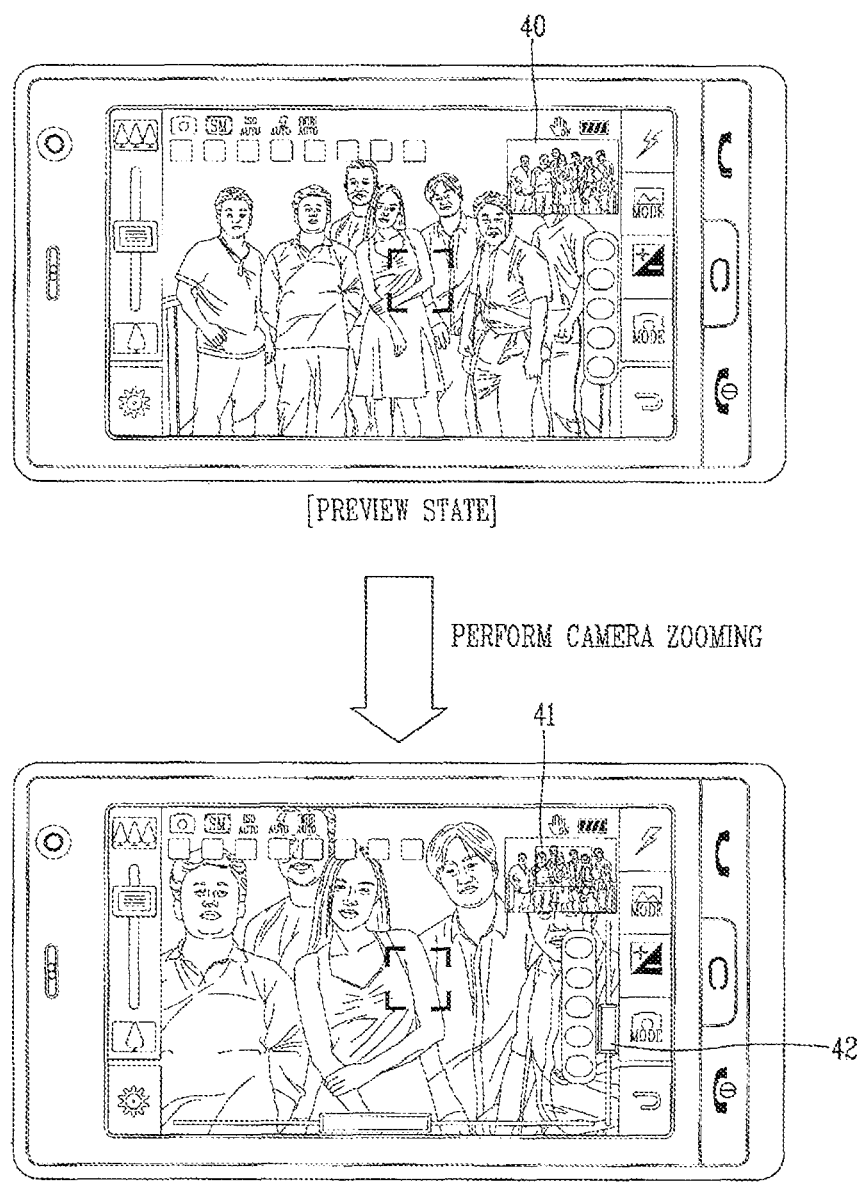
FIG. 8 is an overview of display screens illustrating displaying scrolls bars for scrolling an image in a zooming operation according to an embodiment of the present invention.

Next, FIG. 8 includes an overview of display screens illustrating the controller 180 displaying scroll bars 42 along with the miniaturized image 40. In this example, the scroll bars 42 includes a horizontal and vertical scroll bar displayed in the form of an OSD. The user can then use the scroll bars 42 to scroll the full image and the controller 180 will adjust the zoom guide 41 according to the scrolling operation. Also, rather than displaying the scroll bars 42, the user can use directional keys to scroll the viewed image.

Next, FIG. 9 includes overviews of display screens in which control icons, etc. disappear from the display after a particular amount of time has passed according to an embodiment of the present invention. As shown in the upper portion of FIG. 9, the controller 180 displays the full image captured by the image sensor of the camera 121, the miniaturized image 40 and zoom guide 41 corresponding to the current zoom position, the scroll bars 42 and various setting/execution icons 43 the user can view or select to assist in capturing the final image.

Then, as shown in the lower portion of FIG. 9, when a certain time lapses in the preview state, the controller 180 removes all or some of the displayed miniaturized image 40, the scroll bars 42 and the various setting/execution icons 53. That is, the items disappear from the screen. The lower left portion of FIG. 9 illustrates all items disappearing after a particular amount of time, and the lower right portion of FIG. 9 illustrates only some of the items disappearing. Note that a central position of the zoomed image is identified by reference numeral 44. The user can also set the amount of time that must pass for this feature to occur and set the items that are to disappear after the set time elapses.

Figure 10:
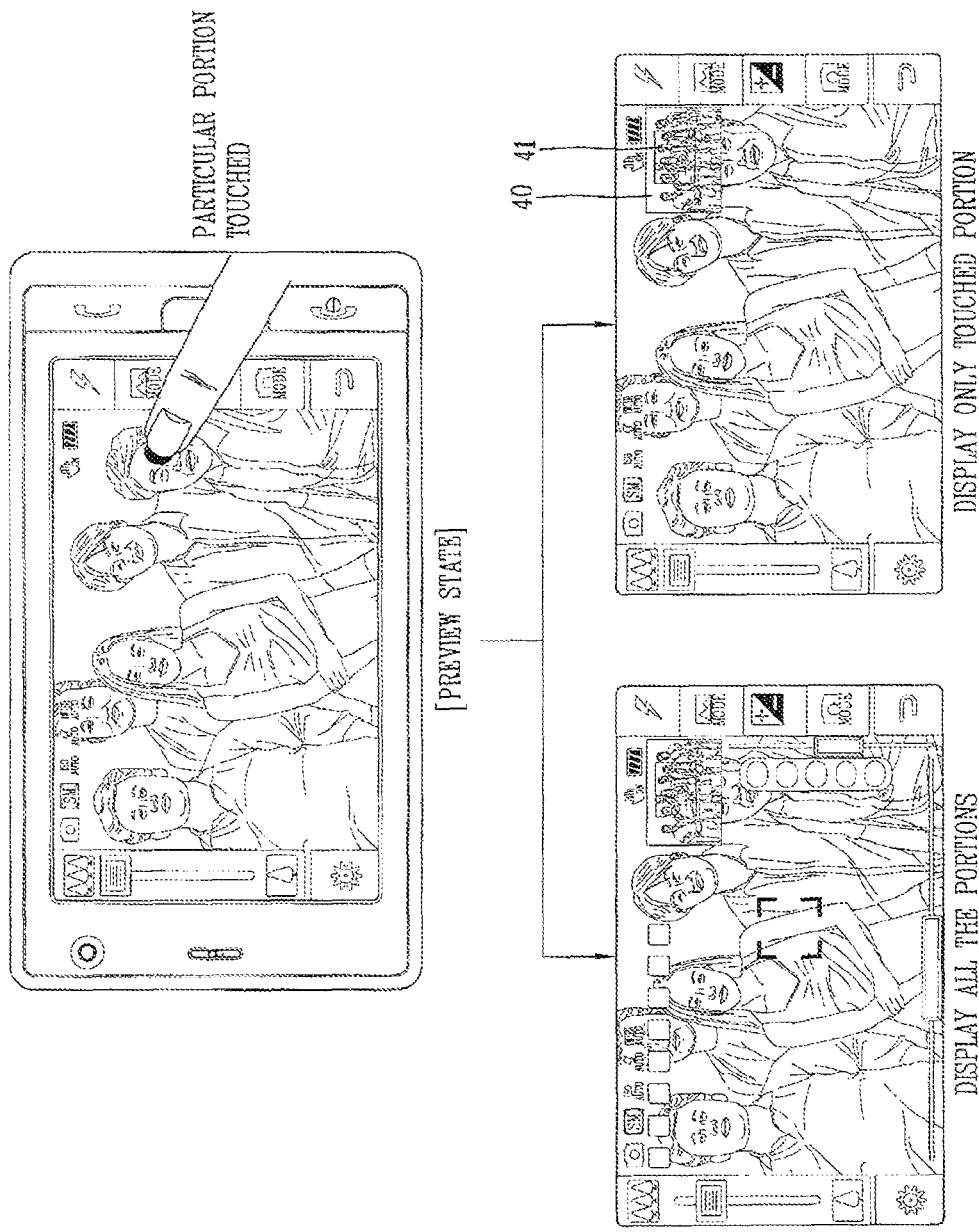
FIG. 10 is an overview of display screens illustrating controlling a camera image of a mobile terminal based on a touch operation according to an embodiment of the present invention.

Next, FIG. 10 includes overviews of display screens in which the controller 180 displays various items on the display based on the user touching a particular portion of the screen according to one embodiment of the present invention. For example, the top portion of FIG. 10 illustrates a situation which is similar to the situation shown in the lower left portion of FIG. 9 (i.e., the miniaturized image 40, the scroll bars 42 and various setting/execution icons 43 not being displayed or having been removed after a certain amount of time lapses). As shown in FIG. 10, when the user touches a particular portion of the screen, the controller 180 can re-display all items that have disappeared or only display items that were displayed in the same or similar position that the user has touched.

For example, the lower left portion of FIG. 10 illustrates the controller 180 re-displaying all of the items that have disappeared, and the lower right portion illustrates only the miniaturized image 40 along with the zoom guide 41 being re-displayed. That is, the user touched the portion of the screen where the miniaturized image 40 was previously displayed, so the controller 180 only displays the items corresponding to where the user touched.

Figure 11:
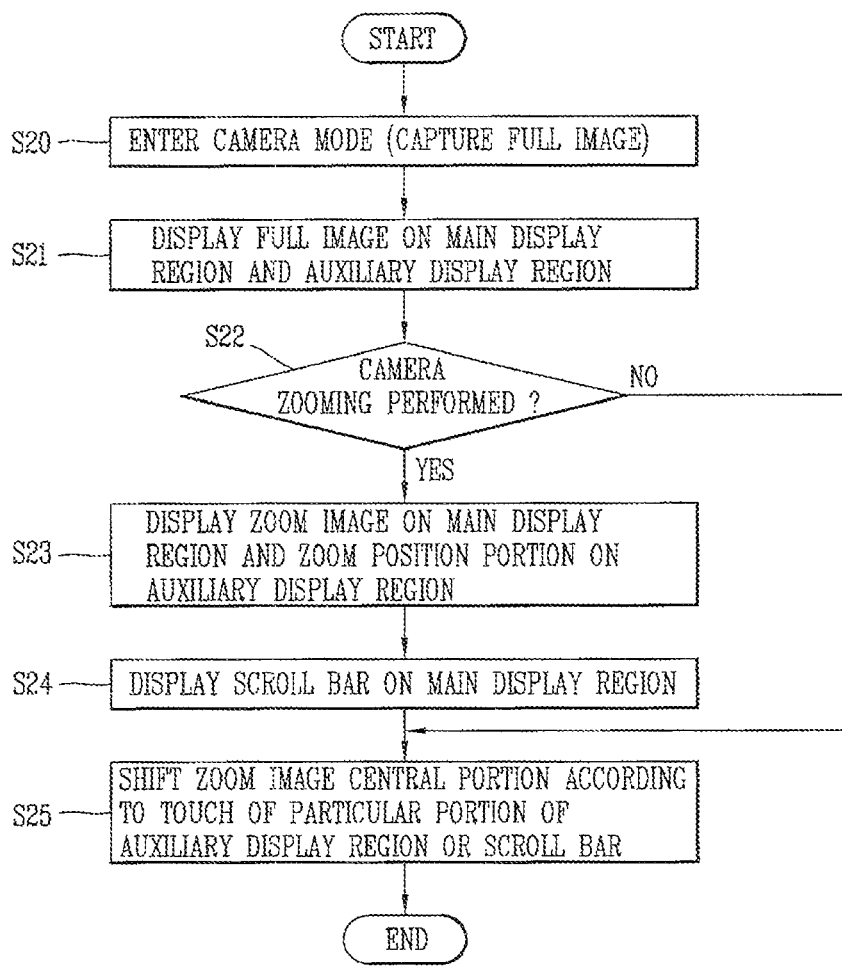
FIG. 11 is a flow chart illustrating a method of controlling a zoomed image of a mobile terminal using a mini-map according to an embodiment of the present invention.

Next, FIG. 11 is a flow chart illustrating a method of controlling a zoomed image according to another embodiment of the present invention. Note that steps S20-S24 are similar to the steps S10-S14 in FIG. 6. In particular, when the user enters a camera mode through key manipulation or a touch input (S20), the controller 180 displays a camera image (e.g., a full image) the camera is detecting via an image sensor as a preview image on a main display region and also displays a miniaturized version of the full image in an auxiliary display region (S21). The displayed full image can be a preview image showing the user a preview of the image he or she is about to capture or an image the user has previously captured. The image can also be a picture downloaded from the Internet, stored in the memory of the terminal, etc.

In this state, when the user performs a camera zooming operation on the terminal (Yes in S22), the controller 180 zooms in or out the preview image and displays the zoomed image on the main display region and also displays a current zoom position portion on the auxiliary display region (S23). Further, the controller 180 also displays horizontal/vertical scroll bars, for example, in the form of an OSD on the zoomed image, and displays various setting/execution icons (S24). Thereafter, in the preview state, when the user touches the miniaturized image, the controller 180 shifts a central position of the zoomed image to display the corresponding touched position on the screen (S25). As discussed previously, the user can also use the scroll bars to scroll or move the zoomed image.

Figure 12C:
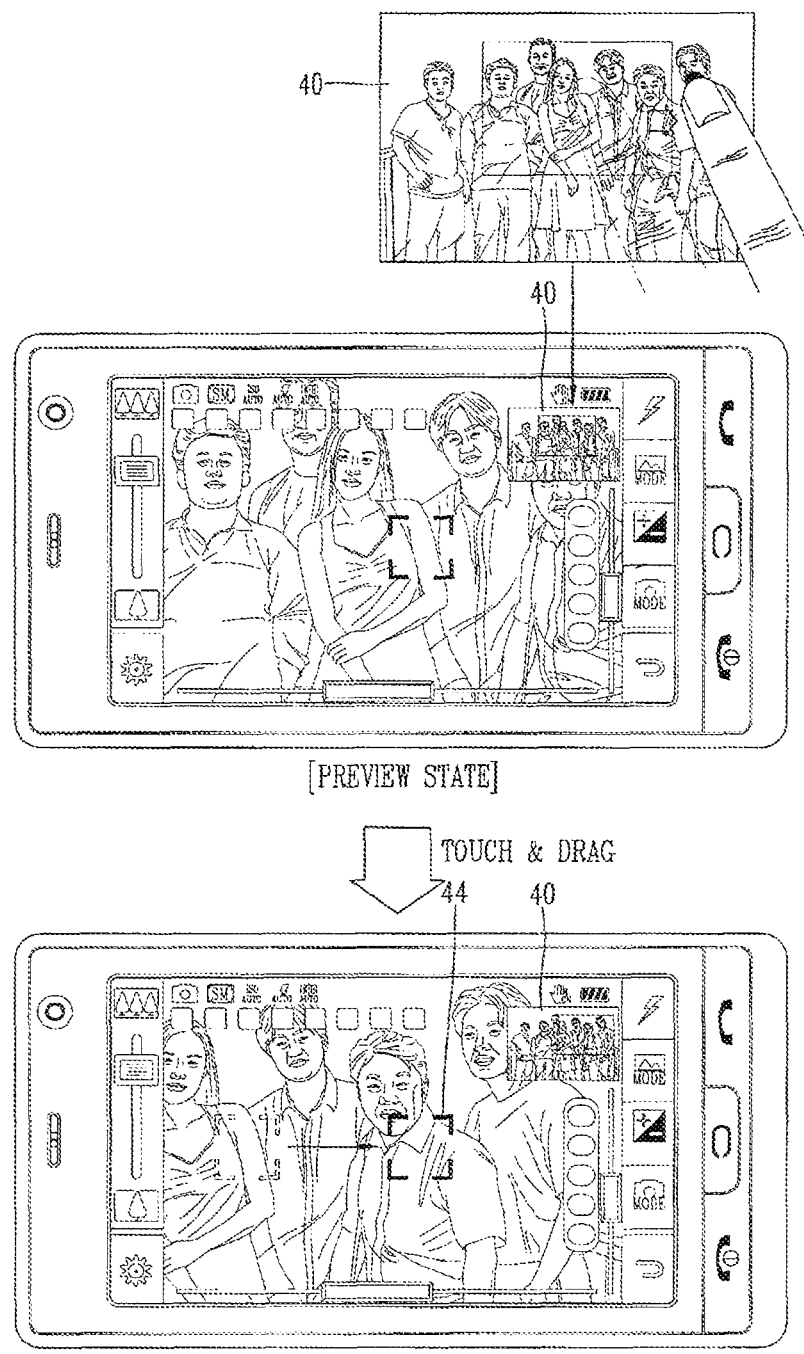

In more detail, FIGS. 12A to 12E include overviews of display screens illustrating an example of shifting the zoomed image based on touch actions according to an embodiment of the present invention. For example, FIG. 12A illustrates the user touching a portion of the miniaturized image 40 that is outside the zoomed area defined by the zoom guide 41, and the controller 180 shifting the zoomed image to include the touched portion.

That is, as shown in the middle portion of FIG. 12A, the controller 180 displays a zoomed image (i.e., zoomed-in image) on the main display region and displays the zoom guide 41 indicating the current zoomed position portion on the miniaturized image 40 on the auxiliary display region. In this state, and as shown in the exploded view of the miniaturized image 40 in the top portion of FIG. 12A, when the user touches a particular region or portion on the miniaturized image 40, the controller 180 shifts a central position of the zoomed image to include the touched portion on the main display region as shown in the lower portion of FIG. 12A. FIG. 12A also illustrates the user touching the miniaturized image 40 for a short amount of time (a short touch). Other preset touch actions can also be used such as a long touch or double touch operation. Accordingly, because the central position is shifted, the zoomed image displayed on the main display region and the zoom guide 41 on the auxiliary display region are all shifted to the right side.

Next, FIG. 12B includes overviews of display screens illustrating the controller 180 maintaining the shifted position of the zoomed image or returning the zoomed image to its original position based on a touching operation performed by the user according to one embodiment of the present invention. In particular, FIG. 12B illustrates the user touching the miniaturized image 40 for a certain amount of time and then releasing the touch. As shown, the zoomed image is shifted to include the touched position and when the user releases the touch action, the controller 180 maintains the current state of the screen display or returns the current state to its original state. The user can also configure the options on the terminal to set which action occurs based on the released touching action. Further, as discussed above, the touching actions including proximity touching actions in which the user doesn't actually touch the screen, but moves their finger (or other object) towards the desired position on the screen.

Next, FIG. 12C includes overviews of display screens illustrating an example of shifting a zoomed image through a touch & drag operating according to an embodiment of the present invention. The operation in FIG. 12C is similar to that illustrated in FIGS. 12A and 12B, except that in FIG. 12C a touch & drag operation is used in place of a touch action. Namely, when the user touch-and-drags a particular region on the miniaturized image 40, the controller 180 shifts the central position of the zoomed image to the dragged point.

Figure 12D:
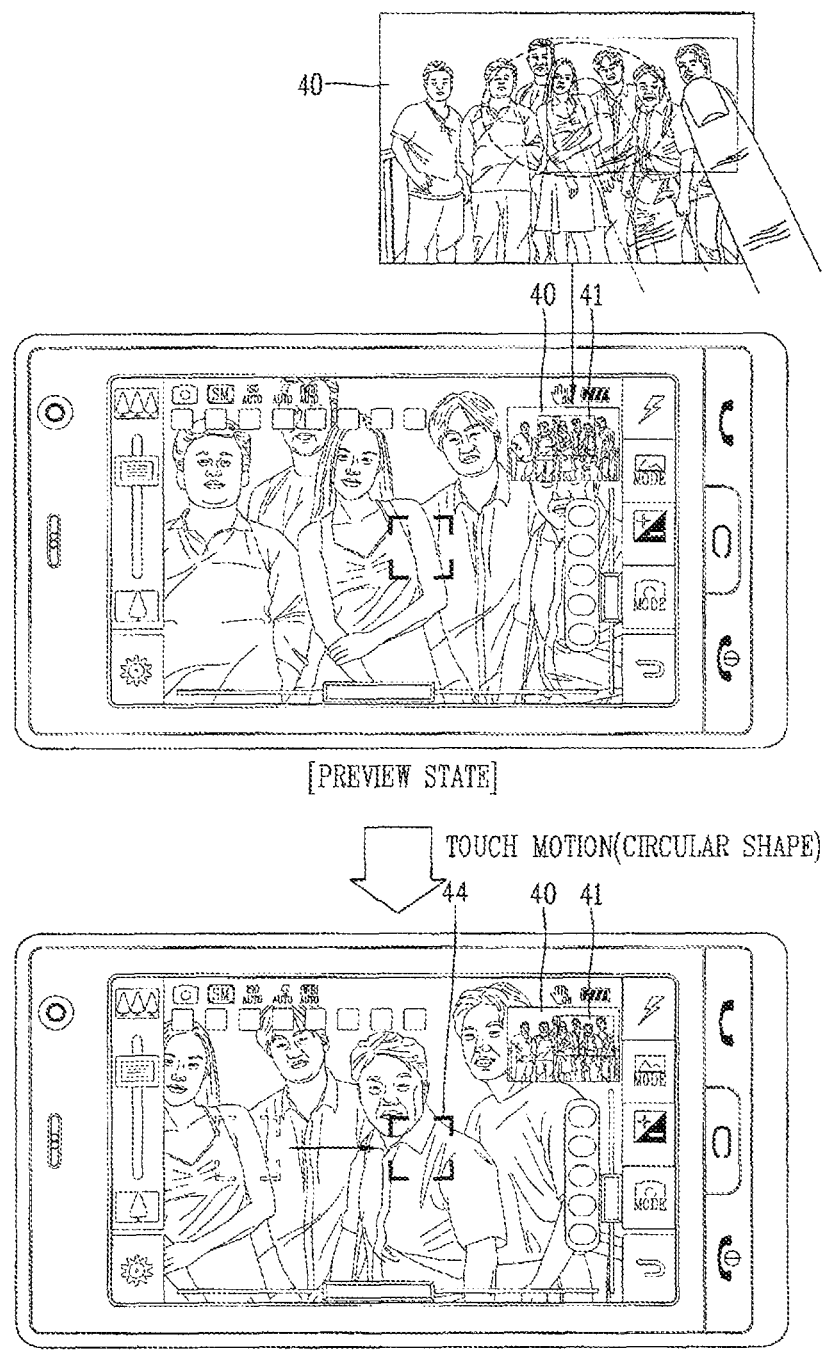

FIG. 12D includes display screens illustrating an example of shifting a zoomed image through a certain touch motion according to an embodiment of the present invention. As shown in FIG. 12D, the controller 180 displays the miniaturized image 40 including the zoom guide 41. In this state, when the user selects a particular person or persons on the miniaturized image 40 through a circular touch motion, the controller 180 shifts the central position of the zoomed image to allow all selected persons or objects included within the circular touch to be displayed on the screen image, and appropriately displays the zoom guide 41 to include the newly zoomed portion. Thus, in this embodiment, the user draws a circular pattern (or other pattern) around the subjects or objects they want displayed in the zoomed portion.

Next, FIG. 12E includes overviews of display screens illustrating the user touching the scroll bar 42 to shift the zoomed image according to an embodiment of the present invention. As shown in FIG. 12E, the user touches and drags the scroll bar 42, and the controller 180 shifts the central position of the zoomed image to correspond with the touch and drag operation performed on the scroll bar 42. As discussed above, the user can also manipulate directional keys instead of touching and dragging the scroll bar 42.

Figure 13:
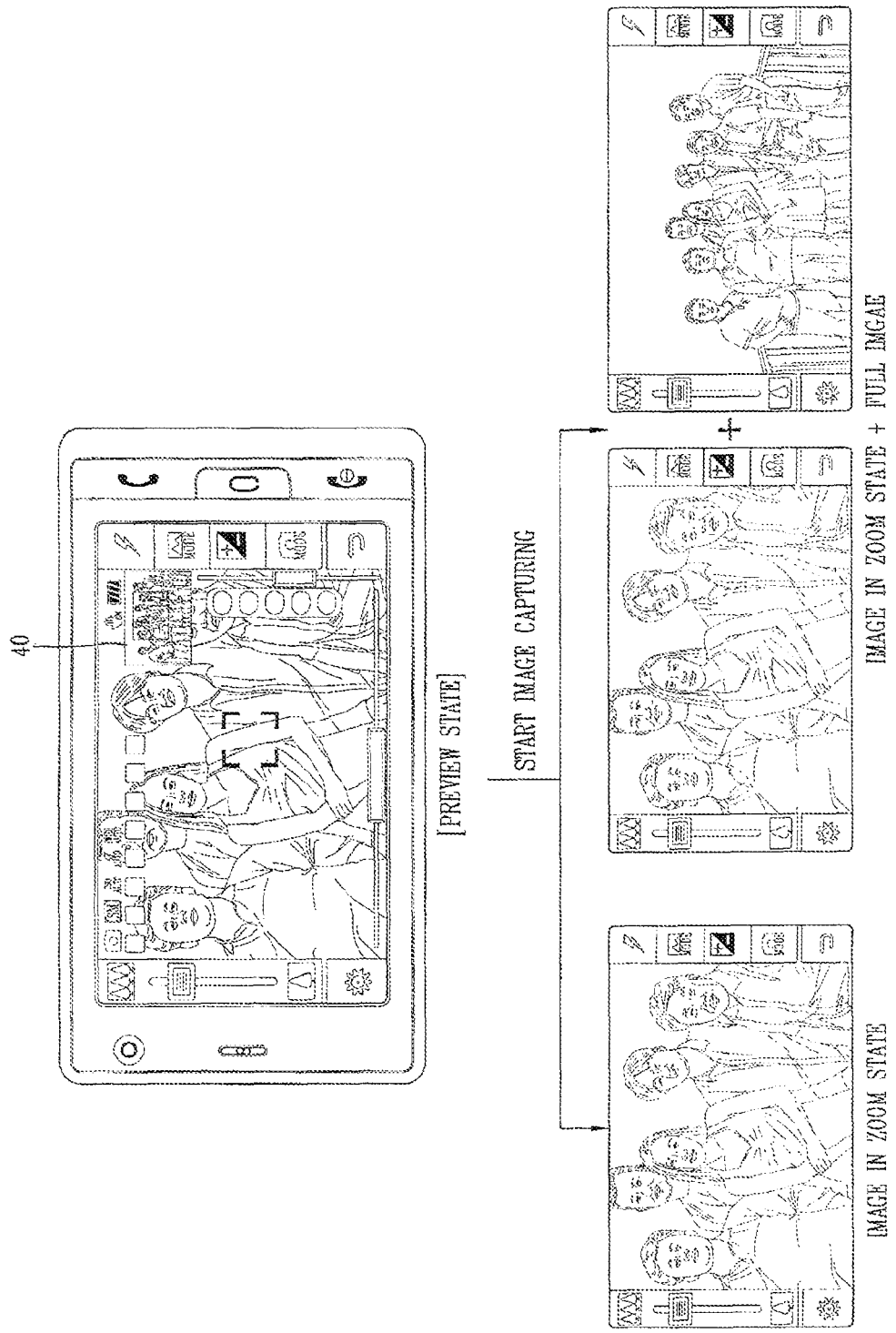
FIG. 13 is an overview of display screens illustrating capturing a zoomed image of a mobile terminal according to an embodiment of the present invention.

Next, FIG. 13 includes overviews of display screens illustrating a method for capturing a zoomed image and the full image according to an embodiment of the present invention. In particular, as shown in FIG. 13, when the camera zooming function is executed, the controller 180 displays the zoomed image as the preview image of the main display region and displays the zoom guide indicating the current zoomed position portion on the miniaturized image 40 in the auxiliary display region. Then, in this state, when the user presses, touches, selects, etc. an image capture key for capturing an image, the controller 180 stores the current zoomed image or simultaneously stores the current zoomed image and the full image that is displayed in the miniaturized image 40.

Further, the user can select different options to determine which storage/image capturing option will be performed when the image capture key is selected. Alternatively, two separate buttons may be provided for capturing the zoomed image or capturing both the zoomed image and the full image. Also, only the full image may also be captured. Further, to simultaneously capture and store the current zoomed image and the full image, the full image and the zoomed image may be stored at different intervals. For example, the full image may be stored upon being obtained by one frame per second, while the zoomed image may be stored upon being obtained by 30 frames per second. Alternatively, to simultaneously store the current zoomed image and the full image, only the full image can first be obtained, and then the zoomed image can be obtained through an internal image processing operation based on stored zooming coordinates, for example.

Thus, according to this embodiment, the user can later view the zoomed image without a delay. In particular, when the user generally views the image and wants to view a zoomed portion, the user would have to press a zoom key to zoom in on the image, and there is generally a delay before the zoomed portion is displayed. However, according to this embodiment, because the zoomed image is saved, the user can quickly view the zoomed image.

Figure 14:
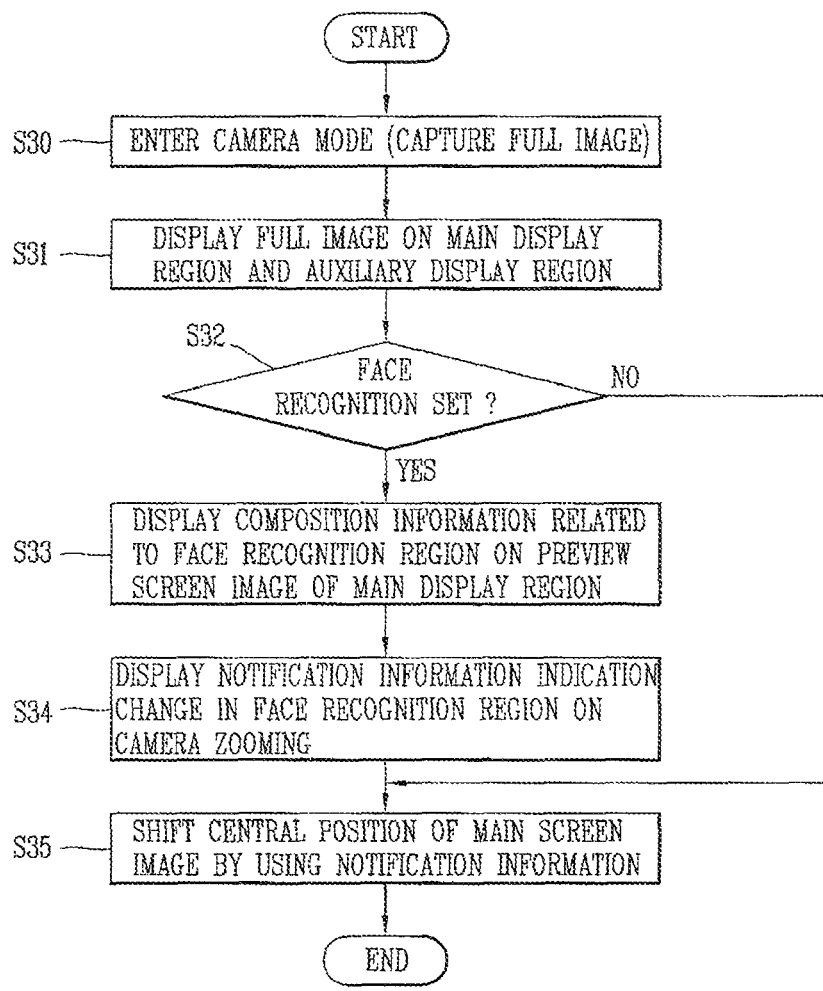
FIG. 14 is a flow chart illustrating a method of controlling a camera image of a mobile terminal using a face recognition process according to an embodiment of the present invention.

Next, FIG. 14 is a flow chart illustrating a method of controlling a camera image of a mobile terminal using a face recognition process according to an embodiment of the present invention. As shown in FIG. 14, when the user enters the camera mode (S30), the controller 180 displays the full image captured by the image sensor as the preview image on the main display region and also displays it in the form of the miniaturized image 40 on the auxiliary display region (S31).

In this state, the controller 180 checks whether a face recognition feature has been set (S32). If the user has set the face recognition feature using a particular menu option, for example (Yes in S32), the controller 180 displays composition information related to face recognition regions at a particular position of the main display region (S33). Preferably, the composition information includes a composition map/outline or composition icon identifying faces recognized by the camera sensor.

Also, when the user performs a zooming operation in this state, the controller 180 displays the zoomed image on the main display region, displays the zoom guide 41 indicating the current zoomed position portion on the miniaturized image 40, and displays notification information indicating a partial face recognition region that is positioned outside the screen due to the camera zooming operation (S34). In addition, when the face recognition has been set, the controller 180 may not display the miniaturized image 40 and the scroll bars 42. Thereafter, when the user touches or selects the notification information, the controller 180 shifts a central position of the zoomed image so that the touched portion can be displayed on the main display region (S35).

In addition, the notification information is preferably displayed as an indicator, an icon, a simple image, a face recognition image, simple text information or identification information, a composition map/outline, and the like, in a direction in which the face recognition region is positioned. In addition, a number of text information and arrows, icons, etc. can be displayed that correspond to the number of recognized face regions. The face recognition features according to different embodiments of the present invention will not be discussed in more detail.

For example, FIG. 15 includes overviews of display screens illustrating a plurality of faces in a preview image being recognized according to an embodiment of the present invention. With reference to FIG. 15, the controller 180 performs face recognition with respect to the full preview image according to a user's menu setting, and in this example, the controller 180 recognizes seven faces. Thus, the controller 180 displays seven face recognition regions 45 on the screen. As shown, in this example, the regions 45 appear as square outlines around the faces of the people in the preview image.

The controller 180 also displays the number of face recognitions in the form of a composition map 46 (e.g., a table form, a lattice form, and the like) or a composition icon. The composition map 46 may also be displayed by interworking with the miniaturized image 40 and the scroll bars 42. so the user can quickly see how many faces have been recognized and how many people are in the preview image. Thus, if the user knows the number of people he or she wants in the picture is ten people, the user can quickly determine he or she needs to zoom out to capture the additional people based on the composition map 46, which indicates only seven people's faces have been recognized.

Thereafter, when the user performs the zooming function, the controller 180 displays the zoomed image on the main display region and displays the zoom guide 41 indicating the current zoom position portion on the miniaturized image 40 on the auxiliary display region. Further, as shown in the lower portion of FIG. 15, because the user has zoomed in on the preview image, the controller 180 now only recognizes five faces in the zoomed image, and therefore, the composition map 46 is updated to reflect only five faces are recognized.

Further, the controller 180 advantageously displays the two faces now be excluded as dotted-lines, for example, in the composition map 46 so the user can quickly determine that his or her zooming operation has moved two faces out of the preview image. The controller 180 also displays notification information 51 indicating that currently there are far left and far right faces that are not recognized. Thus, the user can view the notification information 51 and know there are faces to the left and right of the zoomed image. In addition, the notification information 51 may be displayed as an indicator, an icon, a simple image, a face recognition image, simple text information or identification information, a composition map, and the like, in the direction in which the missing face recognition region is positioned.

Figure 16A:
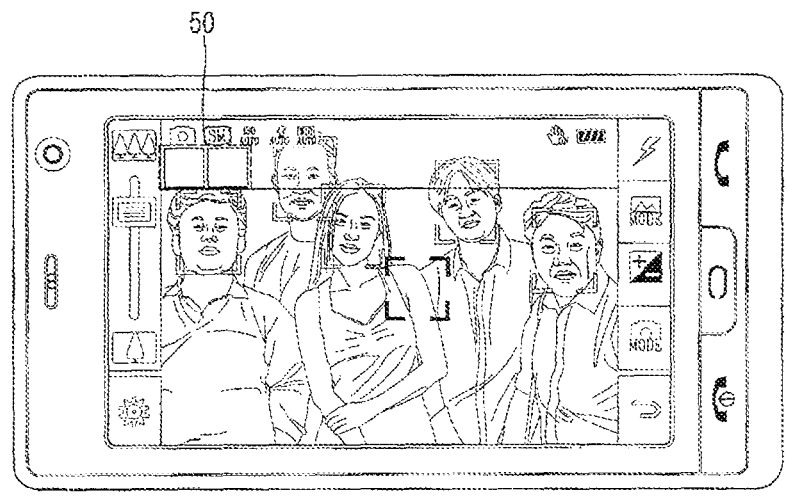
FIGS. 16A to 16I is an overview of display screens illustrating displaying various notification information when performing a zooming operation using a face recognition process according to an embodiment of the present invention.

Next, FIGS. 16A to 16I include overviews of display screens illustrating examples of displaying various notification information when using a face recognition process according to an embodiment of the present invention. For example, FIG. 16A illustrates an example of displaying an indicator 50 indicating there are two faces that are outside the displayed region (in this instance, the two persons on the far left and far right in the full image shown in the top portion of FIG. 15, for example). The indicator 50 is displayed on the left side of the image when viewing the image, but could be displayed on the far left and far right sides of the image to inform the user the positions of the faces that are not being recognized.

Figure 16B:
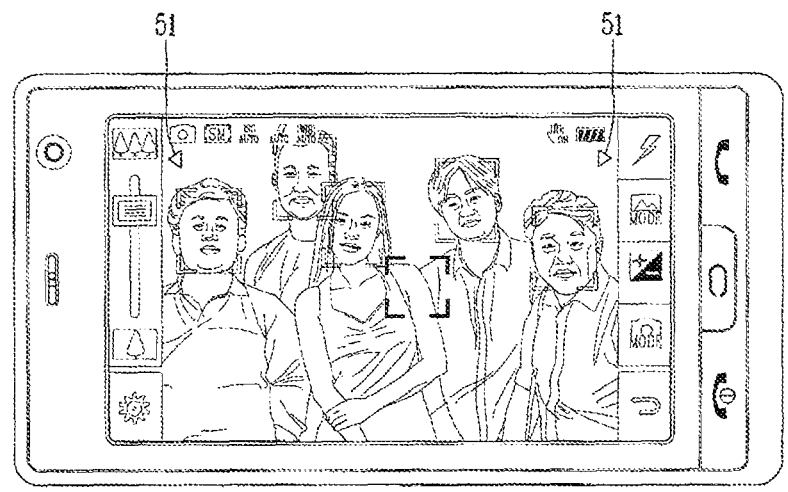

Thus, as the user is performing the zooming operation, the indicator 50 will also change based on the number of recognized faces being shown in the zoomed image. FIG. 16B illustrates indicators 51 being displayed to indicate there are face recognition regions at the far left and right portions of the currently zoomed screen image. The position and shape of the indicator or icon can also be selected by the user from a menu.

Figure 16C:
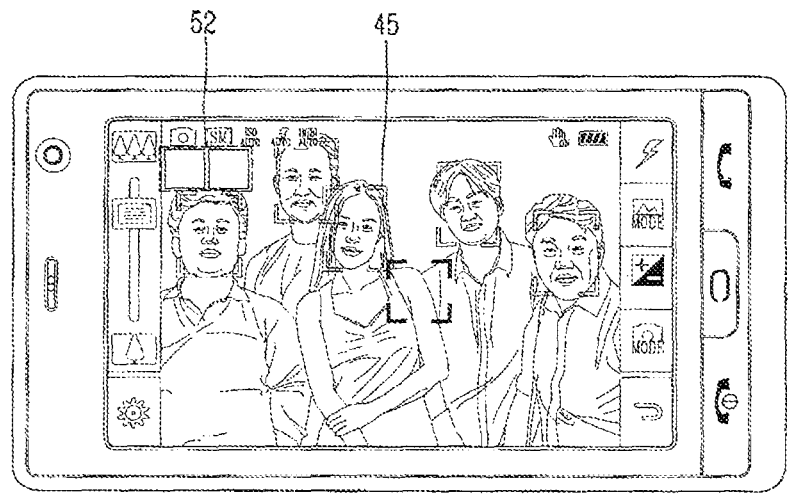
Figure 16D:
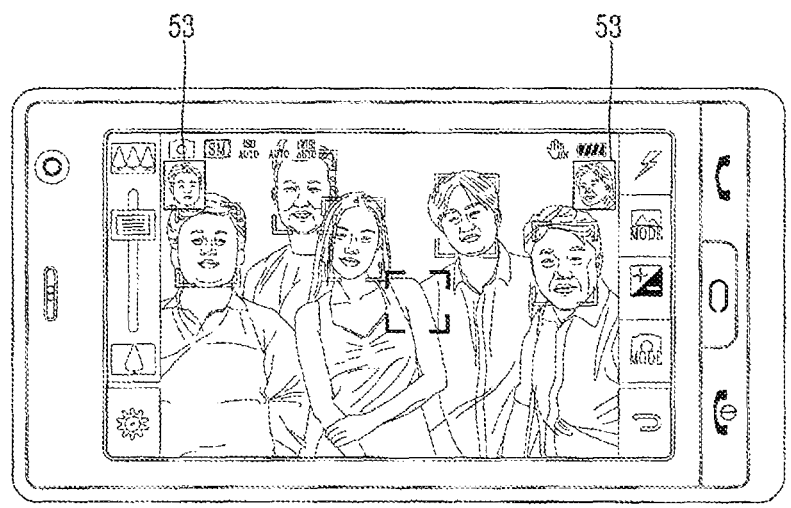

FIG. 16C illustrates an example of displaying simple images 52 indicating that there are more face recognition regions at the left portion of the zoom screen according to the camera zooming operation (and also shows the recognition regions 45), and FIG. 16D illustrates an example of displaying identification images 53 indicating that there are more face recognition regions at the left and right portions of the currently zoomed image. In FIG. 16C, the simple images can be any image pre-selected by a user, and in FIG. 16D, the images 53 are the actual images of the faces missing. Avatars or other images representing faces may also be used as the identification images 53.

Figure 16E:
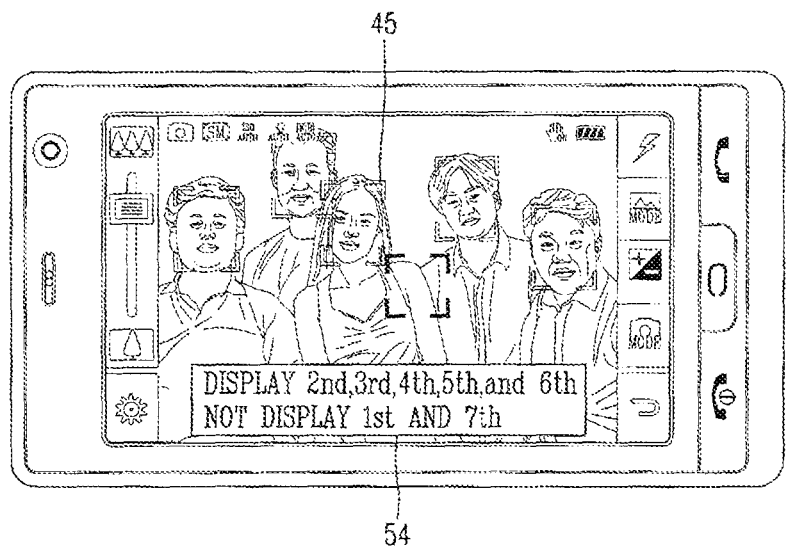

Also, FIG. 16E illustrates an example of displaying text information 54 indicating how many faces have been recognized and that there are more face recognition regions at other regions than the zoomed image as the user performs the zooming operation. In particular, as the user is performing the zooming operation, the controller 180 displays the text 54 indicating only the second to sixth faces among the total seven faces are displayed on the current zoom screen and the first and seventh faces are not displayed in the current zoom screen, for example.

Figure 16F:
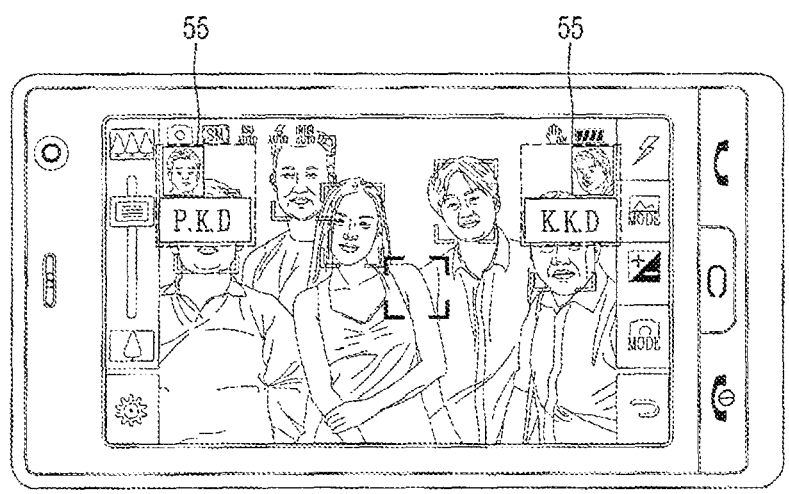

In addition, FIG. 16F illustrates displaying a face recognition image and identification information 55 indicating there are recognized faces outside of the currently zoomed image. Further, in one embodiment, the controller 180 can compare the faces outside the zoomed image with phonebook information stored in the memory of the terminal. For example, the phonebook information can include names, phone numbers and images of people, and the controller 180 can compare the recognized faces to faces (images) included in the phonebook, and then display a corresponding name or initials the faces outside the currently zoomed image. Also, any of the features discussed above regarding notifying the user of the recognized faces outside the zoomed image can be combined.

Figure 16G:
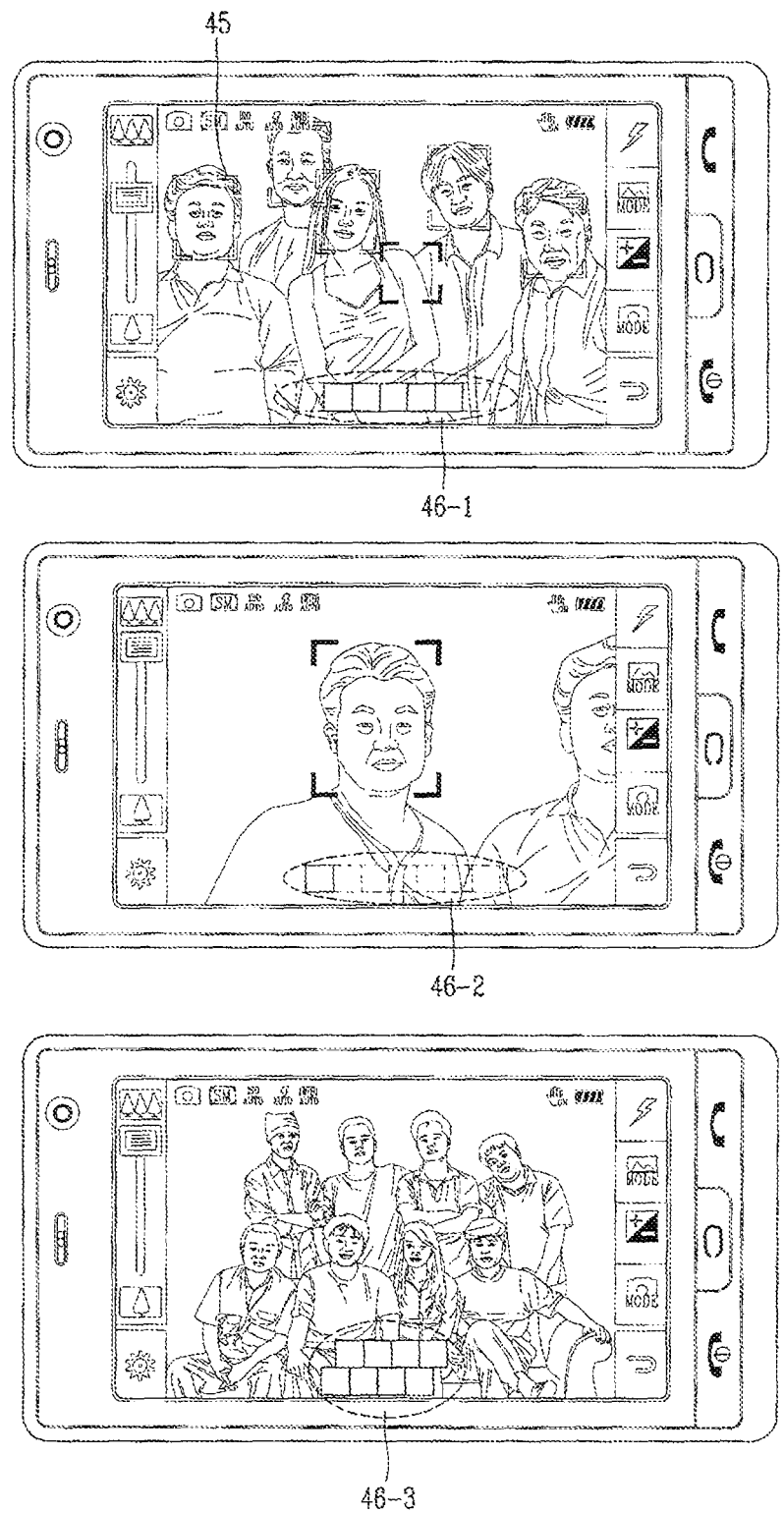

Further, FIG. 16G illustrates displaying a composition map 46 indicating how many recognized faces are currently being shown in the zoomed image and faces outside the zoomed image. In more detail, as shown in top portion of FIG. 16G, the controller displays a composition map 46-1 indicating that only the five middle faces and among all seven faces are displayed on the current zoom screen. Also, the middle portion of FIG. 16G illustrates the controller 180 displaying a composition map 46-2 indicating only the far left face is displayed on the currently zoomed image when the user zooms in on the picture.

Similarly, as shown in the lower portion of FIG. 16G, the controller 180 displays a composition map 46-3 indicating a total of sixteen faces are displayed on the currently zoomed image and indicating current positions of each user with respect to each other. Namely, the composition map 46-3 is arranged in a step form according to the positions of each person's recognized face. The composition map can also be positioned at a central lower end portion of the zoom screen, and the shape and size of the composition map can be selected by the user, for example.

Figure 16H:
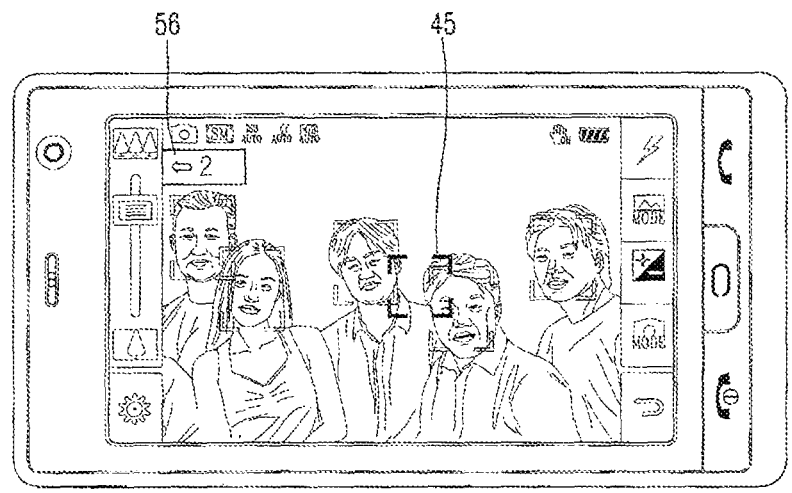

Next, FIG. 16H illustrates an example of displaying an indicator 56 including a number and arrow indicating the number of recognized faces not being show in the currently zoomed image and the location. In the example in FIG. 16H, the indicator 56 indicates there are two faces to the left that are not being displayed in currently zoomed image. That is, while the user is performing the zooming operation, the controller 180 performs a face recognition process on the full image, recognizes the number of face recognition regions 45 which are being displayed on the current zoom screen, and displays the number and location of the recognized faces so that the user can easily check the number and positions of the persons that are being displayed in the zoom state.

Figure 16I:
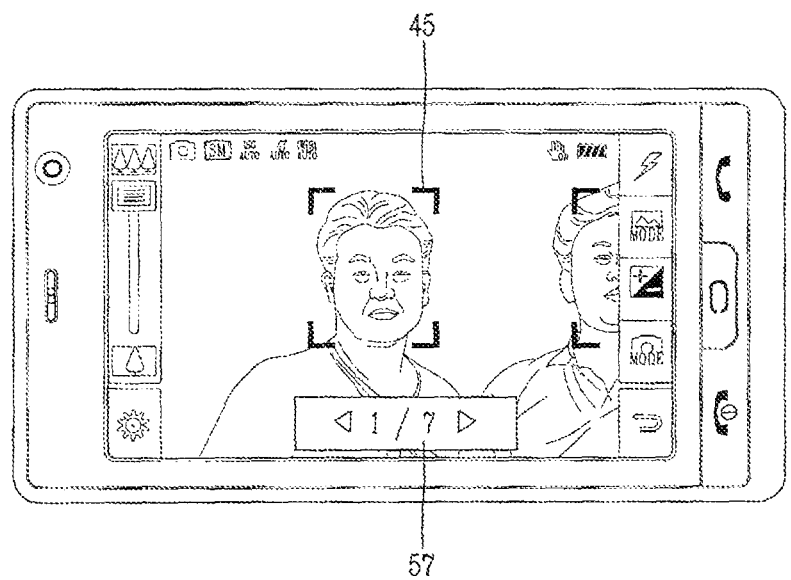

In addition, FIG. 16I illustrates an example of displaying an identification 57 including numbers and arrow indicating the presence of an additional face recognition region at an outer region of the zoom screen image according to the camera zoom performing result. For example, when the user is performing the zooming operation, the controller 180 performs the face recognition process on the full image and displays the number '1/7' indicating that the currently displayed face recognition region 45 is a first face recognition region among the total seven face recognition regions and horizontally movable arrows that the user can select to scroll through the different recognized faces. Thus, with reference to FIGS. 16A to 16I, when the zooming operation is performed at a certain magnification, the controller 180 displays the notification information indicating that the face recognition region 45 is at an outer side of the screen display region along with the zoomed image.

Next, an operation of shifting the central position 44 of the zoom screen to make a corresponding face recognition region appear when the user touches the notification information will be described. Further, the shift degree (amount the zoomed image is shifted) can be previously set to be a certain interval, and for example, the shift degree can be set to be an interval between face recognition regions.

In more detail, FIG. 17 includes overviews of display screens illustrating the central position 44 being changed based on the user touching the indicators 51 indicating recognized faces exist outside the currently zoomed image. That is, when the user touches one of the indicators 51, the controller 180 shifts the central position 44 of the zoomed image, which includes adjustment of the zoom magnification to display the face recognition region, namely, the person located at the far right in the example shown in FIG. 17. In addition, as shown in the lower portion of FIG. 17, after the user has shifted the currently zoomed image, the controller 180 displays two icons 51-1 indicating that there are two face recognition regions 55 at the far left portions according to the result of the shifting of the central position 44 of the zoomed image.

Figure 18:
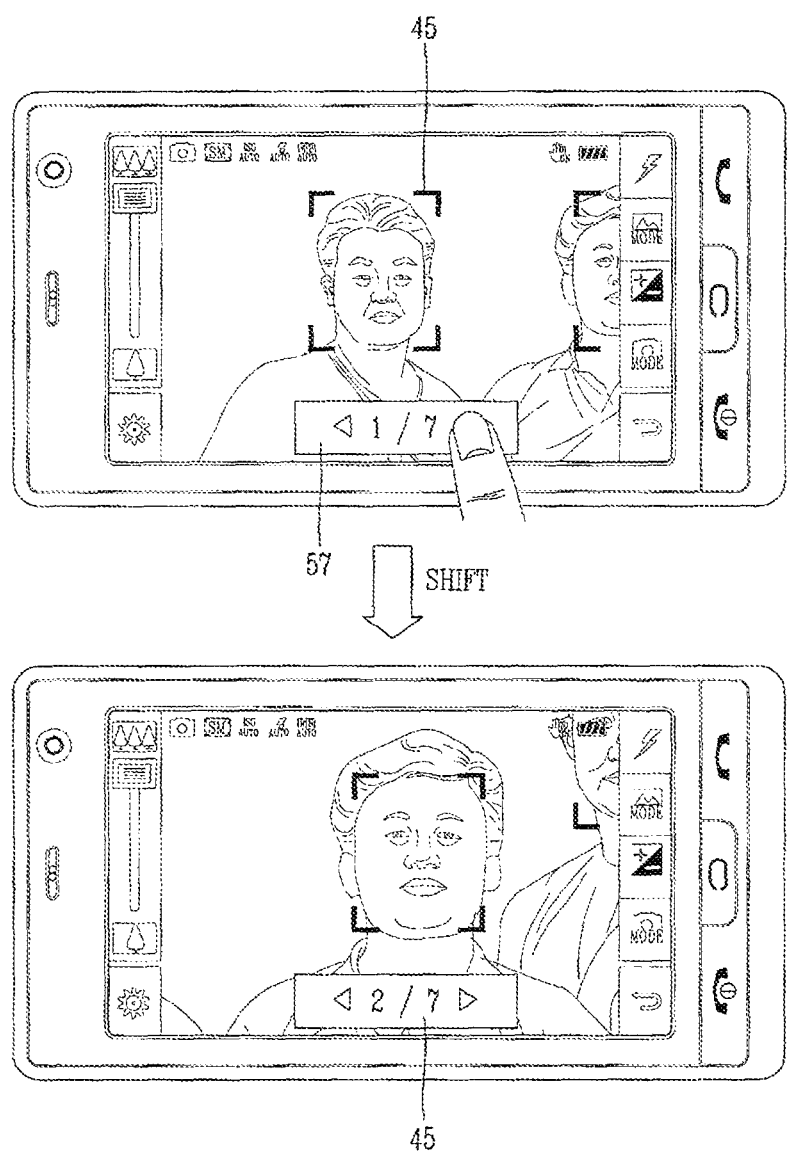
FIG. 18 is an overview of display screens illustrating shifting a central position of a zoomed image such that a corresponding face recognition region appears when a face recognition region arrow is touched according to an embodiment of the present invention.

Next, FIG. 18 includes overviews of display screens illustrates an example of shifting a central position of a zoomed image such that a next adjacent recognized face is displayed in the zoomed image as the user selects the indicator 57. That is, when the user has performed the zooming operation at the proper magnification, the controller 180 performs face recognition on the full image and displays the face recognition region 45 at the current zoomed image and also displays the indicator 57 in this instance the indicator '1/7' indicating that the currently displayed face recognition region is a first face recognition region among the seven face recognition regions. The controller 180 also displays arrow indicators the user can touch to scroll through the different recognized faces. Thus, as shown in FIG. 18, when the user touches an arrow, the controller 180 shifts the central position 44 of the zoomed image according to the direction of the arrow to make the next face recognition region appear (e.g., in this example to show the second recognized face).

Figure 19:
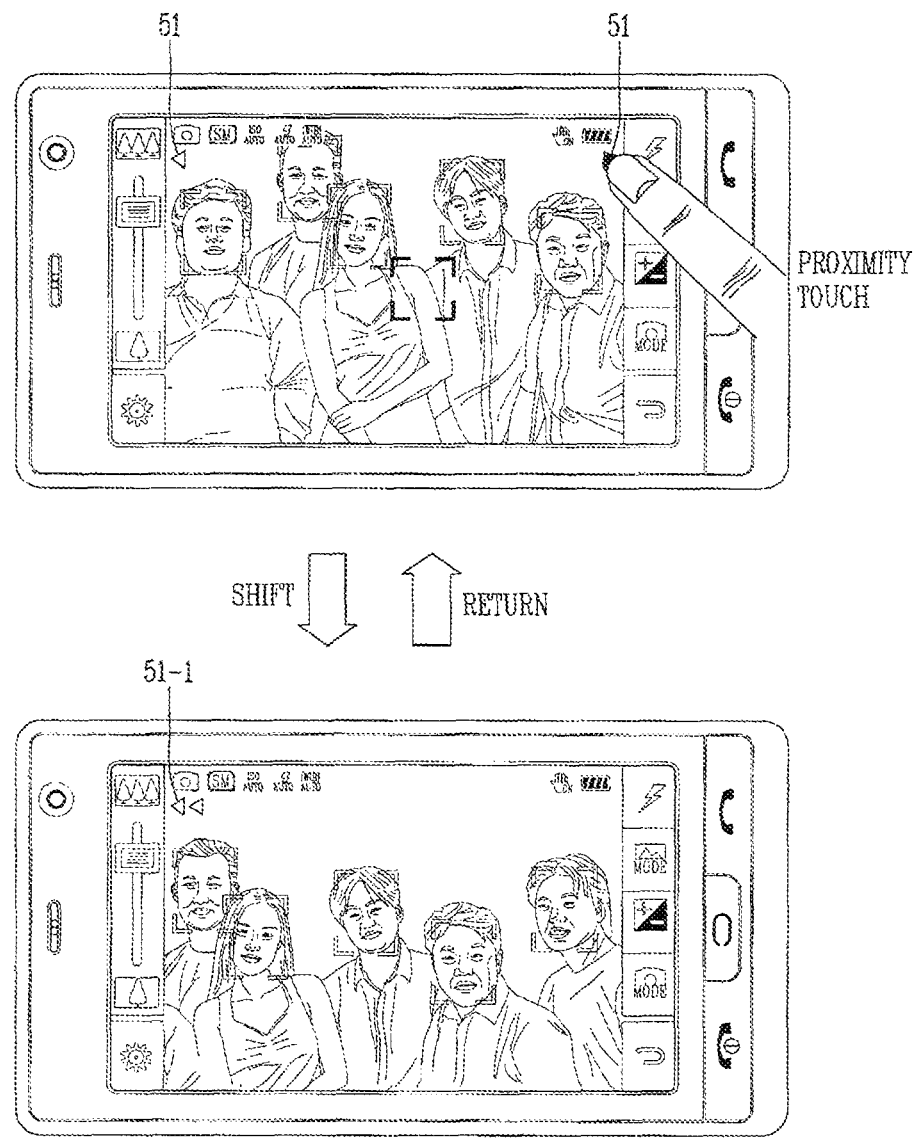
FIG. 19 is an overview of display screens illustrating shifting a central position of a zoomed image such that a corresponding face recognition region appears when a face recognition region icon is proximity-touched according to an embodiment of the present invention.

Further, FIG. 19 includes overviews of display screens illustrating an example of shifting a central position of a zoomed image such that a corresponding face recognition region appears when the indicator 51 is proximity-touched according to an embodiment of the present invention. As shown, the operation of FIG. 19 is similar to that of FIG. 17, except for the proximity touch action instead of actually touching the indicator 51. Thus, when the user proximity-touches one of the indicators 51 for a certain time period, the controller 180 shifts the central portion 44 of the zoomed image, which includes adjustment of the zoom magnification to make a next face recognition region appear. Thereafter, when the user moves their finger or other pointing object out of the proximity distance, the controller 180 returns the zoomed image to the previous state. Alternatively, when the user moves out of the proximity distance, the controller 180 can maintain the current state.

Figure 20:
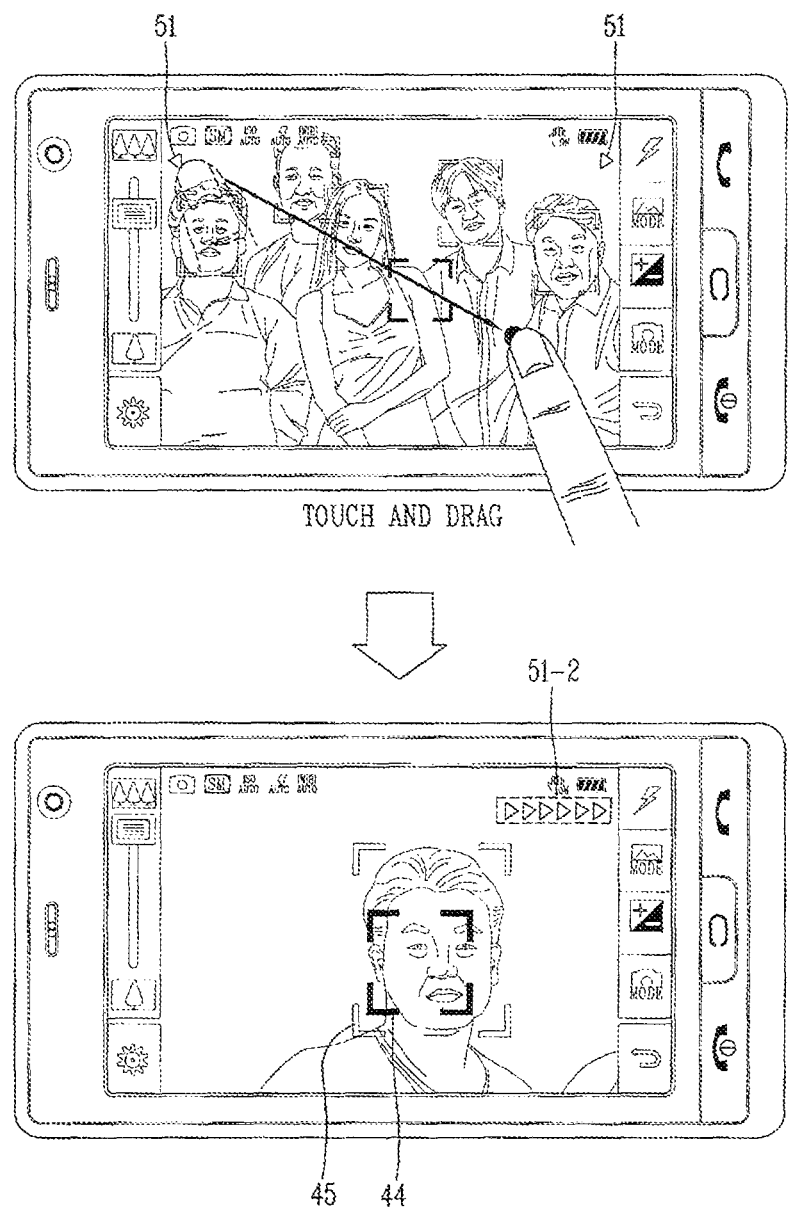
FIG. 20 is an overview of display screens illustrating shifting a central position of a zoomed image such that a corresponding face recognition region appears when a face recognition region icon is touch-and-dragged according to an embodiment of the present invention.

Next, FIG. 20 includes overviews of display screens illustrating the user changing or shifting the central position of a zoomed image by performing a touch-and-drag operation according to an embodiment of the present invention. In particular, the controller 180 performs face recognition on the full image in the preview state and then displays the indicators 51 indicating that there are face recognition regions 45 at the far left portion and far right portion of the zoomed image. Thus, when the user touch-and-drags the indicator 51 as shown in the upper portion of FIG. 20, the controller 180 shifts the central position 44 of the zoomed image to allow the face recognition region 45 to be placed at the dragged point. The controller 180 also displays indicator 51-2 including six icons (e.g., arrows) at the far right portion of the screen display region to indicate that six more people are present in the right direction although they are not displayed.

FIG. 21 includes overviews of display screens illustrating an example of shifting a zoomed screen image using a certain touch motion according to an embodiment of the present invention. In this embodiment, when one or more notification information (a face recognition region icon) indicating that there are one or more face recognition regions are selected in a certain shape (e.g., a circle or a polygon), the central position of the zoom screen image is shifted to display all the selected portions. In more detail, the upper portion of FIG. 21 illustrates the controller 180 displaying the six icons 51-2 at the far right portion of the zoom screen to inform the user there are six more faces in the right direction (although they are not currently shown).

In this state, when the user selects four icons by using a circular touch motion, the controller 180 shifts the central position while properly adjusting the zoom magnification so that the four face recognition regions corresponding to the four icons are displayed on the screen as shown in the lower portion of FIG. 21. As a result, the four faces selected by the touch motion appear on the screen, and the controller 180 displays icons 51-1 indicating there are two more face recognition regions at the far left portion of the screen display region, and displays the icon 51 indicating there is one more face recognition region at the far right portion of the screen display region. Such operations are also applicable in the same manner when the miniaturized image, the scroll bar, the composition map portions are touched (actually touched or proximity-touched) or touched-and-dragged.

Figure 22:
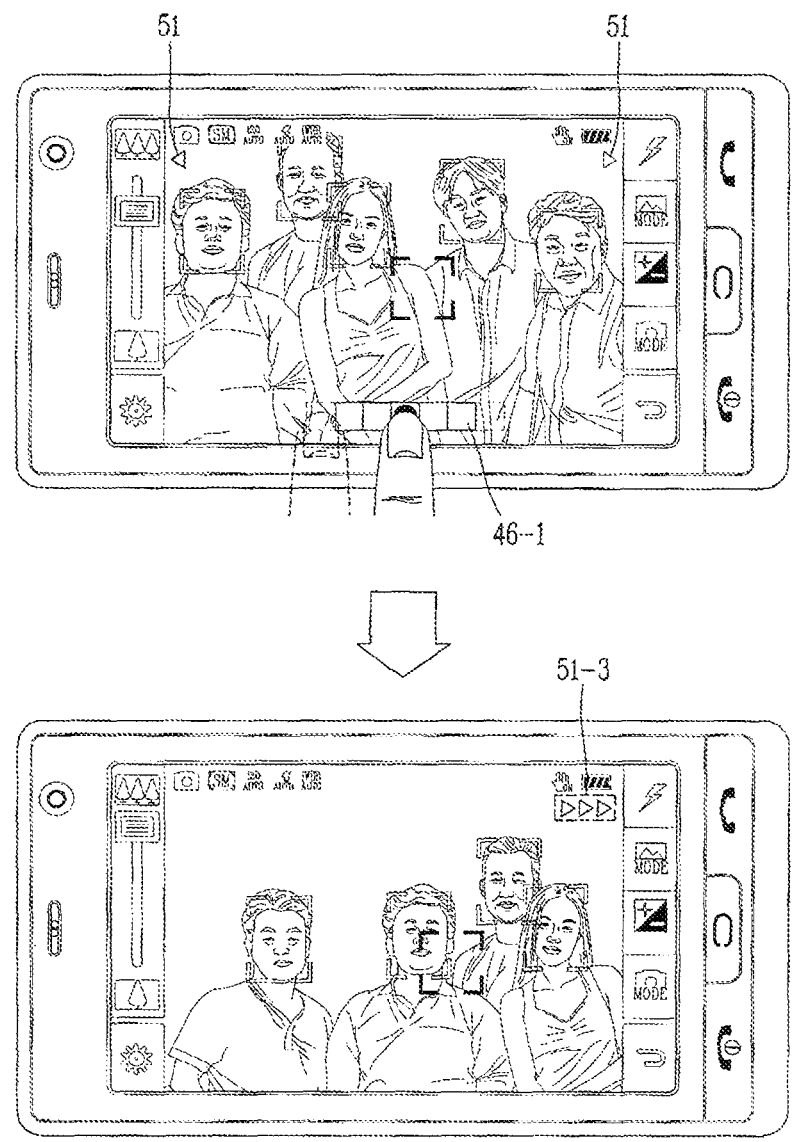
FIG. 22 is an overview of display screens illustrating shifting a central position to a face recognition region by multi-touching a composition map according to an embodiment of the present invention.

Next, FIG. 22 includes overviews of display screens illustrating an example of shifting a central position to a face recognition region by multi-touching a composition map according to an embodiment of the present invention. In particular, in the preview state after performing a certain zoom magnification, the controller 180 performs face recognition on the full image. After the face recognition process, the controller 180 displays the composition map 46-1 indicating that five faces among the total of seven faces are displayed and icons 51 indicating that there are more face recognition regions 45 at the far left and right portions of the current zoom screen or screen display region.

In this state, when the user multi-touches the composition map 46-1, the controller 180 shifts the central position of the zoom screen while properly adjusting a zoom magnification so that the portions (e.g., the first and fourth faces), which have been multi-touched on the composition map, are all displayed on the screen. As a result, the four faces appear on the screen, and an icon 51-3 indicating that there are three more face recognition regions is displayed at the far right portion of the current screen display region.

Figure 23:
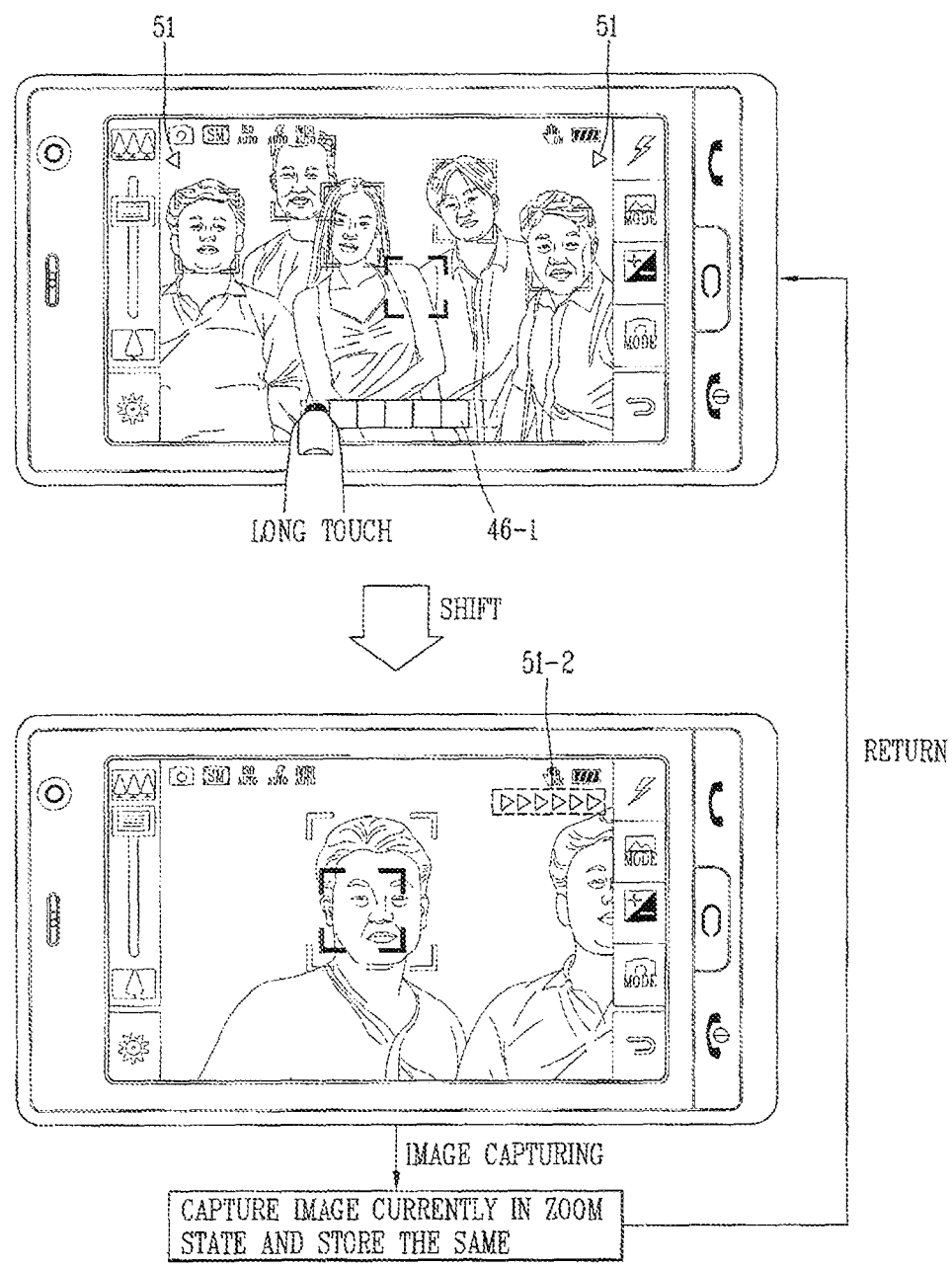
FIG. 23 is an overview of display screens illustrating performing image capturing after a central position is shifted to the face recognition region by applying a touch to the composition map according to an embodiment of the present invention.

Next, FIG. 23 includes overviews of display screens illustrating an example of performing image capturing after a central position is shifted to the face recognition region by applying a touch to the composition map according to an embodiment of the present invention. With reference to FIG. 23, when the user long-touches a particular region of the composition map 46-1 (or presses an image capture key after a touch is applied) in the preview state, the controller 180 shifts the central position of the zoom screen while properly adjusting the zoom magnification so that a first face selected by the touch is displayed on the screen. As a result, the selected single face appears on the screen, and the controller 180 displays the icon 51-2 indicating that there are six more face recognition regions at the far right portion of the current screen display region.

Also, once the central position is shifted to the user-selected face recognition region, the controller 180 controls the camera 121 to capture the image (first face) in the current zoom state, and stores the captured image in the memory 160. In addition, when the image capturing operation is completed, the current state is automatically returned to the preview state. In the present embodiment, the screen display and the image capturing operation are discriminately displayed, but when actually performing this function, the time difference therebetween is very short. That is, once the user selects the particular face, the particular face is zoomed in on and the image is captured. Alternatively, the selected face can be displayed for a predetermined amount of time (e.g., a few seconds) to allow the user to view the face before the image is quickly captured. It is also possible to allow the user to completely view the selected face and select another key to actually capture the selected face.

Figure 24:
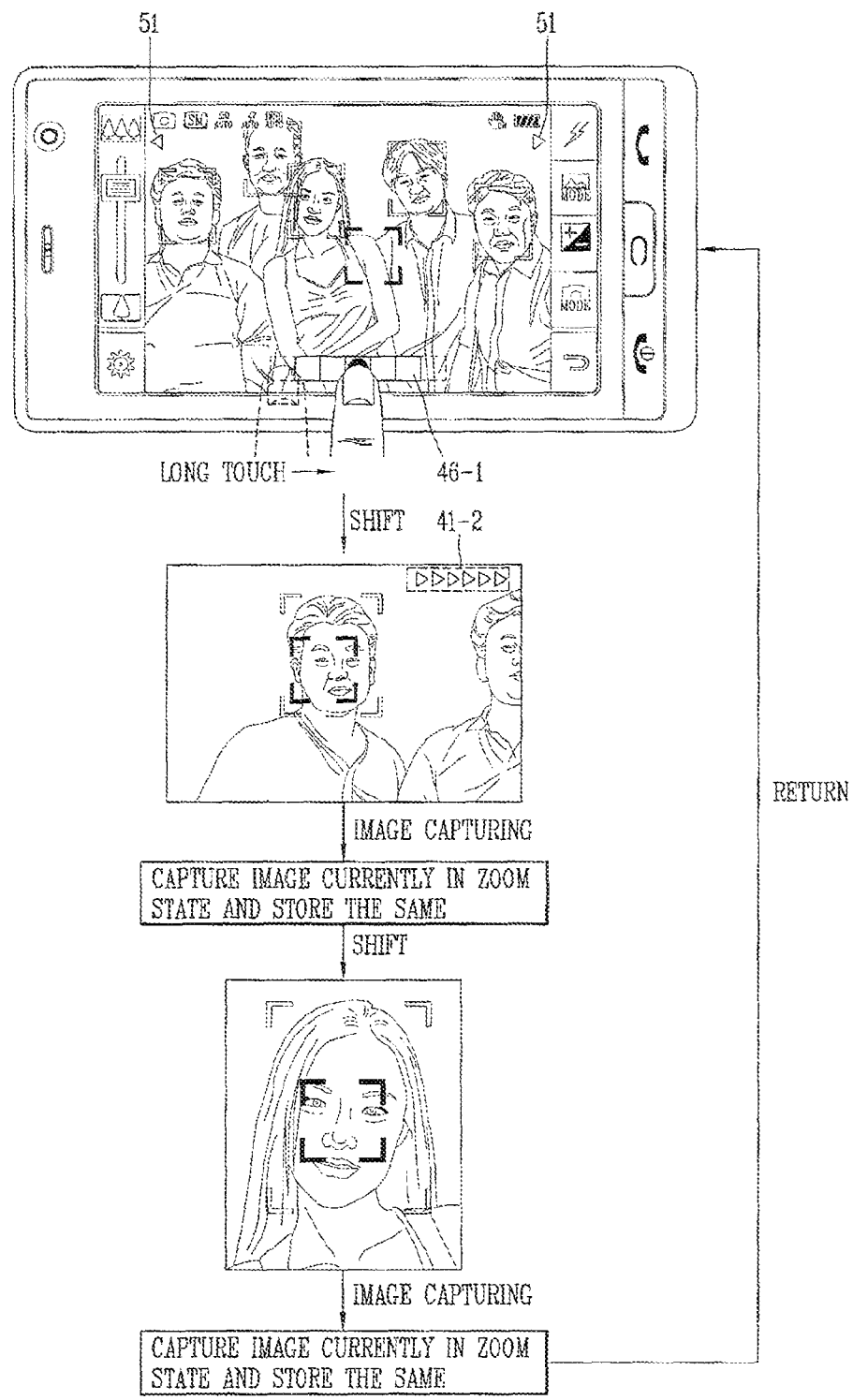
FIG. 24 is an overview of display screens illustrating performing image capturing after the central position is shifted to the face recognition region by applying a multi-long touch according to an embodiment of the present invention.

In addition, FIG. 24 includes overviews of display screens illustrating an example of performing image capturing after the central position of the zoom screen image is shifted to the corresponding face recognition region by touching the composition map. That is, the situation illustrated in FIG. 24 is similar to the situation illustrated in FIG. 23, except that multi-long-touch is performed. Namely, in the situation illustrated in FIG. 23, one region is selected from the composition map and an image capturing operation is immediately performed, while in the situation illustrated in FIG. 24, the controller 180 sequentially shifts to the corresponding face recognition regions based on a multi-long-touch operation to perform image capturing.

In more detail, when the user multi-long-touches particular regions (e.g., first to fourth regions) on the composition map 46-1 or presses an image capture key after a multi-touch operation in the zoom screen image, the controller 180 shifts the central position so that the first face recognition region selected through the multi-long-touch is displayed on the screen, captures the selected image, shifts the central position to the fourth face recognition region and captures the selected image. Thereafter, the controller 180 preferably automatically returns to the preview state.

Also, the sequential image capturing operations have been described by taking the multi-long-touch as an example with reference to FIG. 24, but the present invention is not limited multi-long-touch operations. For example, when the user sequentially touches or proximity-touches particular regions on the composition map, the corresponding face regions can be sequentially captured while shifting the central position of the screen. Further, sound effects or vibration feedback can be provided in accordance with a touch, a proximity touch, and a touch-and drag operation.

Thus, the face recognition is performed on the full image in the preview state, the notification information indicating a face recognition region outside the screen is displayed at a particular region of the screen, and the notification information is touched to move the central position of the screen or perform image capturing operation. In addition, various applications may be performed on the face recognition region displayed on the screen. For example, for one face recognition region, various applications such as a call (e.g., a video call), message transmission (e.g., broadcast transmission and MMS transmission), home page or blog interworking, photo image search, video search, Internet search, phone book storage, and the like, can be applied to the corresponding face recognition region. Also, when there are two face recognition regions, a multi-party call communication including multi-party video call communication, broadcast transmission including broadcast MMS transmission, home page or blog interworking, photo image search, video search, Internet search, phone book storage, and the like, can be applied to the corresponding face recognition regions.

Figure 25:
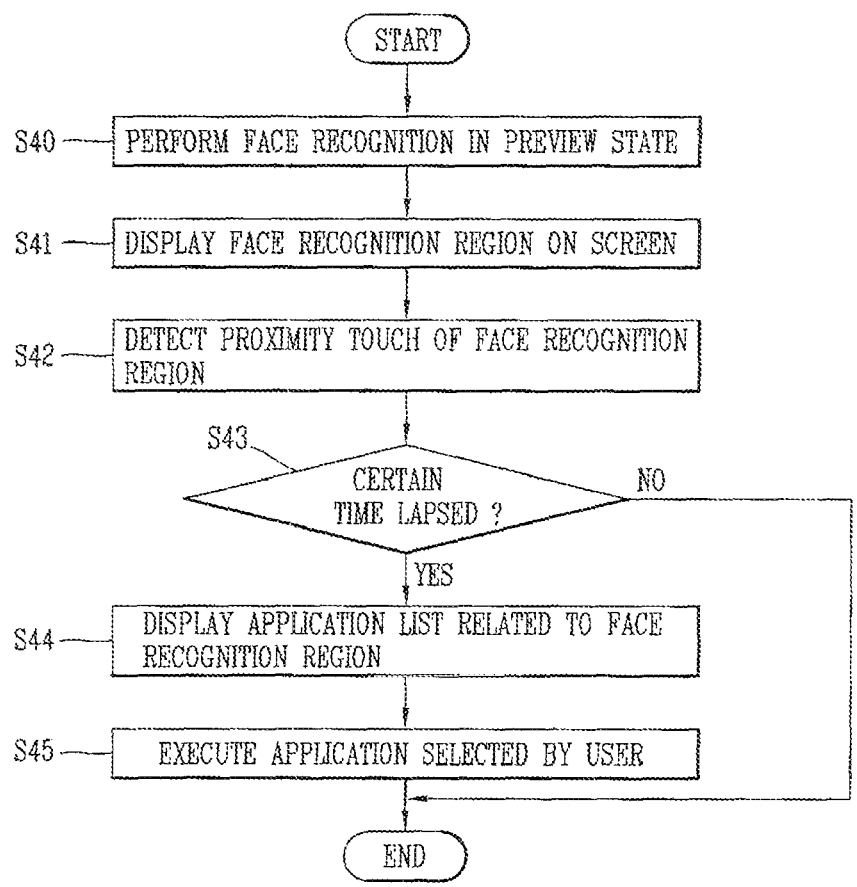
FIG. 25 is a flow chart illustrating a method of performing various applications with respect to the face recognition region according to an embodiment of the present invention.

Next, FIG. 25 is a flow chart illustrating a method for performing various applications with respect to the face recognition region according to an embodiment of the present invention. As shown in FIG. 25, the controller 180 performs face recognition on a full image in the preview state in which a certain zoom magnification has been performed, and displays face recognition regions (S40 and S41). Then, after a certain time lapses after the user proximity-touches one of the face recognition regions (S42 and S43), the controller 180 displays an application list related to selected face recognition regions on the screen (S44). The application list may be configured to be different when only one face recognition region is displayed on the screen and when two face recognition regions are displayed on the screen. When the user selects a particular application from the displayed list, the controller 180 executes the corresponding execution (S45).

Figure 26:
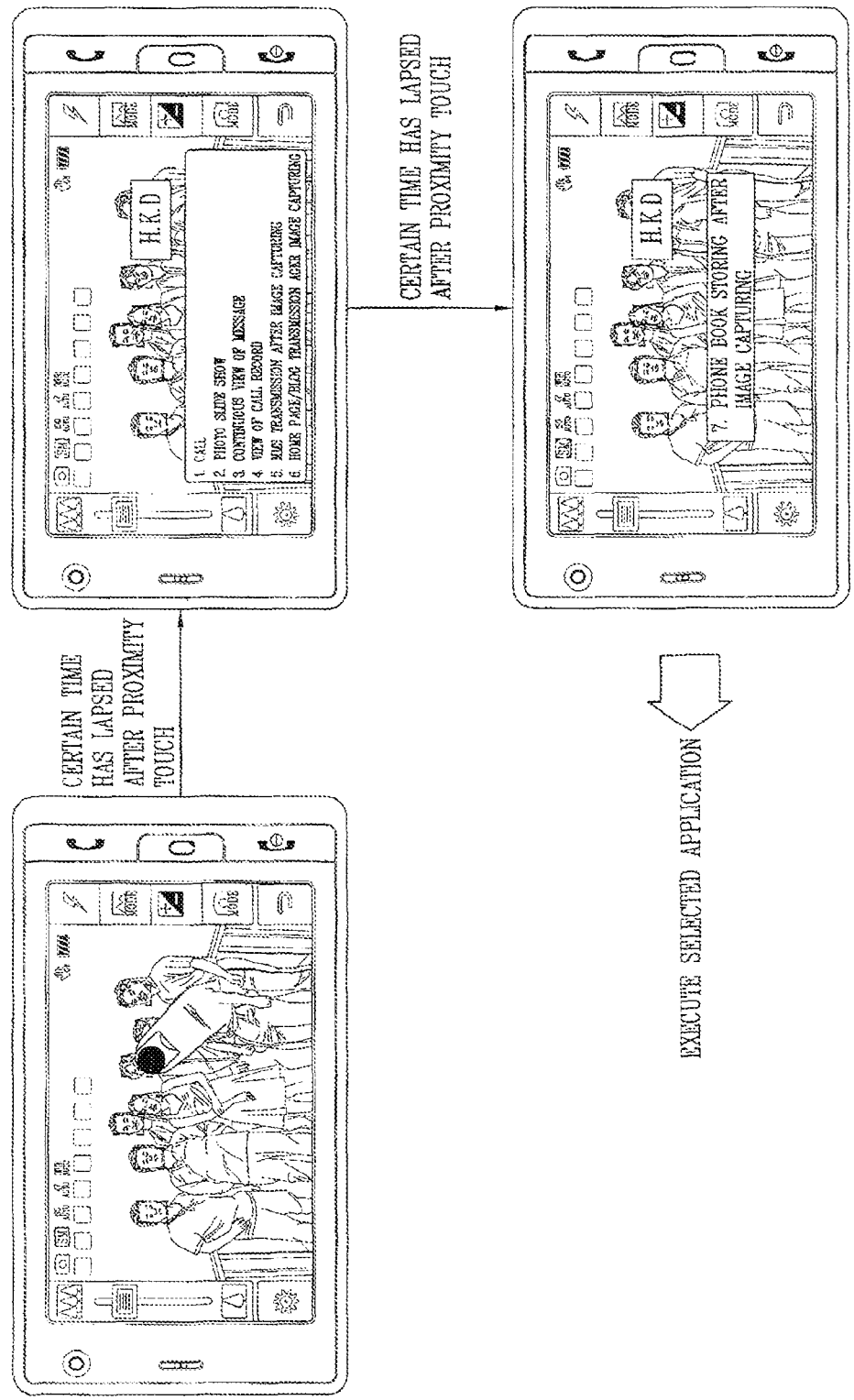
FIG. 26 is an overview of display screens illustrating actually performing an application in FIG. 24 according to an embodiment of the present invention.

FIG. 26 includes overviews of display screens illustrating the method in FIG. 25 being performed according to an embodiment of the present invention. With reference to FIG. 26, the controller 180 performs face recognition on a full image and then displays face recognition regions on the screen. When a certain lapses after the user proximity-touches the fifth face recognition region from the left among the face recognition regions, the controller 180 displays an application list 57 for the proximity-touched face recognition region on the screen and displays the name or initials of the touched person (e.g., 'Hong Kil-dong or 'H. K. D.") on the corresponding application list 57. Also, the application list 57 is preferably configured to be different when there is only one face recognition region and when there are two face recognition regions.

In this state, when the user selects a different face in the same manner as described above, the controller 180 displays an application list for the selected face recognition region on the screen and displays the name of the touched person on the corresponding application list. Then, when the user selects a particular application '7. Phonebook storage after image capture' from the displayed application list 57, the controller 180 displays the selected application list on the screen and executes the corresponding application.

Further, the above description describes screen display when the user performs a zooming operation on the preview screen image and a partial image capturing operation performed on the displayed zoom screen image. Hereinafter, an operation of displaying a particular portion of a captured image on an auxiliary display region to check whether or not image capturing has been properly performed will now be described.

Figure 27:
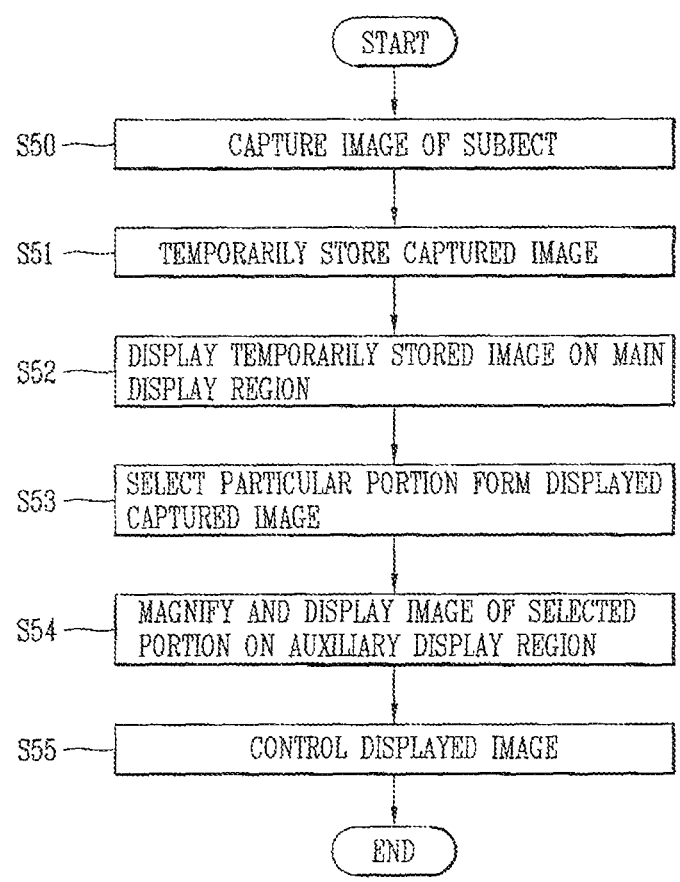
FIG. 27 is a flow chart illustrating a method of controlling a captured image of a mobile terminal according to an embodiment of the present invention.

In particular, FIG. 27 is a flow chart illustrating a method for controlling a captured image of a mobile terminal according to an embodiment of the present invention. As shown in FIG. 27, when the user enters the camera mode, the controller 180 captures an image of an object (e.g., a group of people) (S50), and then the captured image is temporarily stored in the memory 160. The controller 180 also displays the image on the display unit 151, which is the main display region (S52).

A portion of the displayed image is also selected (S53), then magnified and displayed in an auxiliary display portion (S54). The controller 180 also controls the images displayed on the main display region and the auxiliary display region according to a user input (S55). The portion of the image can be selected according to a user setting or according to information set as default. For example, the portion selected by the user can be selected by an actual touch motion as well as a region (e.g., a face recognition region) displayed on the main display region according to a user setting. Further, the main display region is a region where general information is displayed, and is generally larger than the auxiliary display region.

Thus, the user can check whether there is an error in the magnified image, and finally store or delete the captured image. When all the identification regions are checked or there is an interruption initiated by the user, the controller 180 displays a guidance message as to whether the currently temporarily stored image should be stored in the memory, whether or not the currently temporarily stored image should be transmitted, or whether or not the temporarily stored image should be erased. When the user selects the image be stored, the controller 180 stores the captured image in the memory 160, and if the user selects not to store the image, the temporarily stored captured image is deleted.

Further, the above description refers to capturing images of a group of people as an example. However, the embodiments of the present invention also refer to capturing and manipulating images for a plurality of objects, in which certain portions of corresponding objects may be recognized or selected (e.g., through a touch motion), magnified, and checked, and stored according to a user setting. For example, if some portions of the captured objects are considered to be important, the corresponding portions may be discriminated from the temporary captured image data and displayed.

Figure 28A:
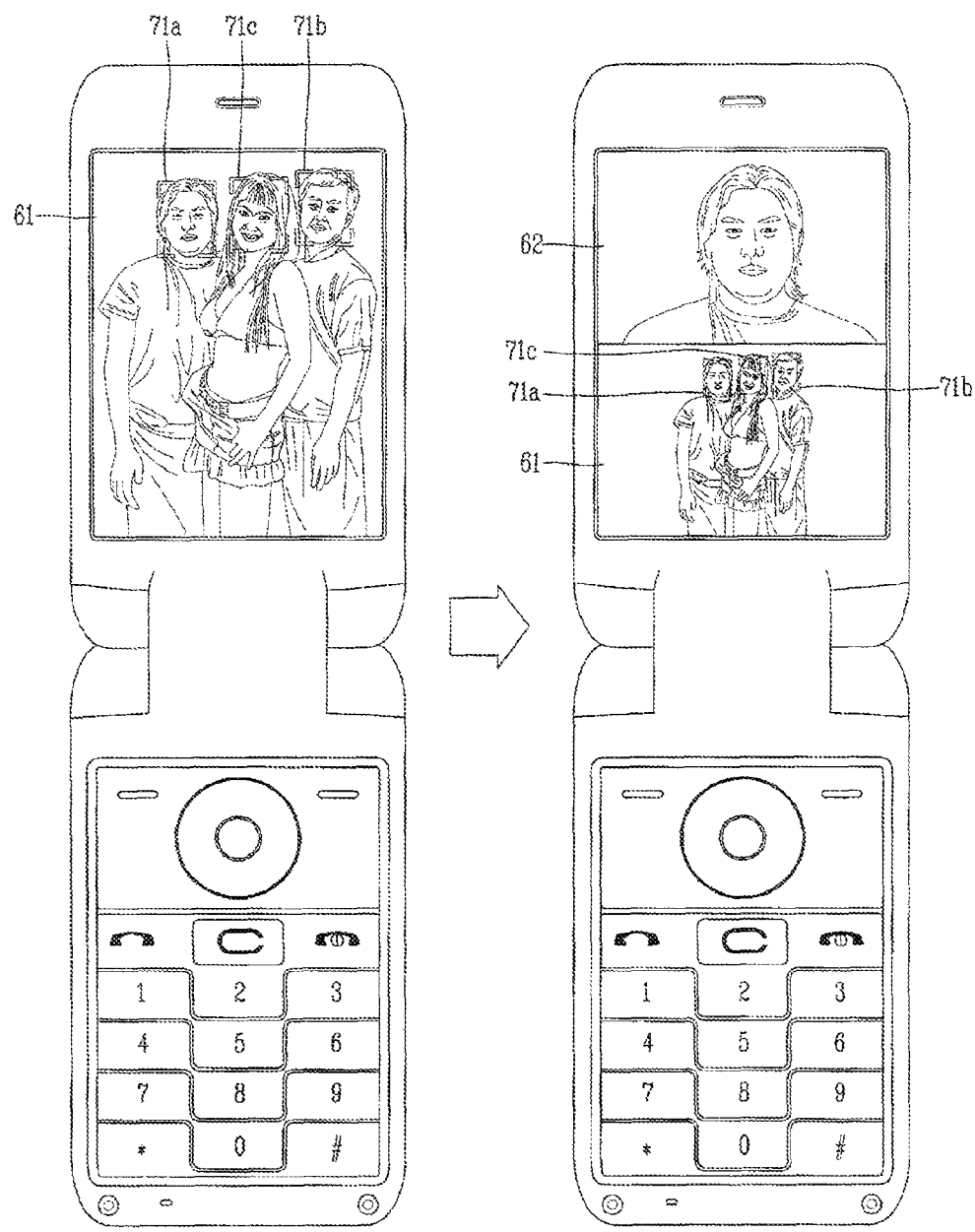
FIGS. 28A to 28E include overviews of display screens illustrating various implementations of the method for controlling a captured image of a mobile terminal according to an embodiment of the present invention.

Next, FIGS. 28A to 28E are overviews of display screens illustrating various implementations of a method for controlling a captured image of a mobile terminal according to an embodiment of the present invention. As shown in FIG. 28A, when a particular portion is selected from the captured image, the main display region is divided into two regions (e.g., upper and lower regions in this example). Further, the upper region will be referred to as an auxiliary display region 62 and the lower region will be referred to as a main region 61. As shown in FIG. 28A, the controller 180 displays a temporarily stored full image on the lower main display region 61 and a magnified detailed face of the selected particular region, e.g., a face recognition region 71a selected by the user from among a plurality of face recognition regions 71a to 71c on the upper auxiliary display region 62.

Figure 28B:
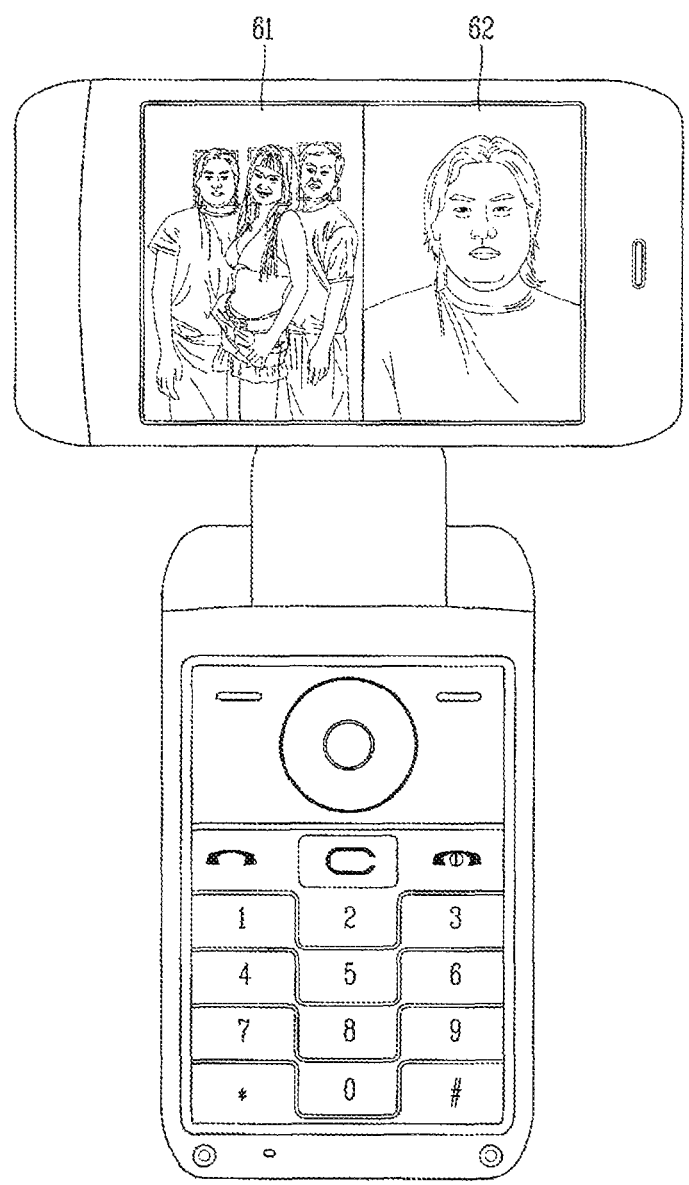

FIG. 28B illustrates a similar feature except the two display regions are displayed horizontally. In more detail, as shown in FIG. 28B, the main display region of the terminal is rotatable after being opened and is divided into the two display regions 61 and 62. Further, in FIGS. 27 and 28, the main display region 61 and the auxiliary display region 62 are displayed with the same size. However, the sizes of the two display regions can be different from each other.

Figure 28C:
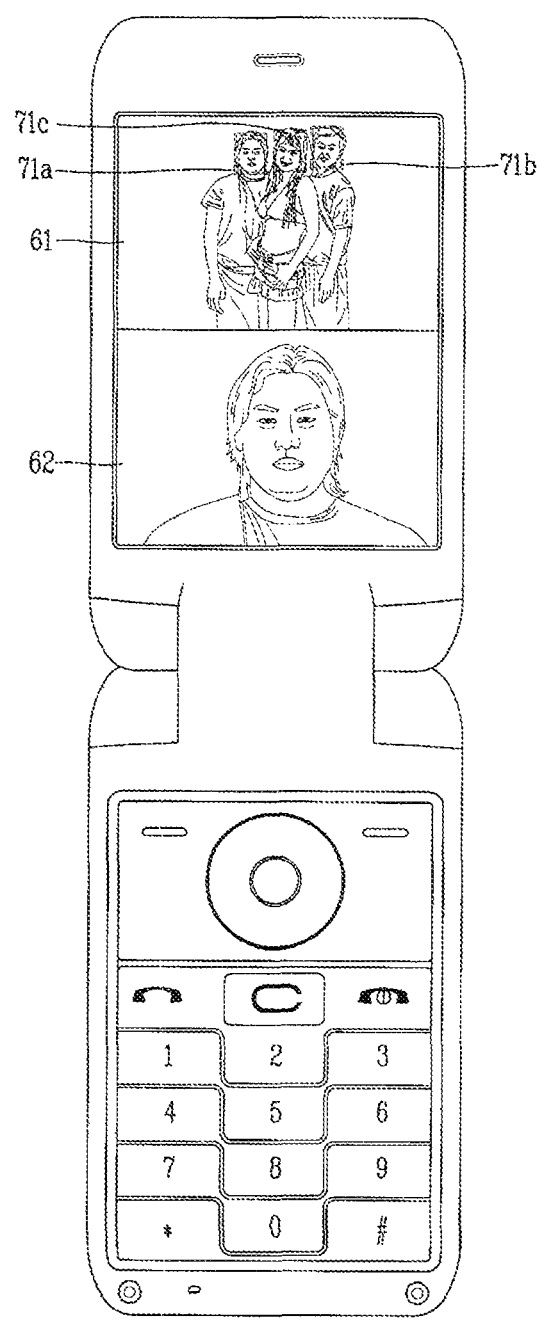
Figure 28D:
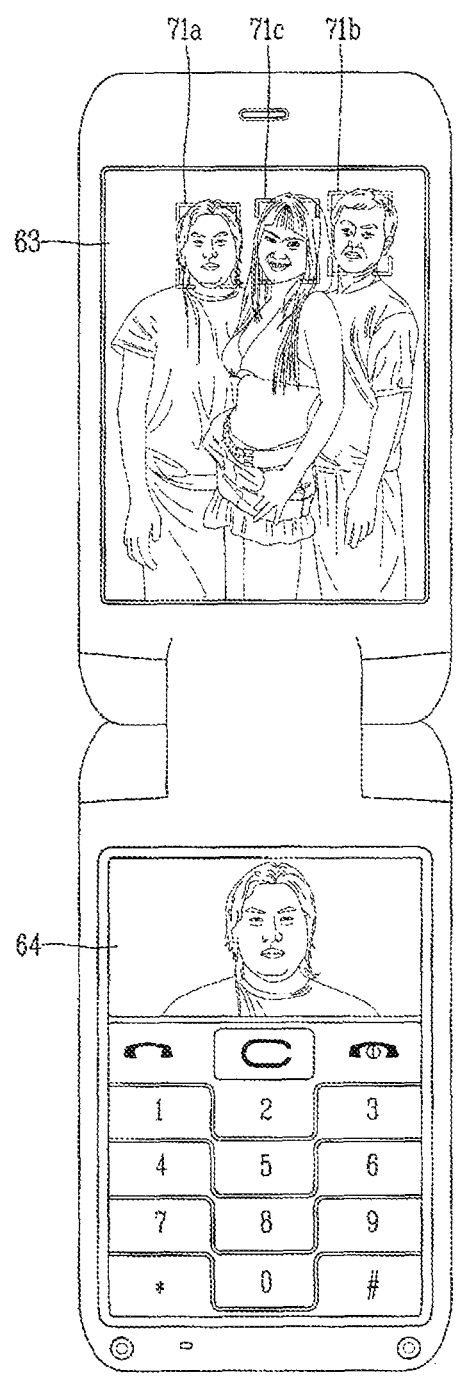

In addition, FIG. 28C is similar to the situation illustrated in FIG. 28A, except the main display region 61 is the upper portion of the display and the auxiliary display region 62 is the lower portion. Further, FIG. 28D illustrates two physically separated display regions, namely, the display units 151 are provided both on upper and lower folders of the terminal. In this instance, a main display region 63 is set as the upper folder, and an auxiliary display region 64 is set as the lower folder. Thus, the temporarily stored full image is displayed on the main display region 63, and the detailed face of the selected particular region (e.g., the face recognition region 71a selected by the user) is magnified and displayed on the auxiliary display region 64.

Figure 28E:
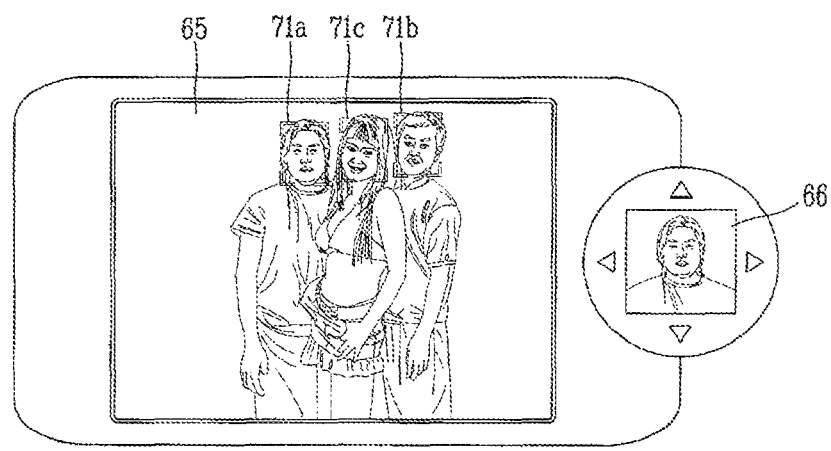

Further, FIG. 28E illustrates two physically separated display regions formed on the same body. In particular, this embodiment corresponds to a touch type terminal, and in which a main display region 65 and an auxiliary region 66 are formed on the main body. A function key such as a navigation key is also preferably formed in the vicinity of the auxiliary display region 66. Further, the auxiliary display region 66 and main display region 65 preferably are touch screen displays including the ability to recognize a proximity touch applied thereto. Thus, when the user selects a particular portion from an image currently displayed on the main display region 65, the controller 180 magnifies and displays the face of the selected portion (i.e., the face recognition region 71a selected by the user) on the auxiliary region 66.

Figure 29A:
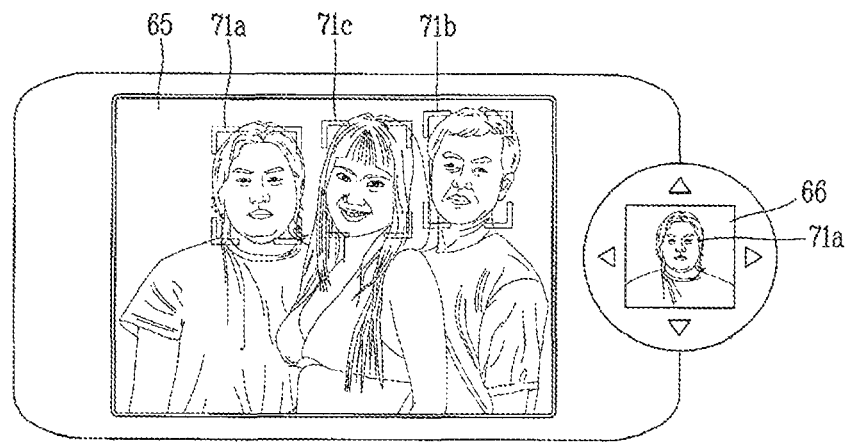
FIGS. 29A to 29E include overviews of display screens illustrating controlling images displayed on two physically separated display regions in the captured image control method according to an embodiment of the present invention.

Next, FIGS. 29A to 29E illustrate a mobile terminal including two physically separated displays and displaying images on the two displays. In particular, FIG. 29A illustrates images corresponding to particular face recognition regions being magnified and displayed on the auxiliary display region 66 according to a user selection or according to a default order (e.g., face recognition region 71a, then face recognition region 71b, and then face recognition region 71c). The user can select the different images to be displayed in the auxiliary display region 66 by touching or proximity touching a desired face recognition region displayed on the main display region 65. Further, the controller 180 magnifies a detailed image of the face recognition region selected by the user according to a size of the auxiliary display region. Namely, the controller 180 can adjust a resolution or the like of the detailed image such that the size of the image displayed on the main display region 65 fits on the auxiliary display region.

Figure 29B:
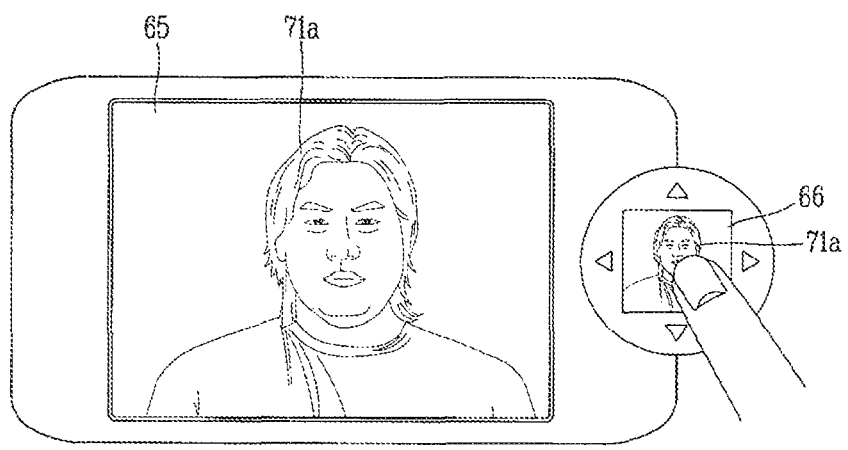
Figure 29C:
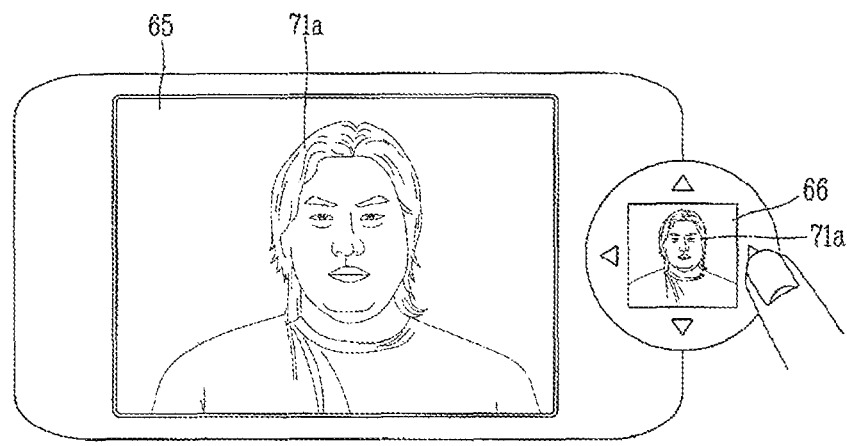
Figure 29D:
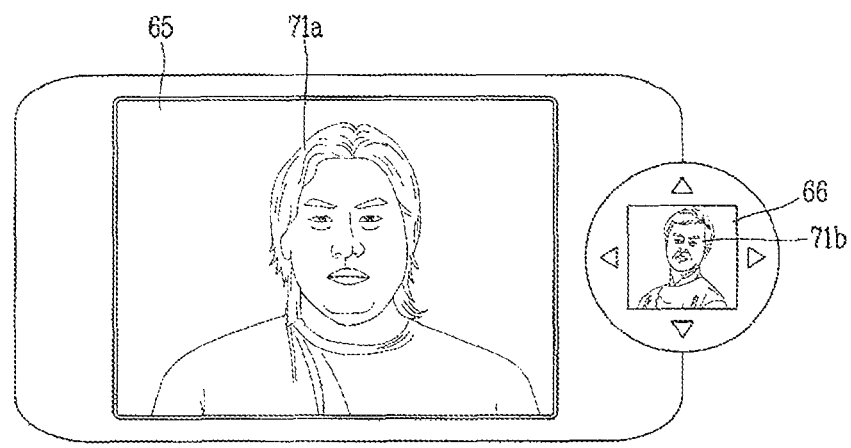
Figure 29E:
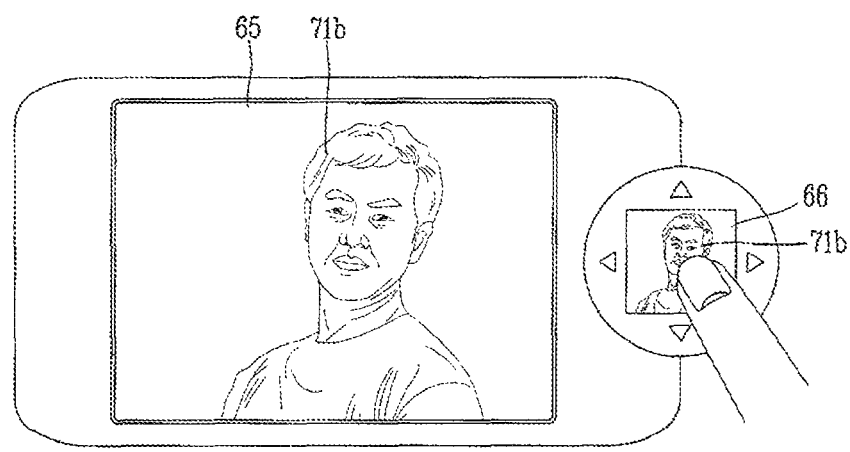

FIG. 29B illustrates the user directly touching or proximity-touching the image displayed on the auxiliary display region 66, and the controller 180 displaying the touched image on the main display region 65. Further, the user can press the navigation key (direction key, etc.) formed in the vicinity of the auxiliary display region 66 as shown in FIG. 29C to select a next face recognition region 71b displayed in the FIG. 29A. That is, the user can scroll the different face recognition area using the navigation key and in which each selected face region is displayed in the auxiliary display region 66 as shown in FIG. 29D. When the user then inputs a selection signal such as by pressing or touching the image displayed on the auxiliary display region 66, the controller 180 magnifies and displays the face corresponding to the face recognition region 71b on the main display region 65 as shown in FIG. 29E. In addition, the regions including a face recognition region desired by the user may be individually selected, or desired regions may be sequentially displayed at certain time intervals.

Figure 30A:
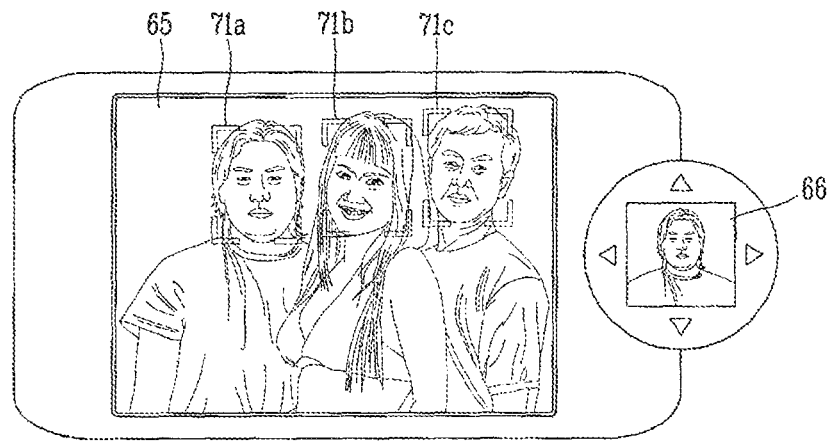
FIGS. 30A to 30C include overviews of display screens illustrating cooperative operation between an auxiliary display region and a main display region through a proximity touch according to an embodiment of the present invention.
Figure 30B:
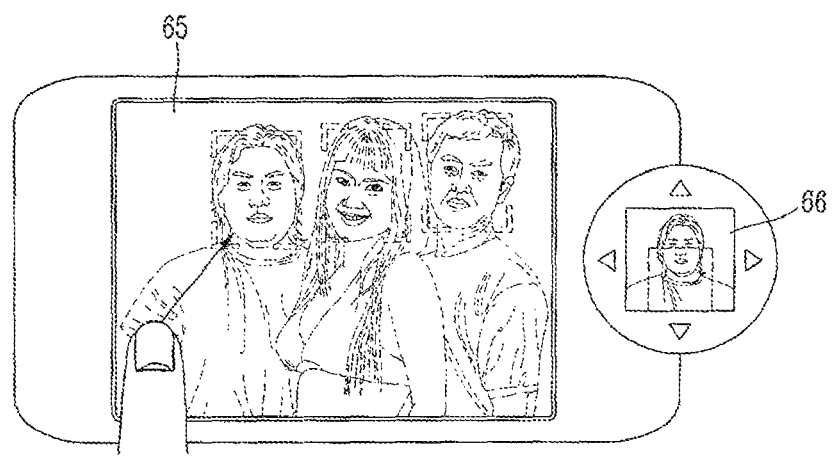
Figure 30C:
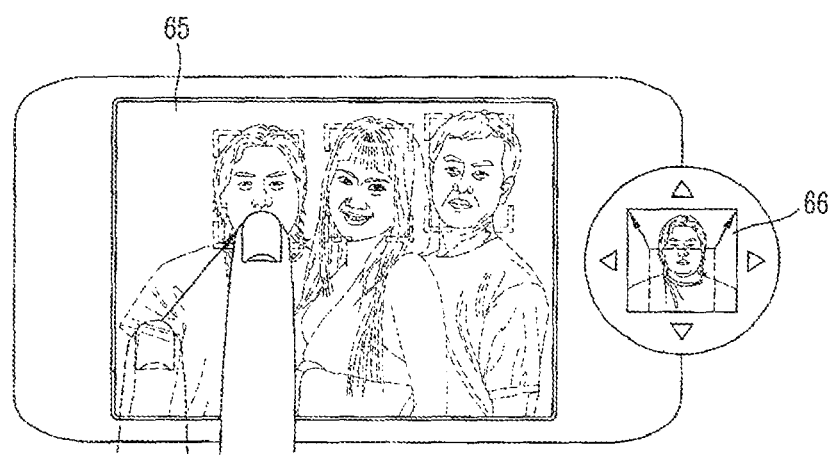

Next, FIGS. 30A to 30C include overviews of display screens illustrating the user performing proximity-touching operations to select desired portions of the image. In particular, unlike the instance illustrated in FIG. 29 in which the user selects the face recognition region displayed on the main display region 65 by directly touching the region, FIG. 30B illustrates the user's finger approaching the face recognition region displayed on the main display region 65, and the controller 180 recognizing the proximity distance and controlling the size of the image displayed on the auxiliary display region 66. In particular, when the user's finger approaches the main display region 65 in the manner of d3→d2→d1 as shown in FIG. 4, the controller 180 gradually magnifies the image displayed on the auxiliary display region from FIG. 30B and FIG. 30C.

Figure 31A:
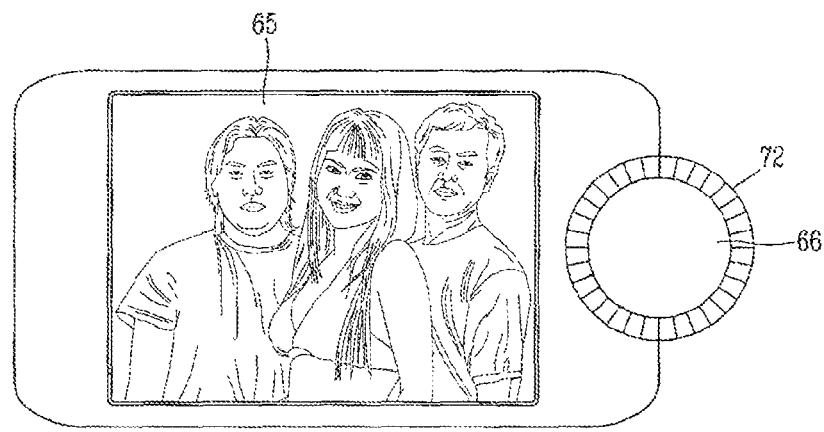
FIGS. 31A to 31C include overviews of display screens illustrating controlling a captured image when two physically separated display regions are formed on the same body according to an embodiment of the present invention.
Figure 31B:
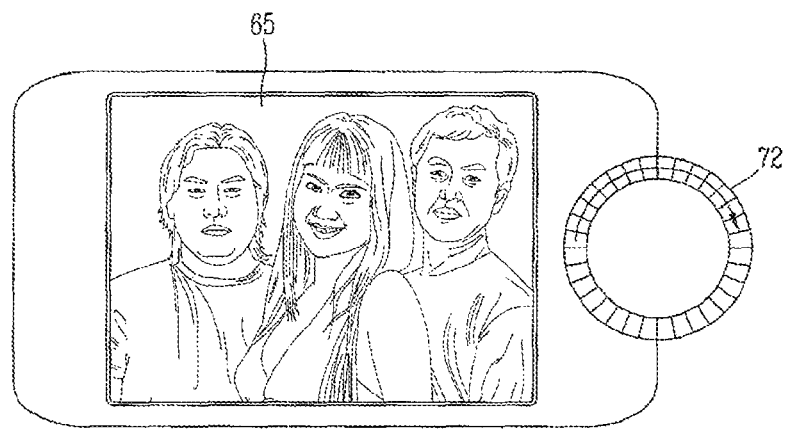
Figure 31C:
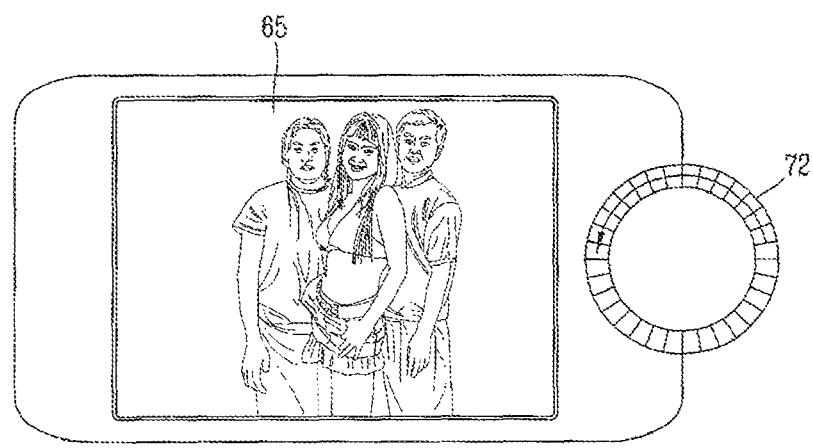

Next, FIGS. 31A to 31C include overviews of display screens illustrating the user controlling the size of an image displayed on the main display region 65 using a jog wheel 72. The inside of the jog wheel 72 can also include an auxiliary display region 66 as in FIG. 30. In more detail, as shown in FIG. 31A, when the user captures an image of a subject, the controller 180 displays the captured image on the main display region 65. Then, as shown in FIGS. 31B and 31C, when the user rotates the jog wheel 72, the controller 180 scales up and down the captured image displayed on the main display region 65 according to a rotational direction.

For example, when user rotates the jog wheel 72 clockwise as shown in FIG. 31B, the controller 180 zooms in or magnifies the original screen image displayed on the main display region 65. Also, when the user rotates the jog wheel 72 counterclockwise as shown in FIG. 31C, the controller 180 zooms out or reduces the original screen image displayed on the main display region 65. Further, the user can shift the magnified or reduced image to the left or right using a predetermined key operation, and then store the displayed image.

Figure 32A:
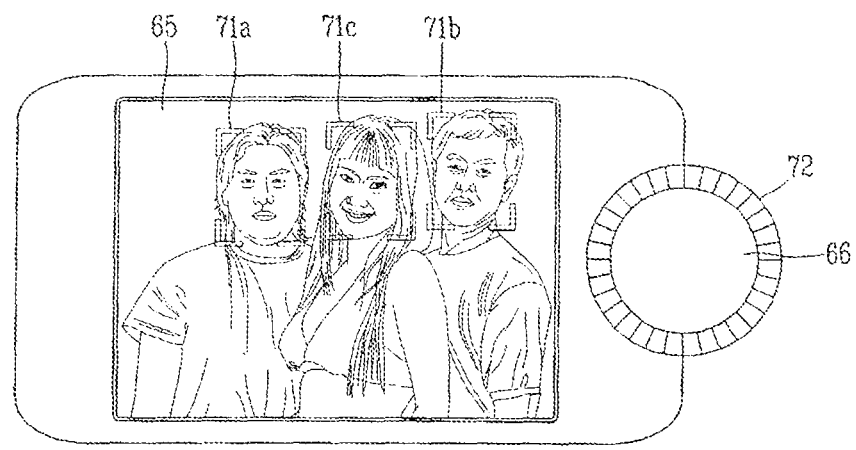
FIGS. 32A to 32E include overviews of display screens illustrating controlling images displayed on two display regions when two physically separated display regions are formed on the same body according to an embodiment of the present invention.

Next, FIGS. 32A to 32E include overviews of display screens illustrating the operation of controlling images displayed on two display regions when two physically separated display regions are formed on the same body. In particular, FIG. 32A illustrates the auxiliary display region 66 having the jog wheel 72. Further, the main display region 65 includes the face recognition areas 71a, 71b and 71c. Also, in this embodiment, both the of main display region 66 and the auxiliary display region 66 are configured to recognize a proximity touch applied thereto.

Figure 32B:
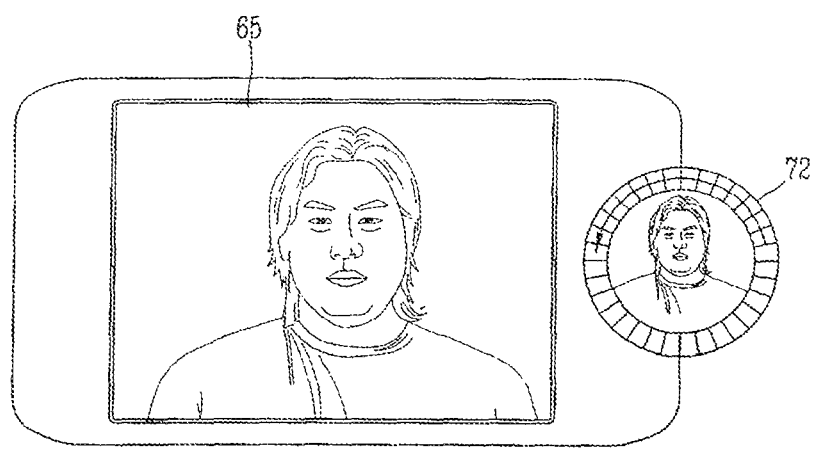

As shown in FIG. 32A, when the user touches or proximity-touches the particular face recognition region 71a displayed on the main display region 65, the controller 180 displays a face image of the corresponding face recognition region 71a on the auxiliary display region 66 as shown in FIG. 32B. The controller 180 also preferably magnifies the face displayed in the main display region 65. This method is similar to the method illustrated in FIG. 29B, and the method illustrated in FIG. 32B may be performed after performing the method illustrated in FIG. 29A.

Figure 32C:
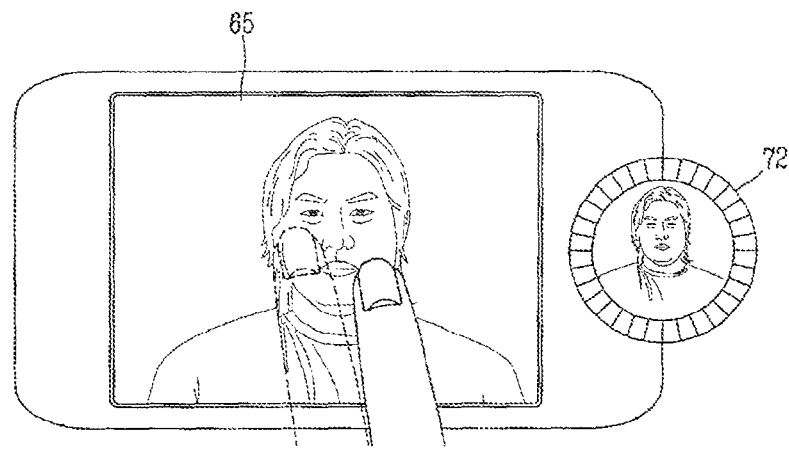
Figure 32D:
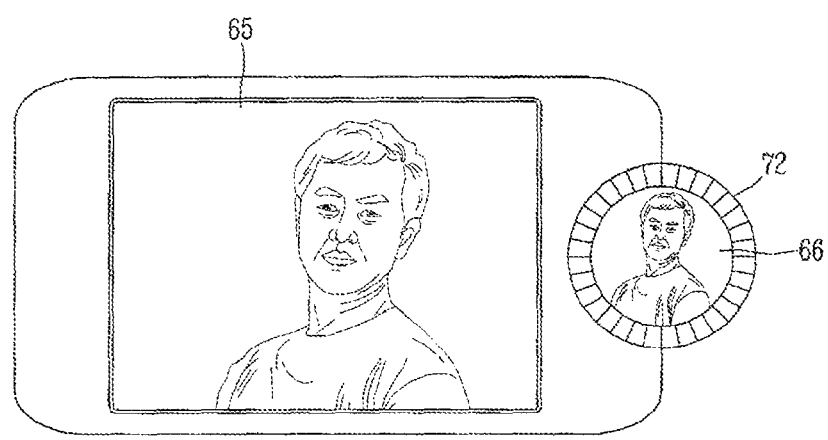

In addition, when the user touches the magnified image of the main display region 65 and drags it to the left or right in order to check images of different face recognition regions as shown in FIG. 32C, the controller 180 displays a detailed face image of a next face recognition region positioned in the corresponding direction. For example, when the user drags the magnified image to the right, the face image 71b of the next face recognition region is magnified and displayed on the main display region 65 and the auxiliary region 66 as shown in FIG. 32D.

Figure 32E:
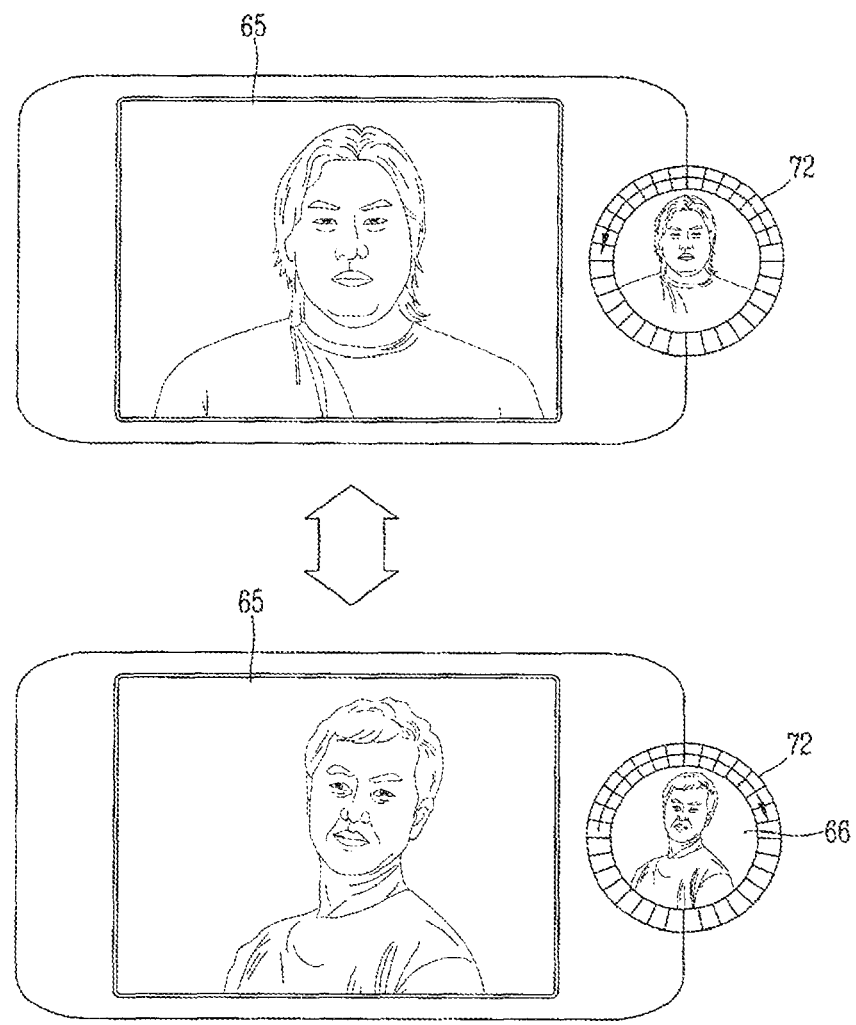

In a different method as shown in FIG. 32E, the user can select a desired image using the jog wheel 72. In particular, the user may rotates the jog wheel 72 to the left or right to display a detailed face image of the next face recognition region. For example, when the image of the face recognition region 71b is displayed on the main display region 65 and/or in the auxiliary display region 66 as shown in FIG. 32B, and if the user rotates the jog wheel 72 clockwise, the controller 180 magnifies and displays the image of the previous face recognition region 71a on the main display region 65.

Further, the detection of the face recognition regions or objects refers to a technique that discovers a face region of the user from the camera image (photo or video) and displays the region in a quadrangle, circle, or the like. A similar tracking can also be performed. In particular, the tracking of faces or objects refers to a technique that continuously tracks, detects and displays the face region of the user according to a movement of the user. An identification process can also be used. In particular, the identification process refers to a technique that detects face information from a camera image (photo or video), compares the detected face information with previously stored face information, and displays a corresponding face or uses the information in a different application.

Thus, the embodiments of the present invention provide several advantages. For example, the user can view images easily before storing the images. Thus, the user can check a face expression, for example, to see if the subject has blinked, etc. before storing the image. Therefore, the user does not have to perform an additional menu selection and perform an additional deletion operation to delete pictures that are not wanted.

Further, in the above description, the face recognition region has been taken as an example, but the present invention is not limited thereto. That is, when the user designates a portion or range desired to be magnified and viewed through a touch motion (e.g., circular, triangular, quadrangular touch motions), the controller 180 can display the designated portion on the main display region 65 and/or on the auxiliary display region 66 in the same manner as described above and display an image according to the operation of the direction key or the jog wheel manipulated by the user.

As described above, the images changed according to camera zooming operation in a preview state can be effectively displayed and controlled, so the user can more conveniently and accurately perform an image capturing operation. In addition, a desired portion can be selected from a captured and temporarily stored image and displayed on a different region, so the state of the captured image can be effectively checked and the user can store only a wanted photo image.

In particular, before image capturing, the user interface allows the user to conveniently adjust the composition, and after image capturing, the user interface allows the user to easily check a captured image, thereby allowing the user to conveniently perform an image capturing operation. Further, a full image (preview screen image) captured by an image sensor of the camera of the mobile terminal having the touch function is displayed simultaneously on an auxiliary display region as well as on a main display region, and the screen display of the image displayed on the main display region and on the auxiliary display region is controlled through camera zooming, by applying a touch (a proximity touch or a contact touch) and with the lapse of time.

In addition, the captured images displayed on the main display region and the auxiliary display region are operated cooperatively. Also, the auxiliary display region is provided within the main display region or is a display region provided within or outside the mobile terminal. When the auxiliary display region is provided within the main display region, the auxiliary display region is implemented in the form of a miniaturized image, and the miniaturized image may be displayed as an on-screen display (OLD). The camera zooming operations also include both digital zooming and optical zooming.

In addition, the mobile terminal performs a face recognition process with respect to a camera image displayed on the main display region, and when a face recognition region is zoomed, notification information informing the user about the event is displayed. The notification information may be displayed as an indicator, icon, a simple image, an identification image, text type information, a composition map, and the like. Also, notification information pieces, text information and arrows, or icons by the number of the face recognition regions may be displayed. Screen display and image capturing operations are also controlled according to a touch (a proximity touch, a contact touch, a touch & drag, multi-touch, a long-touch, etc.) of the notification information. When a particular region of the captured image is touched, an image of the corresponding region is displayed at an auxiliary display region to allow the user to easily check it. The region is a face recognition region in one example, and the image of the corresponding region is preferably magnified and displayed.

Further, the screen display may be controlled such that, when a particular portion of the zoom screen image (or preview screen image) is touched, all of the not displayed miniaturized image, the scroll bar, various setting/execution icons, etc. reappear on the screen display region. In addition, when a particular portion of the zoom screen image (or preview screen image) is touched, only the selected portion appears on the screen display region. Also, when the user touches (contact touches, proximity-touches or touch-and-drags) a particular region on the miniaturized image, a central position is shifted to make the touched point to appear on the screen display region. For example, when the user touches a particular region on the miniaturized image, the controller 180 shifts the central position to the touched point and displays it.

Thereafter, when the touch is released, the controller 180 maintains the current state or returns the current state to its original state (preview state). If the user touch-and-drags a particular region on the miniaturized image, the controller 180 shifts the central position to the corresponding dragged point. In addition, when a particular region of the horizontal scroll bar is touched, the central position is shifted to make the touched point appear at the screen display region. Namely, when the user touches a particular portion of the scroll bar portion, the controller 180 shifts the central position in the same manner as the miniaturized image.

Further, when an image is captured, a zoom image and a full image according to camera zooming operation can be simultaneously stored in the memory, and when a touch, proximity touch, touch-and-dragging operation, etc. is performed, sound effects. vibration feedback, and the like, can be output. In addition, when the notification information is touched by the user, the controller 180 shifts the central position of the zoom image to the touched face recognition region (which may include adjustment of proper zoom magnification). For example, when the user touches the arrow portion on the text information, the controller 180 shifts to the face recognition region corresponding to the touched portion. When the user touches is close to the notification information for a certain time, the controller 180 shifts the central position of the zoomed image to the closed face recognition region (which may include an adjustment of proper zoom magnification). Thereafter, when the touch input is released, the controller 180 can maintain the current state of the screen display or returns it to the original state.

Further, when the user touch-and-drags the notification information, the controller 180 shifts the central position of the zoomed image so that the face recognition region is placed at the dragged position (which may include an adjustment of proper zoom magnification). If the notification information is selected in a certain shape, for example, in a circular shape, the controller 180 shifts the image such that the selected portion is entirely included in the screen.

When the user touches the miniaturized image, the scroll bar and the composition map, the controller 180 shifts the central position of the zoomed image such that the corresponding face recognition region appears. When the user multi-touches the notification information or the composition map, the controller 180 shifts the central position of the zoomed image such that the touched face recognition region is entirely included in the screen. When an image capture key is pressed after the particular region on the composition map is long-touched or short-touched, the controller 180 performs capturing immediately after shifting to the corresponding face recognition region. When the image capture key is pressed after the particular regions on the composition map are contact-touched and such touch contacts are maintained for a prolonged duration (i.e., so-called 'multi-long-touched' or 'multi-long-touch' is performed), the controller 180 sequentially shifts to the corresponding face recognition regions and performs image capturing.

When the user sequentially touches the particular region on the composition map, the controller 180 can perform image capturing while sequentially shifting to the corresponding face recognition region, and provide sound effects, vibration feedback, and the like, in case of touch, proximity touch and touch-and-dragging. The touching actions can also include a variety of touch actions including a touch and dragging moving instruction, a scrolling instruction, a gesture instruction, etc. In addition, a voice instruction and a directional key input instruction can also be used to move, scroll, capture, etc. the images.

The mobile terminal described according to the above embodiments include mobile phones, smart phones, notebook computers, digital broadcast terminals, PDAs (Personal Digital Assistants), PMPs (Portable Multimedia Player), navigation devices, etc.

Further, the embodiments of the present invention can be implemented as codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of the Internet. The computer correspond to the controller 180 of the terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method of controlling a mobile terminal, the method comprising:
   displaying, via a display on the mobile terminal, a full image detected by a camera as a preview image in a first display portion;
   displaying, via the display, the same full image in a second display portion;
   zooming, via a controller on the mobile terminal, the image displayed in the first display portion; and
   displaying, via the display, a zoom guide on the image displayed in the second display portion that identifies a zoomed portion of the image displayed in the first display portion;
   recognizing, via the controller, at least first and second faces in the image displayed in the first display portion;
   displaying, via the display, a first face included in said at least first and second faces, in the second display portion; receiving a shifting signal indicating a shifting of the first face in the second display portion; and displaying, via the display, the second face of said at least first and second faces in the second display portion based on the received shifting signal.

2. The method of claim 1, wherein the zooming step zooms the image displayed in the first display portion without zooming the image displayed in the second display portion.

3. The method of claim 2, further comprising:
   storing the zoomed image displayed in the first display portion and storing the non-zoomed image displayed in the second display portion.

4. The method of claim 1, further comprising:
   miniaturizing, via the controller, a display size of the image displayed in the second display portion while maintaining a full image view of the image displayed in the second display portion.

5. The method of claim 4, further comprising:
   displaying, via the display, the miniaturized image displayed in the second display portion in an overlapping manner on the image displayed in the first display portion.

6. The method of claim 5, further comprising:
   displaying, via the display, the overlapped miniaturized image in a semi-transparent manner over the image displayed in the first display portion.

7. The method of claim 1, further comprising:
   moving the image displayed in the first display portion via an input moving instruction; and
   shifting, via the controller, the zoom guide displayed on the image displayed in the second display portion to correspond with the image moved in the first display portion.

8. The method of claim 7, wherein the moving instruction includes at least one of a touch and dragging moving instruction, a scrolling instruction, a gesture instruction, a voice instruction and a directional key input instruction.

9. The method of claim 1, wherein the image displayed in the second display portion is set to automatically disappear when a certain time lapses, and to reappear when a predetermined portion of the display is touched.

10. The method of claim 1, further comprising:
    receiving a touch input signal indicating a touching of a portion of the image displayed in the second display portion; and
    moving the image displayed in the first display portion to correspond with the received touch input signal indicating the touching of the portion of the image displayed in the second display portion.

11. The method of claim 10, wherein the moving step moves the image displayed in the first display portion such that a position of the image displayed in the first display portion that corresponds to a position touched on the image displayed in the second display portion is centered on the first display portion.

12. The method of claim 1, further comprising:
    displaying an indicator indicating how many recognized faces in the zoomed image displayed in the first display portion are missing compared to the image displayed in the second display portion.

13. The method of claim 12, wherein the indicator is displayed on a side of the display corresponding to a direction the missing faces are located.

14. The method of claim 12, wherein the indicator includes at least one of an image of a composition map, a missing face, an icon, textual information, a number and phonebook information.

15. The method of claim 12, further comprising:
    receiving an input signal indicating a selection of the displayed indicator; and
    shifting, via the controller, the image displayed in the first display portion to include the missing face indicated by the selected indicator.

16. The method of claim 1, wherein the first and second display portions are on a same display or are separate displays on the mobile terminal.

17. The method of claim 1, further comprising:
    performing face recognition on the full image in the first display portion;
    displaying a composition map indicating faces recognized on the full image;
    updating the composition map based on the zoomed image when the full image is zoomed;
    detecting a long-touch input on the composition map;

shifting a central position of the image to a face recognition region corresponding to the detected long-touch input; and automatically capturing the image with the central position shifted.

18. A mobile terminal, comprising:
a first display portion configured to display a full image detected by a camera as a preview image;
a second display portion configured to display the same full image; and
a controller configured to zoom the image displayed in the first display portion, control the second display portion to display a zoom guide on the image displayed in the second display portion that identifies a zoomed portion of the image displayed in the first display portion,
recognize at least first and second faces in the image displayed in the first display portion, display a first face included in said at least first and second faces in the second display portion, receive a shifting signal indicating a shifting of the first face in the second display portion, and display the second face of said at least first and second faces in the second display portion based on the received shifting signal.

19. The mobile terminal of claim 18, wherein the controller is further configured to zoom the image displayed in the first display portion without zooming the image displayed in the second display portion.

20. The mobile terminal of claim 19, further comprising:
a memory configured to store the zoomed image displayed in the first display portion and to store the non-zoomed image displayed in the second display portion.

21. The mobile terminal of claim 18, wherein the controller is further configured to miniaturize a display size of the image displayed in the second display portion while maintaining a full image view of the image displayed in the second display portion.

22. The mobile terminal of claim 21, wherein the controller is further configured to control the second display portion to display the miniaturized image displayed in the second display portion in an overlapping manner on the image displayed in the first display portion.

23. The mobile terminal of claim 22, wherein the controller is further configured to control the second display portion to display the overlapped miniaturized image in a semi-transparent manner over the image displayed in the first display portion.

24. The mobile terminal of claim 18, wherein the controller is further configured to move the image displayed in the first display portion via an input moving instruction, and to shift the zoom guide displayed on the image displayed in the second display portion to correspond with the image moved in the first display portion.

25. The mobile terminal of claim 24, wherein the moving instruction includes at least one of a touch and dragging moving instruction, a scrolling instruction, a gesture instruction, a voice instruction and a directional key input instruction.

26. The mobile terminal of claim 18, wherein the controller is further configured to set the image displayed in the second display portion to automatically disappear when a certain time lapses, and to reappear when a predetermined portion of the display is touched.

27. The mobile terminal of claim 18, wherein the controller is further configured to receive a touch input signal indicating a touching of a portion of the image displayed in the second display portion, and to move the image displayed in the first display portion to correspond with the received touch input signal indicating the touching of the portion of the image displayed in the second display portion.

28. The mobile terminal of claim 27, wherein the controller is further configured to move the image displayed in the first display portion such that a position of the image displayed in the first display portion that corresponds to a position touched on the image displayed in the second display portion is centered on the first display portion.

29. The mobile terminal of claim 18, wherein the controller is further configured to display an indicator indicating how many recognized faces in the zoomed image displayed in the first display portion are missing compared to the image displayed in the second display portion.

30. The mobile terminal of claim 29, wherein the controller is further configured to display the indicator on a side of the first display portion corresponding to a direction the missing faces are located.

31. The mobile terminal of claim 29, wherein the indicator includes at least one of an image of a composition map, a missing face, an icon, textual information, a number and phonebook information.

32. The mobile terminal of claim 29, wherein the controller is further configured to receive an input signal indicating a selection of the displayed indicator, and to shifting the image displayed in the first display portion to include the missing face indicated by the selected indicator.

33. The mobile terminal of claim 18, wherein the first and second display portions are on a same display or are separate displays on the mobile terminal.

34. The mobile terminal of claim 18, wherein the controller is further configured to:
perform face recognition on the full image in the first display portion,
display a composition map indicating faces recognized on the full image,
update the composition map based on the zoomed image when the full image is zoomed,
detect a long-touch input on the composition map,
shift a central position of the image to a face recognition region corresponding to the detected long-touch input, and
automatically capture the image with the central position shifted.

* * * * *